(12) United States Patent  
Ishizaki et al.

(10) Patent No.: US 8,173,028 B2
(45) Date of Patent: May 8, 2012

(54) METHOD OF MANUFACTURING MAGNETIC HEAD FOR PERPENDICULAR MAGNETIC RECORDING INCLUDING TWO SIDE SHIELDS

(75) Inventors: Kazuo Ishizaki, Milpitas, CA (US);
Yoshitaka Sasaki, Milpitas, CA (US);
Hironori Araki, Milpitas, CA (US);
Hiroyuki Ito, Milpitas, CA (US);
Shigeki Tanemura, Milpitas, CA (US);
Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 522 days.

(21) Appl. No.: 12/457,090

(22) Filed: Jun. 1, 2009

(65) Prior Publication Data
US 2010/0301007 A1 Dec. 2, 2010

(51) Int. Cl.
*G11B 5/127* (2006.01)
(52) U.S. Cl. ............... 216/22; 216/66; 216/67; 216/58; 216/41; 29/603.07; 29/603.13; 29/603.14; 29/603.15; 29/603.16; 29/603.18; 360/110; 360/122; 360/125.01; 360/125.02; 360/125.03
(58) Field of Classification Search ............... 216/22, 216/58, 66, 67, 41; 29/603.07, 603.13, 603.14, 29/603.15, 603.16, 603.18; 360/110, 122, 125.01, 125.02, 125.03
See application file for complete search history.

(56) References Cited

U.S. PATENT DOCUMENTS

| | | | |
|---|---|---|---|
| 2005/0219747 A1 | 10/2005 | Hsu et al. | |
| 2006/0174475 A1* | 8/2006 | Sasaki et al. | 29/603.16 |
| 2006/0268456 A1* | 11/2006 | Sasaki et al. | 360/126 |
| 2007/0177301 A1* | 8/2007 | Han et al. | 360/126 |
| 2007/0211377 A1 | 9/2007 | Sasaki et al. | |
| 2008/0024911 A1* | 1/2008 | Sasaki et al. | 360/110 |
| 2008/0068747 A1* | 3/2008 | Sasaki et al. | 360/110 |
| 2008/0088972 A1* | 4/2008 | Sasaki et al. | 360/110 |

* cited by examiner

*Primary Examiner* — Lan Vinh
*Assistant Examiner* — David Kaufman
(74) *Attorney, Agent, or Firm* — Oliff & Berridge, PLC

(57) ABSTRACT

A magnetic head includes a pole layer, first and second side shields, and an encasing layer having first to third grooves that accommodate the pole layer and the first and second side shields. A manufacturing method for the magnetic head includes the step of forming the first to third grooves in a nonmagnetic layer by using an etching mask layer having first to third openings. This step includes the steps of forming the first groove by etching the nonmagnetic layer using the first opening, with the second and third openings covered with a first mask; and forming the second and third grooves by etching the nonmagnetic layer using the second and third openings, with the first opening covered with a second mask.

9 Claims, 37 Drawing Sheets

METHOD OF MANUFACTURING MAGNETIC HEAD FOR PERPENDICULAR MAGNETIC RECORDING INCLUDING TWO SIDE SHIELDS

BACKGROUND OF THE INVENTION

1. Field of the Invention

The present invention relates to a method of manufacturing a magnetic head for perpendicular magnetic recording that is used for writing data on a recording medium by means of a perpendicular magnetic recording system.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Like magnetic heads for longitudinal magnetic recording, those for perpendicular magnetic recording typically have a structure in which a read head including a magnetoresistive element (hereinafter, also referred to as an MR element) for reading and a write head including an induction-type electromagnetic transducer for writing are stacked on a substrate. The write head includes a pole layer that produces a magnetic field in the direction perpendicular to the plane of the recording medium. The pole layer includes, for example, a track width defining portion having one end located in a medium facing surface that faces the recording medium, and a wide portion that is coupled to the other end of the track width defining portion and that is greater in width than the track width defining portion. The track width defining portion has a nearly uniform width. To achieve a higher recording density, a reduction in track width and an improvement in write characteristics, such as an overwrite property that is a parameter indicating an overwriting capability, are required of the write head of the perpendicular magnetic recording system.

As a magnetic head for perpendicular magnetic recording, there is known a magnetic head including a shield, the shield having an end face located in the medium facing surface at a position forward of the end face of the pole layer along the direction of travel of the recording medium with a predetermined distance provided therebetween, as disclosed in U.S. Patent Application Publication No. 2005/0219747 A1, for example. A gap layer made of a nonmagnetic material is provided between the pole layer and the shield. The shield has the function of preventing a magnetic flux from reaching the recording medium, the magnetic flux being generated from the end face of the pole layer and expanding in directions except the direction perpendicular to the plane of the recording medium. A magnetic head including such a shield enables a further improvement in recording density.

A magnetic head for use in a magnetic disk drive such as a hard disk drive is typically provided in a slider. The slider has the medium facing surface mentioned above. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs in accordance with the position of the magnetic head across the tracks.

In a magnetic disk drive of the perpendicular magnetic recording system, in particular, which exhibits a better capability of writing on a recording medium compared with the longitudinal magnetic recording system, the skew mentioned above often causes a phenomenon in which, when data is written on a certain track, data stored on a track adjacent thereto is erased (this phenomenon is hereinafter called adjacent track erasing). To achieve a higher recording density, it is required to suppress the adjacent track erasing.

As a technique for suppressing the adjacent track erasing resulting from the skew mentioned above, it is effective to form a tapered surface in the top surface of the pole layer near the medium facing surface such that the thickness of the pole layer near the medium facing surface decreases toward the medium facing surface, as disclosed in U.S. Patent Application Publication No. 2005/0219747 A1. This technique allows a reduction in thickness of the track width defining portion in the medium facing surface, thereby making it possible to suppress the adjacent track erasing resulting from the skew. This technique also allows guiding a magnetic flux of great magnitude to the medium facing surface through the pole layer, thereby making it possible to suppress degradation of the write characteristics (overwrite property).

As a technique for suppressing the adjacent track erasing in a write head of the perpendicular magnetic recording system, it is also effective to provide two side shields on both sides of the pole layer that are opposite to each other in the track width direction, as disclosed in U.S. Patent Application Publication No. 2007/0177301 A1. A magnetic head including such two side shields allows suppression of the adjacent track erasing because it is possible to take in a magnetic flux that is generated from the end face of the pole layer and extends in the track width direction.

In a magnetic head including two side shields, flux leakage from the pole layer to the two side shields is likely to occur since the two side shields are present near the pole layer. The relative locations of the pole layer and the two side shields and the shapes of the pole layer and the two side shields therefore influence the write characteristics. To achieve desired write characteristics, it is thus important to accurately align the pole layer and the two side shields with respect to each other and to control the respective shapes of the pole layer and the two side shields.

Typically, the pole layer and the two side shields are patterned using different masks. In this case, it is difficult to accurately align the pole layer and the two side shields with respect to each other.

U.S. Patent Application Publication No. 2007/0211377 A1 discloses a method of forming a groove for accommodating the pole layer and two grooves for accommodating the two side shields simultaneously in a nonmagnetic layer by etching through the use of a single mask. This method allows accurate alignment of the pole layer and the two side shields with respect to each other. According to this method, however, since the groove for accommodating the pole layer and the two grooves for accommodating the two side shields are formed simultaneously, it is difficult to control the shape of the groove for accommodating the pole layer and the shapes of the two grooves for accommodating the two side shields independently of each other. Consequently, it is difficult with this method to control the respective shapes of the pole layer and the two side shields into desired shapes.

OBJECT AND SUMMARY OF THE INVENTION

It is an object of the present invention to provide a method of manufacturing a magnetic head for perpendicular magnetic recording that makes it possible to accurately align the pole layer and the two side shields with respect to each other and to control the respective shapes of the pole layer and the two side shields.

A magnetic head for perpendicular magnetic recording that is manufactured by a manufacturing method of the present invention includes: a medium facing surface that faces a recording medium; a coil that produces a magnetic field corresponding to data to be written on the recording medium; a pole layer that has an end face located in the medium facing surface, allows a magnetic flux corresponding to the magnetic field produced by the coil to pass and produces a write magnetic field for writing the data on the recording medium by means of a perpendicular magnetic recording system; a top shield that is made of a magnetic material and has an end face located in the medium facing surface at a position forward of the end face of the pole layer along a direction of travel of the recording medium; a gap layer that is made of a nonmagnetic material, disposed between the pole layer and the top shield and has an end face located in the medium facing surface; a first side shield and a second side shield disposed on both sides of the pole layer that are opposite to each other in a track width direction, each of the side shields being made of a magnetic material and having an end face located in the medium facing surface; and an encasing layer made of a nonmagnetic material. The encasing layer has a first groove accommodating the pole layer, a second groove accommodating the first side shield, and a third groove accommodating the second side shield.

The manufacturing method for the magnetic head for perpendicular magnetic recording of the present invention includes the steps of: forming a nonmagnetic layer that is to become the encasing layer through formation of the first to third grooves therein later; forming an etching mask layer on the nonmagnetic layer, the etching mask layer having a first opening, a second opening and a third opening that have shapes corresponding to respective planar shapes of the first, second and third grooves to be formed later; forming the first to third grooves in the nonmagnetic layer by etching using the etching mask layer so that the nonmagnetic layer becomes the encasing layer; forming the pole layer; forming the first and second side shields; forming the gap layer; forming the top shield; and forming the coil.

The step of forming the first to third grooves includes the steps of: forming the first groove by etching the nonmagnetic layer using the first opening, with the second and third openings covered with a first mask; and forming the second and third grooves by etching the nonmagnetic layer using the second and third openings, with the first opening covered with a second mask.

The magnetic head for perpendicular magnetic recording may further include a substrate on which the coil, the encasing layer, the pole layer, the first and second side shields, the gap layer and the top shield are stacked, the substrate having a top surface. In this case, the end face of the pole layer located in the medium facing surface may decrease in width in the track width direction with decreasing distance from the top surface of the substrate. The pole layer may have a top surface including a first portion and a second portion, the first portion having a first edge located in the medium facing surface and a second edge opposite to the first edge, the second portion being located farther from the medium facing surface than is the first portion and connected to the first portion at the second edge. The distance from top surface of the substrate to an arbitrary point on the first portion may decrease with decreasing distance from the arbitrary point to the medium facing surface. In this case, the step of forming the pole layer may include the steps of: forming a magnetic layer to fill the first groove, the magnetic layer being intended to become the pole layer later; and etching a part of the magnetic layer so that the first portion of the top surface of the pole layer is formed and the magnetic layer thereby becomes the pole layer.

In the manufacturing method for the magnetic head for perpendicular magnetic recording of the present invention, the step of forming the etching mask layer may include the steps of: forming a nonmagnetic metal layer on the nonmagnetic layer, the nonmagnetic metal layer being made of a nonmagnetic metal material and intended to become the etching mask layer through formation of the first to third openings therein later; forming a photoresist mask on the nonmagnetic metal layer, the photoresist mask being intended to be used in etching the nonmagnetic metal layer later; and forming the first to third openings in the nonmagnetic metal layer by etching using the photoresist mask so that the nonmagnetic metal layer becomes the etching mask layer. In this case, in the step of forming the photoresist mask, the photoresist mask may be formed by performing photolithography with optical proximity correction.

In the manufacturing method for the magnetic head for perpendicular magnetic recording of the present invention, the steps of forming the pole layer and forming the first and second side shields may be performed after the steps of forming the first groove and forming the second and third grooves.

In the manufacturing method for the magnetic head for perpendicular magnetic recording of the present invention, the step of forming the pole layer may be performed after the step of forming the first groove, the step of forming the second and third grooves may be performed after the step of forming the pole layer, and the step of forming the first and second side shields may be performed after the step of forming the second and third grooves. In the step of forming the second and third grooves, the second mask may cover the pole layer as well as the first opening. In this case, the step of forming the gap layer may be performed between the step of forming the second and third grooves and the step of forming the first and second side shields. The first and second side shields and the top shield may be made of the same material, and the step of forming the top shield may be performed simultaneously with the step of forming the first and second side shields.

According to the manufacturing method for the magnetic head for perpendicular magnetic recording of the present invention, the positions of the pole layer and the two side shields are defined by the first to third openings of the etching mask layer. The present invention thus allows accurate alignment of the pole layer and the two side shields with respect to each other. According to the present invention, the first groove is formed by etching the nonmagnetic layer using the first opening, with the second and third openings covered with the first mask, and the second and third grooves are formed by etching the nonmagnetic layer using the second and third openings, with the first opening covered with the second mask. Consequently, according to the present invention, it is possible to control the respective shapes of the pole layer and the two side shields.

Other objects, features and advantages of the present invention will become fully apparent from the following description.

DETAILED DESCRIPTION OF THE PREFERRED EMBODIMENTS

[First Embodiment]

Figure 1:
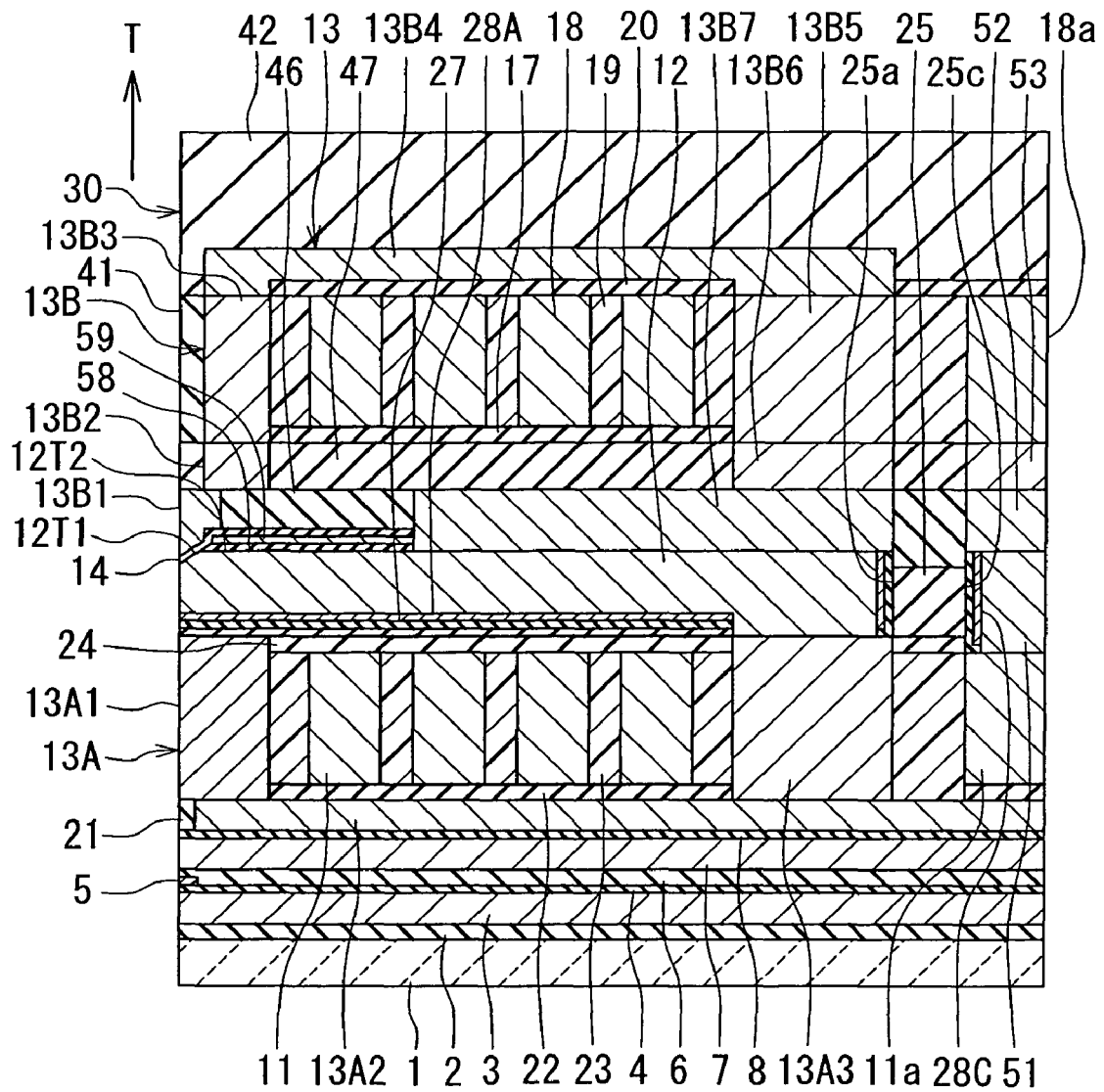
FIG. 1 is a cross-sectional view showing the configuration of a magnetic head according to a first embodiment of the invention.
Figure 2:
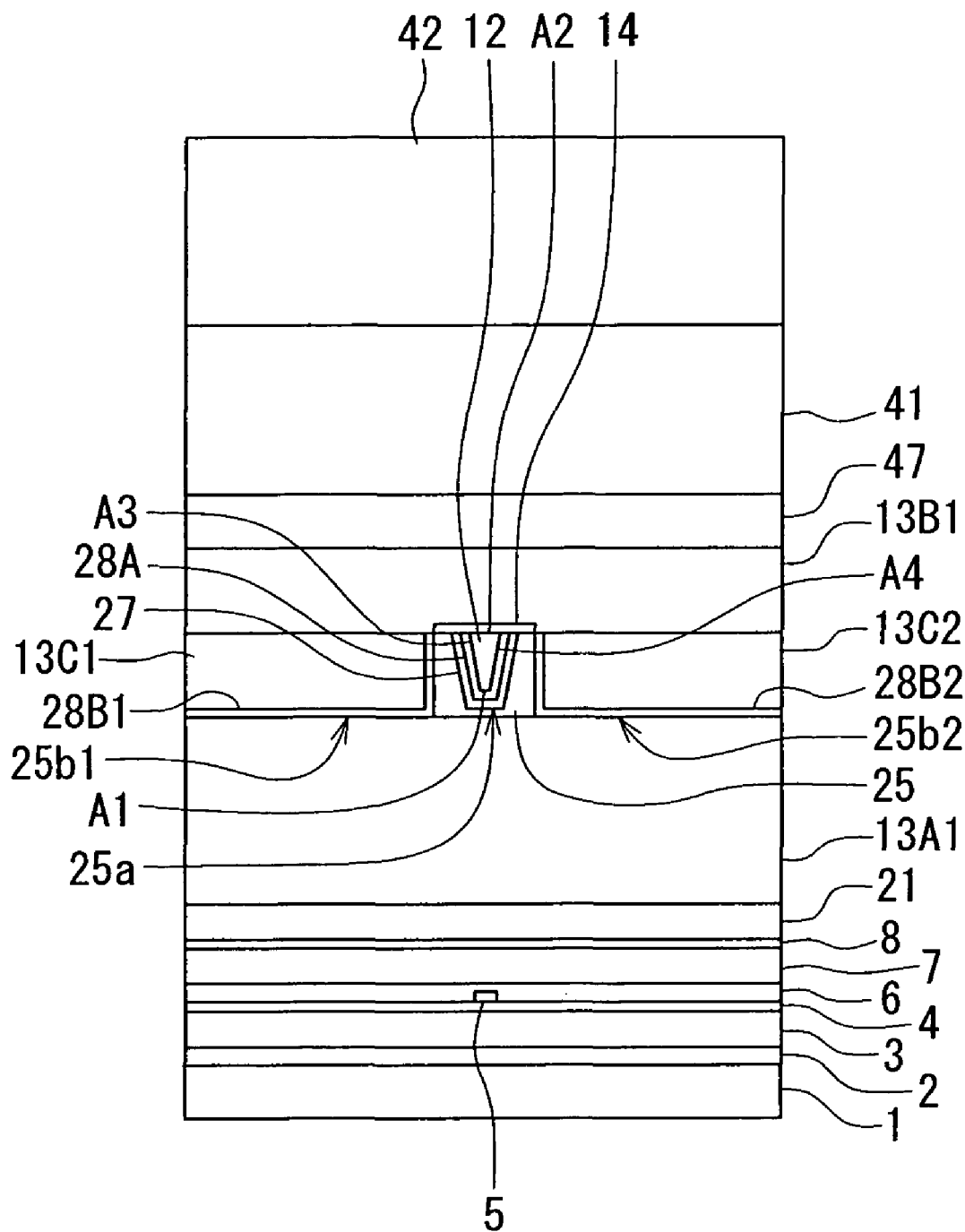
FIG. 2 is a front view showing the medium facing surface of the magnetic head according to the first embodiment of the invention.
Figure 3:
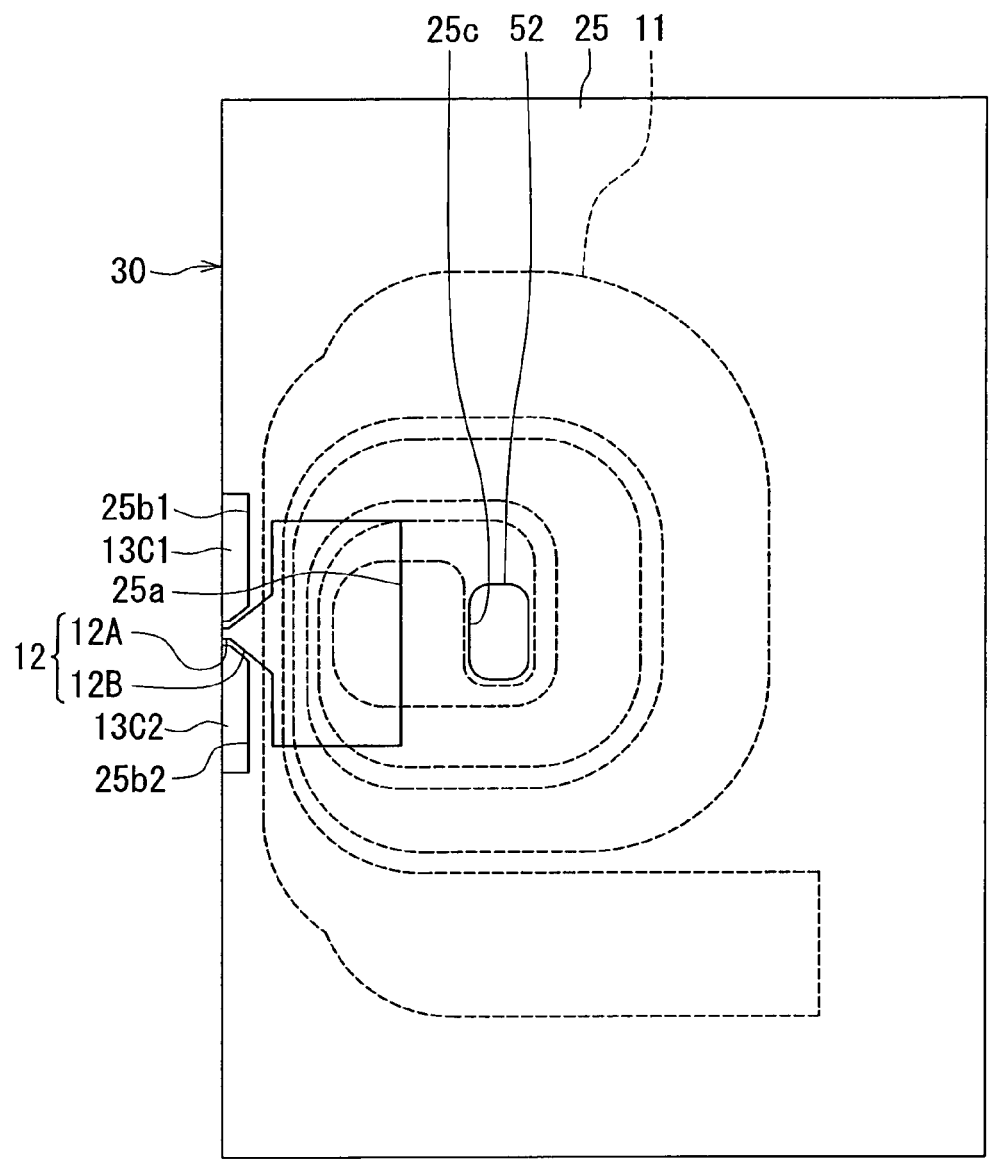
FIG. 3 is a plan view showing a pole layer and two side shields of the magnetic head according to the first embodiment of the invention.
Figure 4:
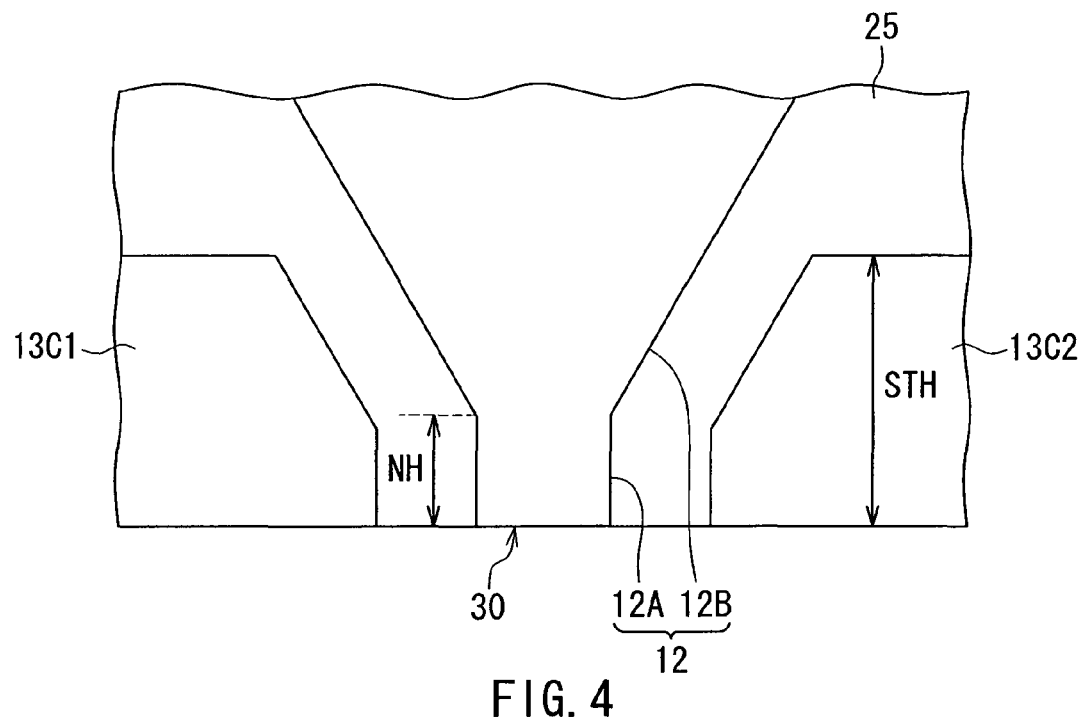
FIG. 4 is a plan view showing respective portions of the pole layer and the two side shields in the vicinity of the medium facing surface of the magnetic head according to the first embodiment of the invention.
Figure 5:
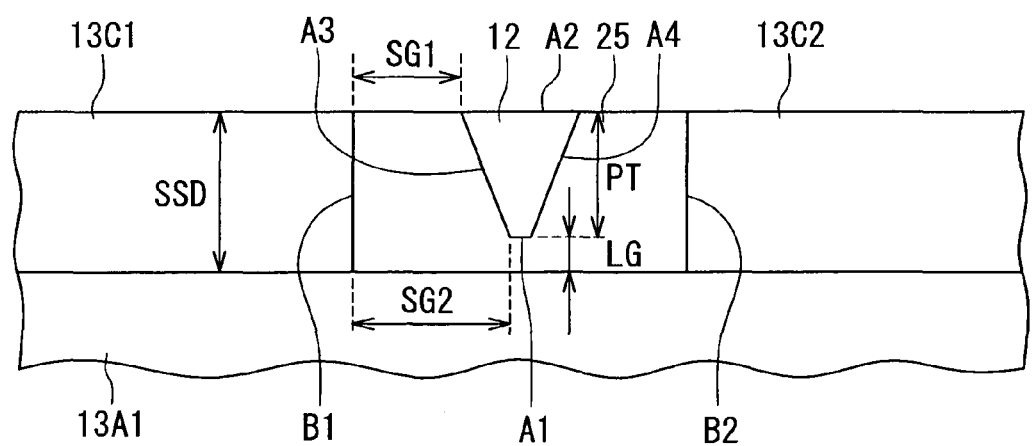
FIG. 5 is an explanatory diagram showing the shapes of the pole layer and the two side shields in the medium facing surface of the magnetic head according to the first embodiment of the invention.

A first embodiment of the present invention will now be described in detail with reference to the drawings. Reference is first made to FIG. 1 to FIG. 5 to describe the configuration of a magnetic head according to the first embodiment of the invention. The magnetic head according to the present embodiment is for use in perpendicular magnetic recording. FIG. 1 is a cross-sectional view showing the configuration of the magnetic head according to the present embodiment. FIG. 1 shows a cross section perpendicular to the medium facing surface and the top surface of the substrate. In FIG. 1 the arrow designated by the symbol T indicates the direction of travel of a recording medium. FIG. 2 is a front view showing the medium facing surface of the magnetic head according to the present embodiment. FIG. 3 is a plan view showing a pole layer and two side shields of the present embodiment. FIG. 4 is a plan view showing respective portions of the pole layer and the two side shields of the present embodiment in the vicinity of the medium facing surface. FIG. 5 is an explanatory diagram showing the shapes of the pole layer and the two side shields in the medium facing surface of the magnetic head according to the present embodiment. In FIG. 5, parts other than the pole layer and the two side shields are drawn in a simplified manner.

As shown in FIG. 1 and FIG. 2, the magnetic head according to the present embodiment includes: a substrate 1 made of a ceramic material such as aluminum oxide-titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 which is an insulating film disposed on the bottom shield layer 3; a magnetoresistive (MR) element 5 as a read element disposed on the bottom shield gap film 4; a top shield gap film 6 which is an insulating film disposed on the MR element 5; and a top shield layer 7 made of a magnetic material and disposed on the top shield gap film 6.

An end of the MR element 5 is located in the medium facing surface 30 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element.

The parts from the bottom shield layer 3 to the top shield layer 7 constitute a read head. The magnetic head further includes a nonmagnetic layer 8 made of a nonmagnetic material and disposed on the top shield layer 7, and a write head disposed on the nonmagnetic layer 8. The nonmagnetic layer 8 is made of alumina, for example. The write head includes a first coil 11, a second coil 18, a pole layer 12, a shield 13, and a gap layer 14.

Each of the first coil 11 and the second coil 18 is planar spiral-shaped. The first coil 11 and the second coil 18 are connected in series or in parallel. In FIG. 1 the reference sign 11a indicates a connecting portion of the first coil 11 connected to the second coil 18, and the reference sign 18a indicates a connecting portion of the second coil 18 connected to the first coil 11. The magnetic head further includes connecting layers 51, 52 and 53 stacked in this order on the connecting portion 11a. The connecting layers 51, 52 and 53 are each made of a conductive material. The connecting portion 18a is disposed on the connecting layer 53.

The first coil 11 and the second coil 18 produce magnetic fields corresponding to data to be written on the recording medium. The pole layer 12 has an end face located in the medium facing surface 30, allows magnetic fluxes corresponding to the magnetic fields produced by the coils 11 and 18 to pass, and produces a write magnetic field for writing the data on the recording medium by means of the perpendicular magnetic recording system.

The shield 13 includes: a first portion 13A disposed backward of the pole layer 12 along the direction T of travel of the recording medium; a second portion 13B disposed forward of the pole layer 12 along the direction T of travel of the recording medium; and first and second side shields 13C1 and 13C2 disposed on both sides of the pole layer 12 that are opposite to each other in the track width direction. The first portion 13A, the second portion 13B and the side shields 13C1 and 13C2 are each made of a magnetic material. The material of them can be any of CoFeN, CoNiFe, NiFe and CoFe, for example.

The first portion 13A of the shield 13 includes a bottom shield layer 13A1, a second layer 13A2 and a third layer 13A3 that are magnetically coupled. The second layer 13A2 is disposed on the nonmagnetic layer 8. The second layer 13A2 has an end face that is closer to the medium facing surface 30, and this end face is located at a distance from the medium facing surface 30. The magnetic head further includes an insulating layer 21 made of an insulating material and disposed around the second layer 13A2 on the nonmagnetic layer 8, and an insulating layer 22 made of an insulating material and disposed on a part of the top surface the second layer 13A2. The insulating layers 21 and 22 are made of alumina, for example. The first coil 11 is disposed on the insulating layer 22.

The bottom shield layer 13A1 and the third layer 13A3 are disposed on the second layer 13A2. The bottom shield layer 13A1 is disposed between the medium facing surface 30 and the coil 11. The bottom shield layer 13A1 has an end face that is located in the medium facing surface 30 at a position backward of the end face of the pole layer 12 along the direction T of travel of the recording medium. The third layer 13A3 is disposed farther from the medium facing surface 30 than is the bottom shield layer 13A1. The coil 11 is wound around the third layer 13A3.

The magnetic head further includes an insulating layer 23 made of an insulating material and disposed around the coil 11 and in the space between every adjacent turns of the coil 11, and an insulating layer 24 disposed around the insulating layer 23, the bottom shield layer 13A1 and the third layer 13A3 and over the top surfaces of the coil 11 and the insulating layer 23. The bottom shield layer 13A1, the third layer 13A3 and the insulating layer 24 are flattened at the top. The insulating layer 24 has an opening for exposing the top surface of the connecting portion 11a of the coil 11. The insulating layer 23 is made of photoresist, for example. The insulating layer 24 is made of alumina, for example. The coil 11 is made of a conductive material such as copper.

The magnetic head further includes an encasing layer 25 made of a nonmagnetic material and disposed over the top surfaces of the bottom shield layer 13A1 and the insulating layer 24. The encasing layer 25 has four grooves 25a, 25b1, 25b2 and 25c that open in the top surface of the encasing layer 25. The groove 25a accommodates the pole layer 12. The groove 25b1 accommodates the side shield 13C1. The groove 25b2 accommodates the side shield 13C2. The groove 25c accommodates the connecting layer 51. The grooves 25a, 25b1 and 25b2 respectively correspond to the first to third grooves of the present invention.

The bottom of the groove 25a has an opening for exposing the top surface of the third layer 13A3. The grooves 25b1 and 25b2 are located near the medium facing surface 30 at positions that are symmetric with respect to the center of the groove 25a taken in the track width direction. The grooves 25b1 and 25b2 penetrate the encasing layer 25, and the bottoms of the grooves 25b1 and 25b2 are located at the same level as the top surface of the bottom shield layer 13A1. The groove 25c is located farther from the medium facing surface 30 than is the groove 25a. The groove 25c penetrates the encasing layer 25, and the edge of the groove 25c at the bottom surface of the encasing layer 25 is located directly above the edge of the opening of the top surface of the insulating layer 24 that exposes the top surface of the connecting layer 11a of the coil 11. While FIG. 1 and FIG. 2 show an example in which the groove 25a does not penetrate the encasing layer 25, the groove 25a may penetrate the encasing layer 25.

The material of the encasing layer 25 may be, for example, an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further includes a nonmagnetic layer 27 made of a nonmagnetic material and disposed in the grooves 25a and 25c of the encasing layer 25. The nonmagnetic layer 27 is disposed along the wall faces of the grooves 25a and 25c and the opening of the insulating layer 24. The nonmagnetic layer 27 has openings for exposing the top surfaces of the third layer 13A3 and the connecting portion 11a of the coil 11. The material of the nonmagnetic layer 27 may be alumina, for example.

The magnetic head further includes: a nonmagnetic metal layer 28A disposed in the groove 25a; a nonmagnetic metal layer 28B1 disposed in the groove 25b1; a nonmagnetic metal layer 28B2 disposed in the groove 25b2; and a nonmagnetic metal layer 28C disposed in the groove 25c. The nonmagnetic metal layers 28A and 28C are disposed along the surface of the nonmagnetic layer 27. The nonmagnetic metal layer 28B1 is disposed along a wall face of the groove 25b1 and the top surface of the bottom shield layer 13A1. The nonmagnetic metal layer 28B2 is disposed along a wall face of the groove 25b2 and the top surface of the bottom shield layer 13A1. The nonmagnetic metal layer 28A has an opening for exposing the top surface of the third layer 13A3. The nonmagnetic metal layer 28C has an opening for exposing the top surface of the connecting portion 11a of the coil 11. The nonmagnetic metal layers 28A, 28B1, 28B2 and 28C are each made of a nonmagnetic metal material. For example, the nonmagnetic metal layers 28A, 28B1, 28B2 and 28C are each formed of a layered film consisting of a Ta layer and a Ru layer.

The pole layer 12 is accommodated in the groove 25a such that the nonmagnetic layer 27 and the nonmagnetic metal layer 28A are interposed between the pole layer 12 and the wall faces of the groove 25a of the encasing layer 25. The pole layer 12 has a bottom surface, and a top surface opposite to the bottom surface. The bottom surface of the pole layer 12 touches the top surface of the third layer 13A3. The pole layer 12 is made of a magnetic metal material. The material of the pole layer 12 may be NiFe, CoNiFe or CoFe, for example.

The top surface of the pole layer 12 includes a first portion 12T1 and a second portion 12T2. The first portion 12T1 has a first edge located in the medium facing surface 30, and a second edge opposite to the first edge. The second portion 12T2 is located farther from the medium facing surface 30 than is the first portion 12T1, and is connected to the first portion 12T1 at the second edge. As shown in FIG. 1, the distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30.

The side shield 13C1 is accommodated in the groove 25b1 such that the nonmagnetic metal layer 28B1 is interposed between the side shield 13C1 and the wall face of the groove 25b1 of the encasing layer 25, and between the side shield 13C1 and the top surface of the bottom shield layer 13A1. The side shield 13C2 is accommodated in the groove 25b2 such that the nonmagnetic metal layer 28B2 is interposed between the side shield 13C2 and the wall face of the groove 25b2 of the encasing layer 25, and between the side shield 13C2 and the top surface of the bottom shield layer 13A1. The side shields 13C1 and 13C2 are located near the medium facing surface 30 at positions that are symmetric with respect to the center of the pole layer 12 taken in the track width direction. Each of the side shields 13C1 and 13C2 has an end face located in the medium facing surface 30. In the medium facing surface 30, the respective end faces of the side shields 13C1 and 13C2 are located on both sides of the end face of the pole layer 12 that are opposite to each other in the track width direction.

The magnetic material used to form the pole layer 12 preferably has a saturation flux density higher than that of the magnetic material used to form the side shields 13C1 and 13C2. For example, a magnetic material having a saturation flux density of approximately 2.4 T is used for the pole layer 12, while a magnetic material having a saturation flux density of approximately 2.2 T is used for the side shields 13C1 and 13C2.

The connecting layer 51 is accommodated in the groove 25c. The connecting layer 51 has a bottom surface, and a top surface opposite to the bottom surface. The bottom surface of the connecting layer 51 touches the top surface of the connecting portion 11a of the coil 11.

The magnetic head further includes an insulating layer 58 made of an insulating material and disposed on a part of the second portion 12T2 of the top surface of the pole layer 12, and a nonmagnetic metal layer 59 made of a nonmagnetic metal material and disposed on the top surface of the insulating layer 58. The insulating layer 58 is made of alumina, for example. The nonmagnetic metal layer 59 is made of Ru, NiCr or NiCu, for example.

The gap layer 14 is disposed to cover the first portion 12T1 of the top surface of the pole layer 12, and also the insulating layer 58 and the nonmagnetic metal layer 59. The gap layer 14 is made of a nonmagnetic material. The material of the gap layer 14 may be an insulating material such as alumina, or a nonmagnetic conductive material such as Ru, NiCu, Ta, W, NiB or NiP.

The second portion 13B of the shield 13 includes a top shield layer 13B1, a second layer 13B2, a third layer 13B3, a fourth layer 13B4, a fifth layer 13B5, a sixth layer 13B6, and a top yoke layer 13B7 that are magnetically coupled. The top shield layer 13B1 is disposed over the side shields 13C1 and 13C2 and the gap layer 14. The top shield layer 13B1 has an end face that is located in the medium facing surface 30 at a position forward of the end face of the pole layer 12 along the direction T of travel of the recording medium. In the medium facing surface 30, a part of the end face of the top shield layer 13B1 is located at a predetermined distance from the end face of the pole layer 12, the distance being created by the thickness of the gap layer 14. The thickness of the gap layer 14 preferably falls within the range of 5 to 60 nm, such as within the range of 30 to 60 nm. The end face of the pole layer 12 has a side adjacent to the gap layer 14, and this side defines the track width. The top shield layer 13B1 corresponds to the top shield of the present invention.

The top yoke layer 13B7 touches the top surface of the pole layer 12 at a position away from the medium facing surface 30. The connecting layer 52 is disposed on the connecting layer 51.

The magnetic head further includes a nonmagnetic layer 46 disposed around the top shield layer 13B1, the top yoke layer 13B7 and the connecting layer 52. The nonmagnetic layer 46 is made of an inorganic insulating material, for example. The inorganic insulating material may be alumina or silicon oxide, for example. The top shield layer 13B1, the top yoke layer 13B7, the connecting layer 52 and the nonmagnetic layer 46 are flattened at the top.

The second layer 13B2 is disposed on the top shield layer 13B1. The second layer 13B2 has an end face that is closer to the medium facing surface 30, and this end face is located at a distance from the medium facing surface 30. The sixth layer 13B6 is disposed on the top yoke layer 13B7. The connecting layer 53 is disposed on the connecting layer 52.

The magnetic head further includes a nonmagnetic layer 47 disposed around the second layer 13B2, the sixth layer 13B6 and the connecting layer 53. A part of the nonmagnetic layer 47 covers the end face of the second layer 13B2 that is closer to the medium facing surface 30. The nonmagnetic layer 47 is made of an inorganic insulating material, for example. The inorganic insulating material may be alumina or silicon oxide, for example. The second layer 13B2, the sixth layer 13B6, the connecting layer 53 and the nonmagnetic layer 47 are flattened at the top.

The magnetic head further includes an insulating layer 17 made of an insulating material and disposed on a part of the top surface of the nonmagnetic layer 47. The insulating layer 17 is made of alumina, for example. The second coil 18 is disposed on the insulating layer 17.

The third layer 13B3 is disposed on the second layer 13B2. The third layer 13B3 has an end face that is closer to the medium facing surface 30, and this end face is located at a distance from the medium facing surface 30. The fifth layer 13B5 is disposed on the sixth layer 13B6. The second coil 18 is wound around the fifth layer 13B5. The connecting portion 18a of the second coil 18 is disposed on the connecting layer 53.

The magnetic head further includes: an insulating layer 19 made of an insulating material and disposed around the coil 18 and in the space between every adjacent turns of the coil 18; and an insulating layer 41 made of an insulating material and disposed around the insulating layer 19, the third layer 13B3 and the fifth layer 13B5. A part of the insulating layer 19 covers the end face of the third layer 13B3 that is closer to the medium facing surface 30. The third layer 13B3, the fifth layer 13B5, the coil 18 and the insulating layers 19 and 41 are flattened at the top. The magnetic head further includes an insulating layer 20 disposed to cover the coil 18 and the insulating layer 19. The insulating layer 19 is made of photoresist, for example. The insulating layers 20 and 41 are made of alumina, for example. The coil 18 is made of a conductive material such as copper.

The fourth layer 13B4 is disposed to couple the third layer 13B3 to the fifth layer 13B5. The fourth layer 13B4 has an end face that is closer to the medium facing surface 30, and this end face is located at a distance from the medium facing surface 30.

The magnetic head further includes a protection layer 42 made of a nonmagnetic material and disposed to cover the second portion 13B. The protection layer 42 is made of, for example, an inorganic insulating material such as alumina.

As has been described, the magnetic head according to the present embodiment includes the medium facing surface 30 that faces the recording medium, the read head, and the write head. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom shield layer 3 and the top shield layer 7 for shielding the MR element 5, the shield layers 3 and 7 having respective portions that are located near the medium facing surface 30 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head includes the first coil 11, the second coil 18, the pole layer 12, the shield 13, and the gap layer 14.

The pole layer 12 is accommodated in the groove 25a of the encasing layer 25, with the nonmagnetic layer 27 and the nonmagnetic metal layer 28A therebetween. The nonmagnetic layer 27 has a thickness within the range of 40 to 200 nm, for example. The nonmagnetic metal layer 28A has a thickness within the range of 10 to 50 nm, for example.

The shield 13 includes: the first portion 13A disposed backward of the pole layer 12 along the direction T of travel of the recording medium; the second portion 13B disposed forward of the pole layer 12 along the direction T of travel of the recording medium; and the first and second side shields 13C1 and 13C2 disposed on both sides of the pole layer 12 that are opposite to each other in the track width direction. Each of the first portion 13A and the second portion 13B is connected to the pole layer 12 at a position away from the medium facing surface 30. A part of the first coil 11 passes through the space surrounded by the pole layer 12 and the first portion 13A. A part of the second coil 18 passes through the space surrounded by the pole layer 12 and the second portion 13B.

The side shields 13C1 and 13C2 are located near the medium facing surface 30 at positions that are symmetric with respect to the center of the pole layer 12 taken in the track width direction. The side shields 13C1 and 13C2 are connected to the top shield layer 13B1 of the second portion 13B.

The second portion 13B includes the top shield layer 13B1. The top shield layer 13B1 has the end face that is located in the medium facing surface 30 at a position forward of the end face of the pole layer 12 along the direction T of travel of the recording medium. In the medium facing surface 30, a part of the end face of the top shield layer 13B1 is located at a predetermined distance from the end face of the pole layer 12, the distance being created by the thickness of the gap layer 14. The end face of the pole layer 12 has a side adjacent to the gap layer 14, and this side defines the track width.

The side shields 13C1 and 13C2 may touch the top surface of the bottom shield layer 13A1. In this case, the first portion 13A and the second portion 13B of the shield 13 are magnetically coupled via the side shields 13C1 and 13C2.

A detailed description will now be given of the shapes of the pole layer 12 and the side shields 13C1 and 13C2. As shown in FIG. 3 and FIG. 4, the pole layer 12 includes a track width defining portion 12A having an end face located in the medium facing surface 30, and a wide portion 12B that is located farther from the medium facing surface 30 than is the track width defining portion 12A and that is greater in width than the track width defining portion 12A. The track width defining portion 12A has a width that does not change with the distance from the medium facing surface 30. For example, the wide portion 12B is equal in width to the track width defining portion 12A at the boundary with the track width defining portion 12A, and gradually increases in width with increasing distance from the medium facing surface 30 and then maintains a specific width to the end of the wide portion 12B. In the present embodiment, the track width defining portion 12A is a portion of the pole layer 12 from the end face located in the medium facing surface 30 to the point at which the width of the pole layer 12 starts to increase. Here, as shown in FIG. 4, the length of the track width defining portion 12A in the direction perpendicular to the medium facing surface 30 will be referred to as neck height and denoted by the symbol NH. The neck height NH falls within the range of 0.05 to 0.3 μm, for example.

As shown in FIG. 2, the end face of the pole layer 12 located in the medium facing surface 30 has: a first side A1 closest to the top surface of the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The end face of the pole layer 12 located in the medium facing surface 30 decreases in width in the track width direction (the horizontal direction in FIG. 2) with decreasing distance from the top surface of the substrate 1. Each of the third side A3 and the fourth side A4 forms an angle within the range of, for example, 5 to 15 degrees, with respect to the direction perpendicular to the top surface of the substrate 1. The length of the second side A2, that is, the track width, falls within the range of 0.05 to 0.20 μm, for example.

In the present embodiment, throat height is the distance between the medium facing surface 30 and the point at which the space between the pole layer 12 and the second portion 13B of the shield 13 starts to increase as seen from the medium facing surface 30. In the present embodiment, the throat height is equal to the distance between the medium facing surface 30 and an edge of the bottom surface of the insulating layer 58 closest to the medium facing surface 30. The throat height falls within the range of 0.05 to 0.3 μm, for example.

As shown in FIG. 1, the top surface of the pole layer 12 includes the first portion 12T1 and the second portion 12T2. The first portion 12T1 has the first edge located in the medium facing surface 30, and the second edge opposite to the first edge. The second portion 12T2 is located farther from the medium facing surface 30 than is the first portion 12T1, and is connected to the first portion 12T1 at the second edge. The distance from the top surface of the substrate 1 to an arbitrary point on the first portion 12T1 decreases with decreasing distance from the arbitrary point to the medium facing surface 30. The second portion 12T2 extends in a direction substantially perpendicular to the medium facing surface 30. The first portion 12T1 forms an angle within the range of, for example, 10 to 45 degrees, with respect to the direction perpendicular to the medium facing surface 30.

As shown in FIG. 5, the end face of the side shield 13C1 located in the medium facing surface 30 has a side B1 that is closer to the pole layer 12. The end face of the side shield 13C2 located in the medium facing surface 30 has a side B2 that is closer to the pole layer 12. The distance between the third side A3 of the end face of the pole layer 12 and the side B1 of the end face of the side shield 13C1 and the distance between the fourth side A4 of the end face of the pole layer 12 and the side B2 of the end face of the side shield 13C2 are preferably equal at the same positions in the direction perpendicular to the top surface of the substrate 1 (the vertical direction in FIG. 5). In the example shown in FIG. 5, the sides B1 and B2 are perpendicular to the top surface of the substrate 1. However, the sides B1 and B2 may be inclined with respect to the direction perpendicular to the top surface of the substrate 1.

As shown in FIG. 5, the distance between the upper end of the third side A3 and the side B1 of the end face of the side shield 13C1 will be denoted as SG1 (ditto for the distance between the upper end of the fourth side A4 and the side B2 of the end face of the side shield 13C2). The distance between the lower end of the third side A3 and the side B1 of the end face of the side shield 13C1 will be denoted as SG2 (ditto for the distance between the lower end of the fourth side A4 and the side B2 of the end face of the side shield 13C2). The dimension of the end face of each of the side shields 13C1 and 13C2 located in the medium facing surface 30 taken in the direction perpendicular to the top surface of the substrate 1 (the vertical direction in FIG. 5) will be denoted as SSD. The dimension of the end face of the pole layer 12 located in the medium facing surface 30 taken in the direction perpendicular to the top surface of the substrate 1 will be denoted as PT. The distance between the first side A1 of the end face of the pole layer 12 and the top surface of the bottom shield layer 13A1 will be denoted as LG. SG1 falls within the range of 0.02 to 1.00 μm, for example. SG2 falls within the range of 0.02 to 1.00 μm, for example. SSD falls within the range of 0.05 to 1.50 μm, for example. PT falls within the range of 0.05 to 1.50 μm, for example. LG falls within the range of 0 to 1.30 μm, for example. As shown in FIG. 4, the maximum length of each of the side shields 13C1 and 13C2 in the direction perpendicular to the medium facing surface 30 will be denoted as STH. STH falls within the range of 0.05 to 1.00 μm, for example.

The operation and effects of the magnetic head according to the present embodiment will now be described. In this magnetic head, the write head writes data on a recording medium while the read head reads data written on the recording medium. In the write head, the coils 11 and 18 produce magnetic fields corresponding to data to be written on the recording medium. A magnetic flux corresponding to the magnetic field produced by the coil 11 passes through the first portion 13A of the shield 13 and the pole layer 12. A magnetic flux corresponding to the magnetic field produced by the coil 18 passes through the second portion 13B of the shield 13 and the pole layer 12. The pole layer 12 thus allows the magnetic flux corresponding to the magnetic field produced by the coil 11 and the magnetic flux corresponding to the magnetic field produced by the coil 18 to pass.

The coils 11 and 18 may be connected in series or in parallel. In either case, the coils 11 and 18 are connected such that the magnetic flux corresponding to the magnetic field produced by the coil 11 and the magnetic flux corresponding to the magnetic field produced by the coil 18 flow in the same direction through the pole layer 12.

The pole layer 12 allows the magnetic fluxes corresponding to the magnetic fields produced by the coils 11 and 18 to pass as mentioned above, and produces a write magnetic field used for writing data on the recording medium by means of the perpendicular magnetic recording system.

The shield 13 takes in a disturbance magnetic field applied to the magnetic head from outside of the magnetic head. This makes it possible to prevent erroneous writing on the recording medium induced by the disturbance magnetic field intensively taken into the pole layer 12. Furthermore, the shield 13 has the function of taking in a magnetic flux that is generated from the end face of the pole layer 12 and that expands in directions except the direction perpendicular to the plane of the recording medium, and thus preventing this magnetic flux from reaching the recording medium. The shield 13 also has the function of returning a magnetic flux that has been generated from the end face of the pole layer 12 and has magnetized the recording medium.

The shield 13 includes: the first portion 13A disposed backward of the pole layer 12 along the direction T of travel of the recording medium; the second portion 13B disposed forward of the pole layer 12 along the direction T of travel of the recording medium; and the first and second side shields 13C1 and 13C2 disposed on both sides of the pole layer 12 that are opposite to each other in the track width direction.

Consequently, according to the present embodiment, in regions both backward and forward of the end face of the pole layer 12 along the direction T of travel of the recording medium and in regions on both sides of the end face of the pole layer 12 that are opposite to each other in the track width direction, it is possible to take in the magnetic flux that is generated from the end face of the pole layer 12 and that expands in directions except the direction perpendicular to the plane of the recording medium, and to thereby prevent this magnetic flux from reaching the recording medium. Thus, according to the present embodiment, it is possible to suppress the occurrence of adjacent track erasing, and it is also possible to suppress, over a wide range along the track width direction, a phenomenon of attenuation of signals written on one or more tracks adjacent to a track targeted for writing or reading. Furthermore, by virtue of the side shields 13C1 and 13C2, the present embodiment particularly allows suppression of adjacent track erasing with higher reliability, compared with a case without the side shields 13C1 and 13C2.

In the present embodiment, as shown in FIG. 2, the end face of the pole layer 12 located in the medium facing surface 30 decreases in width in the track width direction with decreasing distance from the top surface of the substrate 1. According to the present embodiment, it is thus possible to suppress the occurrence of adjacent track erasing resulting from the skew.

In the present embodiment, the top surface of the pole layer 12 includes: the first portion 12T1 having the first edge located in the medium facing surface 30 and the second edge opposite to the first edge; and the second portion 12T2 that is located farther from the medium facing surface 30 than is the first portion 12T1 and connected to the first portion 12T1 at the second edge. The distance from the top surface of the substrate 1 to an arbitrary point on the first portion 12T1 decreases with decreasing distance from the arbitrary point to the medium facing surface 30. According to the present embodiment, it is thus possible to suppress the occurrence of adjacent track erasing resulting from the skew and to guide a magnetic flux of great magnitude to the medium facing surface 30 through the pole layer 12. This contributes to improved write characteristics (overwrite property).

A manufacturing method for the magnetic head according to the present embodiment will now be described. In the manufacturing method for the magnetic head according to the present embodiment, first, as shown in FIG. 1 and FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7 and the nonmagnetic layer 8 are formed in this order on the top shield gap film 6.

Next, the second layer 13A2 of the first portion 13A of the shield 13 is formed on the nonmagnetic layer 8 by, for example, frame plating. Next, the insulating layer 21 is formed over the entire top surface of the stack. Next, the insulating layer 21 is polished by, for example, chemical mechanical polishing (hereinafter referred to as CMP) until the second layer 13A2 is exposed, whereby the second layer 13A2 and the insulating layer 21 are flattened at the top.

Next, the insulating layer 22 is formed on areas of the top surfaces of the second layer 13A2 and the insulating layer 21 over which the coil 11 is to be disposed later. Next, the coil 11 is formed on the insulating layer 22 by, for example, frame plating. Next, the bottom shield layer 13A1 and the third layer 13A3 are formed on the second layer 13A2 by, for example, frame plating. The coil 11 may be formed after forming the bottom shield layer 13A1 and the third layer 13A3, however.

Next, the insulating layer 23 is formed around the coil 11 and the third layer 13A3 and in the space between every adjacent turns of the coil 11. Next, the insulating layer 24 is formed over the entire top surface of the stack. Next, the insulating layer 24 is polished by, for example, CMP until the bottom shield layer 13A1 and the third layer 13A3 are exposed, whereby the bottom shield layer 13A1, the third layer 13A3 and the insulating layer 24 are flattened at the top.

Reference is now made to FIG. 6A to 19A, FIG. 6B to FIG. 19B and FIG. 19C to describe a series of steps until the formation of the pole layer 12 after the foregoing step. FIG. 6A to FIG. 19A, FIG. 6B to FIG. 19B and FIG. 19C each show a stack of layers formed in the course of manufacturing the magnetic head. Each of FIG. 6A to FIG. 19A shows the top surface of part of the stack. Each of FIG. 6B to FIG. 19B shows a cross section of the stack taken at the position where the medium facing surface 30 is to be formed. FIG. 19C shows a cross section of the stack taken at the position designated by line 19C-19C of FIG. 19A. Portions closer to the substrate 1 than the insulating layer 21 are omitted in FIG. 6B. Portions closer to the substrate 1 than the bottom shield layer 13A1 are omitted in FIG. 7B to FIG. 19B and FIG. 19C. In FIG. 6A to FIG. 19A and FIG. 19C, the symbol "ABS" indicates the position where the medium facing surface 30 is to be formed.

Figure 6A:
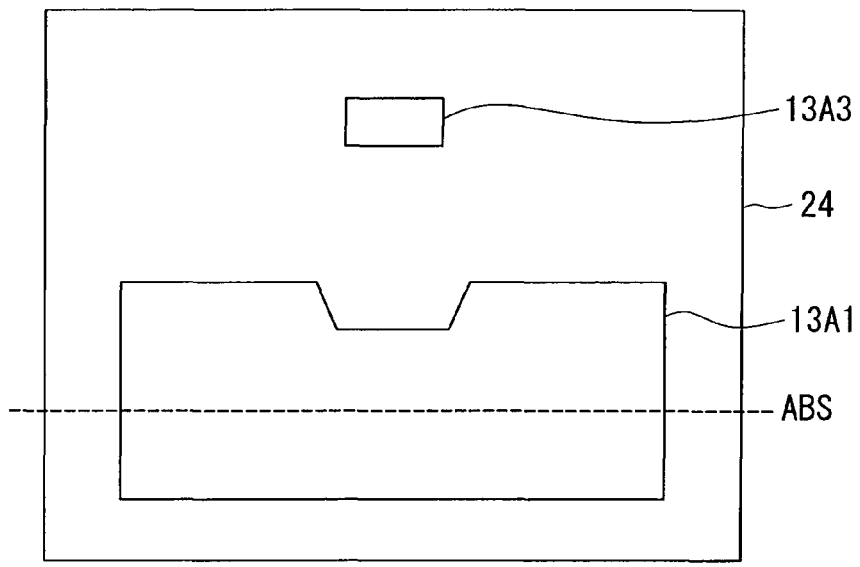
FIG. 6A and FIG. 6B are explanatory diagrams showing a step of a manufacturing method for the magnetic head according to the first embodiment of the invention.
Figure 6B:
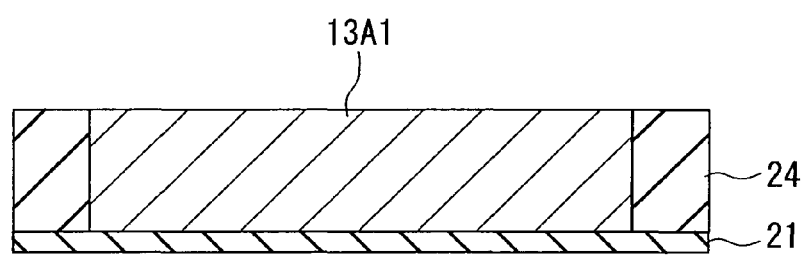

FIG. 6A and FIG. 6B show the stack in which the bottom shield layer 13A1, the third layer 13A3 and the insulating layer 24 have been flattened at the top.

Figure 7A:
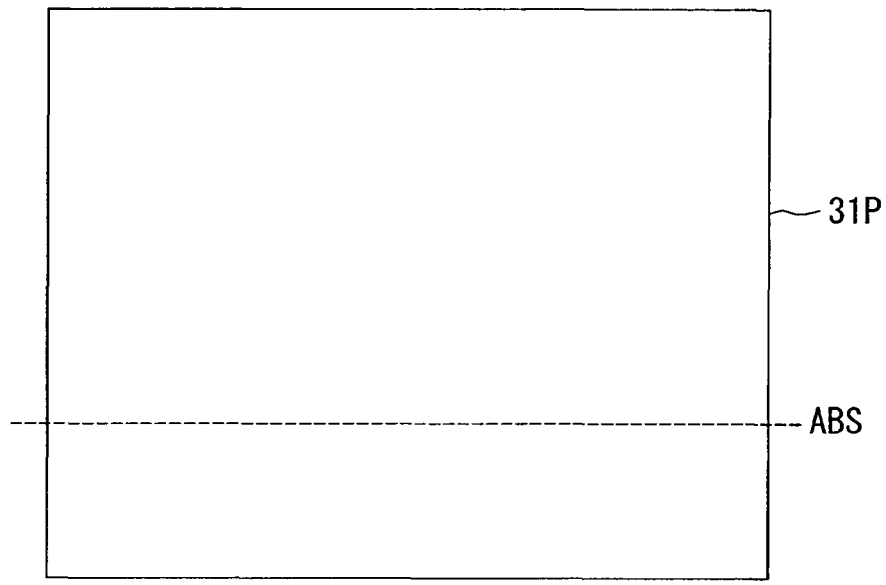
FIG. 7A and FIG. 7B are explanatory diagrams showing a step that follows the step of FIG. 6A and FIG. 6B.
Figure 7B:
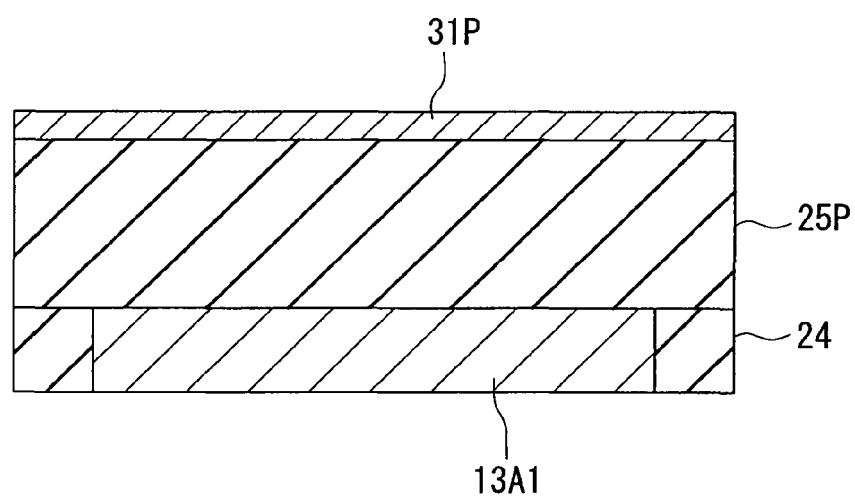

FIG. 7A and FIG. 7B show the next step. In this step, first, a nonmagnetic layer 25P is formed over the entire top surface of the stack by, for example, sputtering. The nonmagnetic layer 25P is to become the encasing layer 25 through formation of the grooves 25a, 25b1, 25b2 and 25c therein later. The nonmagnetic layer 25P has a thickness of 0.2 µm or greater, for example. Next, a nonmagnetic metal layer 31P made of a nonmagnetic metal material is formed over the entire top surface of the stack by, for example, sputtering. For example, the nonmagnetic metal layer 31P is formed of a Ru layer or a layered film consisting of a Ru layer and a NiCr layer. The nonmagnetic metal layer 31P has a thickness within the range of 20 to 50 nm, for example.

Figure 8A:
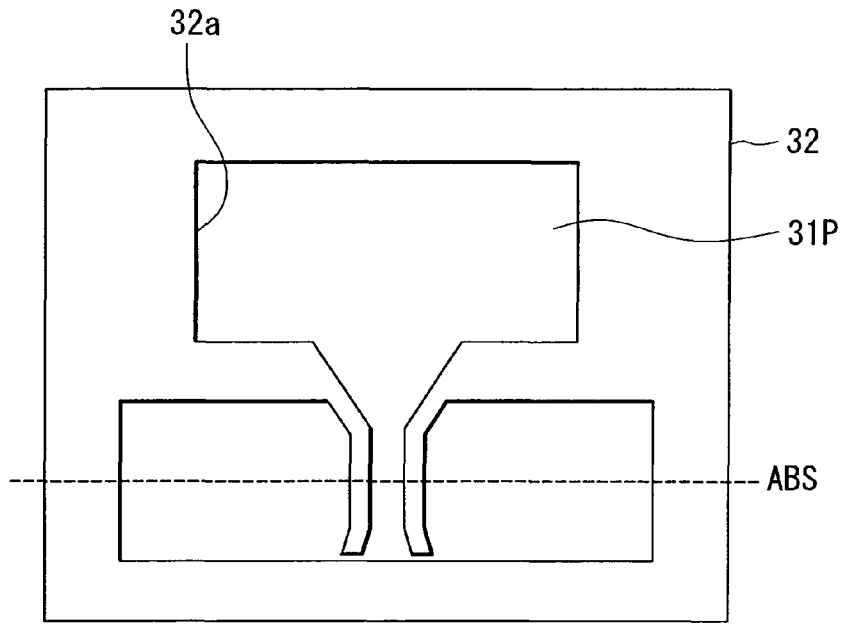
FIG. 8A and FIG. 8B are explanatory diagrams showing a step that follows the step of FIG. 7A and FIG. 7B.
Figure 8B:
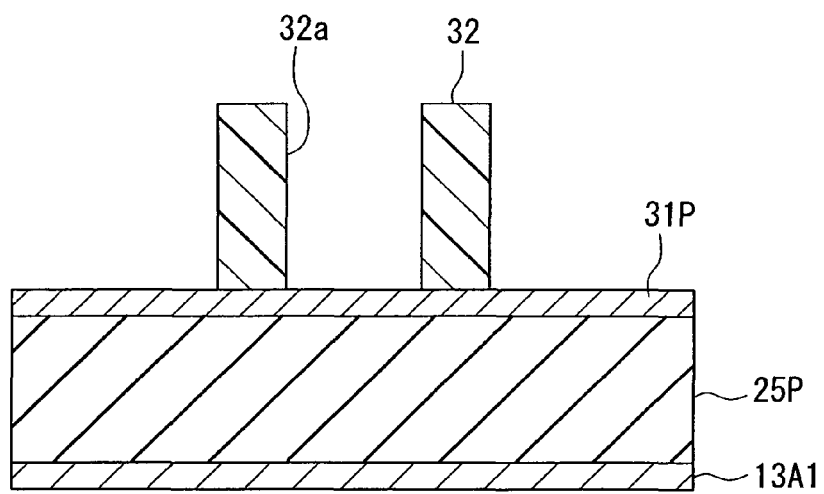

FIG. 8A and FIG. 8B show the next step. In this step, a photoresist layer is formed on the nonmagnetic metal layer 31P and it is patterned by photolithography to thereby form a photoresist mask 32 that is to be used when etching the nonmagnetic metal layer 31P later. More specifically, in this step, the photoresist layer is initially formed on the nonmagnetic metal layer 31P. Next, the photoresist layer is selectively exposed using a photomask. Next, the photoresist layer thus exposed is developed. The photoresist layer remaining after the development makes the photoresist mask 32.

The photoresist mask 32 has an opening 32a including three portions that have shapes corresponding to the respective planar shapes (shapes as seen from above) of the grooves 25a, 25b1 and 25b2 to be formed later, and an opening that is not shown and that has a shape corresponding to the planar shape of the groove 25c to be formed later. When patterning the photoresist layer by photolithography, optical proximity correction (hereinafter referred to as OPC) may be employed to form the photoresist mask 32 into a shape closer to a desired one. The OPC will be described in detail later.

Figure 9A:
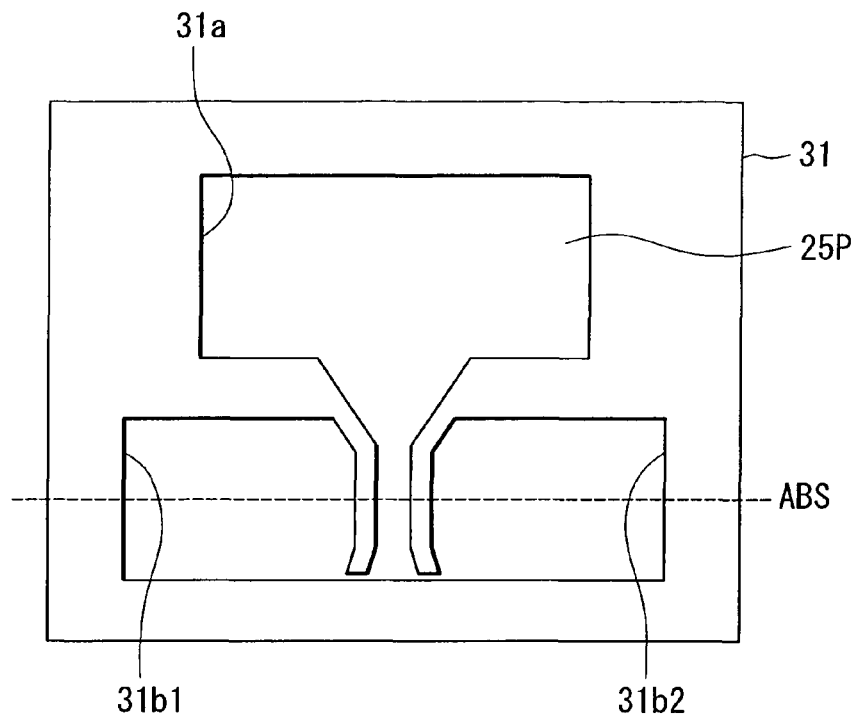
FIG. 9A and FIG. 9B are explanatory diagrams showing a step that follows the step of FIG. 8A and FIG. 8B.
Figure 9B:
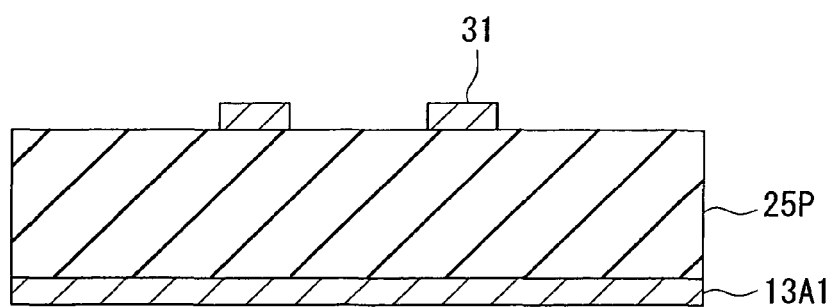

FIG. 9A and FIG. 9B show the next step. In this step, first, the nonmagnetic metal layer 31P is subjected to etching, particularly dry etching such as ion milling, using the photoresist mask 32 to thereby form in the nonmagnetic metal layer 31P openings 31a, 31b1 and 31b2 that have shapes corresponding to the respective planar shapes of the grooves 25a, 25b1 and 25b2 to be formed later, and an opening that is not shown and that has a shape corresponding to the planar shape of the groove 25c to be formed later. The nonmagnetic metal layer 31P remaining after the etching makes an etching mask layer 31 made of the nonmagnetic metal material. The openings 31a, 31b1 and 31b2 correspond to the first to third openings of the present invention.

When forming the etching mask layer 31 by etching the nonmagnetic metal layer 31P through ion milling using the photoresist mask 32, a three-step etching as described below may be performed. In the first step, etching is performed such that the direction of travel of the ion beams forms zero degree with respect to the direction perpendicular to the top surface of the substrate 1. In the next step, etching is performed such that the direction of travel of the ion beams forms an angle of 45 to 75 degrees with respect to the direction perpendicular to the top surface of the substrate 1 and rotates as seen in the direction perpendicular to the top surface of the substrate 1. In the final step, etching is performed such that the direction of travel of the ion beams forms zero degree with respect to the direction perpendicular to the top surface of the substrate 1. The final step has the function of removing a deposition film formed by substances that separated from the nonmagnetic metal layer 31P due to the etching and that have adhered to the sidewalls of the openings of the photoresist mask 32 and the etching mask layer 31. The three-step etching described above allows accurate formation of the etching mask layer 31 and, in particular, makes it possible to reduce and accurately define the width of the portion of the etching mask layer 31 that defines SG1 shown in FIG. 5.

Figure 10A:
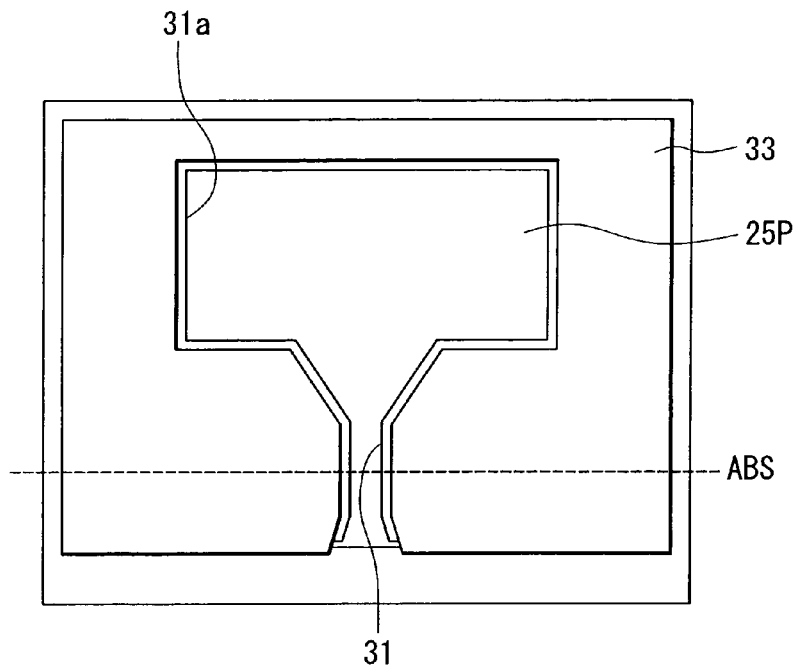
FIG. 10A and FIG. 10B are explanatory diagrams showing a step that follows the step of FIG. 9A and FIG. 9B.
Figure 10B:
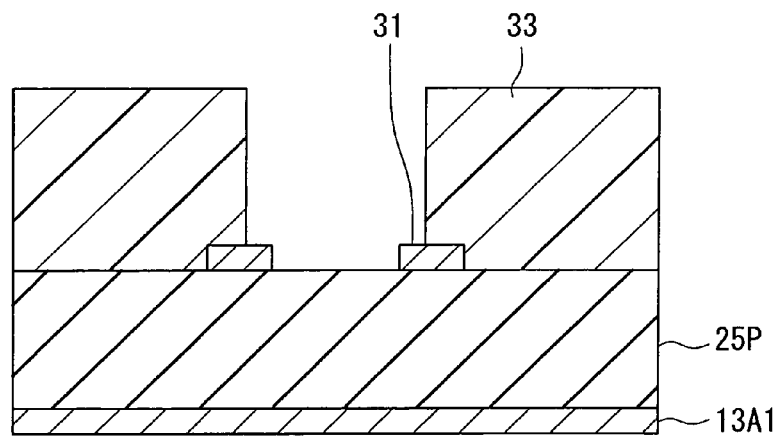

FIG. 10A and FIG. 10B show the next step. In this step, a photoresist layer is formed over the entire top surface of the stack and it is patterned to thereby form a photoresist mask 33. Of the etching mask layer 31, the openings 31b1 and 31b2 are covered with the photoresist mask 33 but the opening 31a and the not-shown opening that corresponds to the groove 25c are not covered with the photoresist mask 33. The photoresist mask 33 corresponds to the first mask of the present invention. Hereinafter, the photoresist mask 33 will also be referred to as the first mask 33.

Figure 11A:
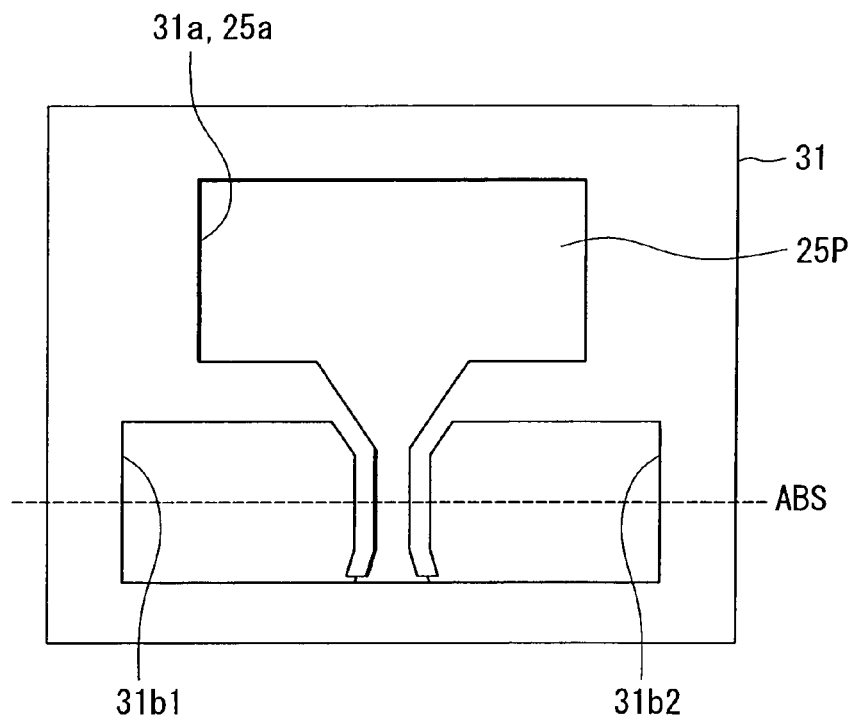
FIG. 11A and FIG. 11B are explanatory diagrams showing a step that follows the step of FIG. 10A and FIG. 10B.
Figure 11B:
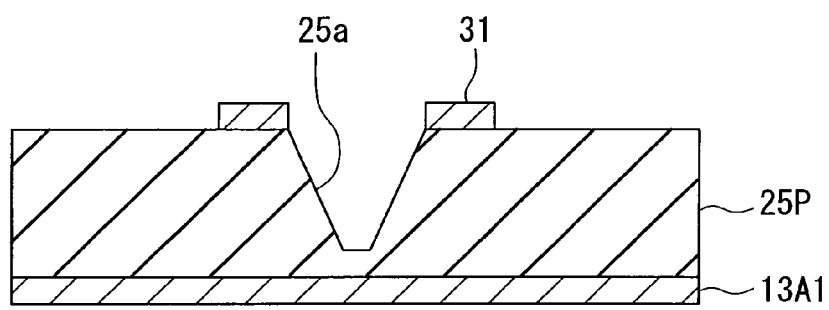

FIG. 11A and FIG. 11B show the next step. In this step, first, the nonmagnetic layer 25P is selectively etched by dry etching such as reactive ion etching (hereinafter referred to as RIE) using the opening 31a of the etching mask layer 31 and the not-shown opening of the etching mask layer 31 that corresponds to the groove 25c, with the openings 31b1 and 31b2 of the etching mask layer 31 covered with the photoresist mask 33. The grooves 25a and 25c are thereby formed in the nonmagnetic layer 25P. Here, the etching is performed so that the wall faces of the groove 25a corresponding to both sides of the track width defining portion 12A of the pole layer 12 each form an angle of, for example, 5 to 15 degrees with respect to the direction perpendicular to the top surface of the substrate 1. A gas containing Cl2 and BCl3 is used as an etching gas when etching the nonmagnetic layer 25P by RIE. In the etching gas, the proportion of the flow rate of BCl3 in the entire flow rate is 50% to 90%, for example. The temperature of the stack when etching the nonmagnetic layer 25P by RIE is preferably 100° C. or lower. Next, the photoresist mask 33 is removed.

Figure 12A:
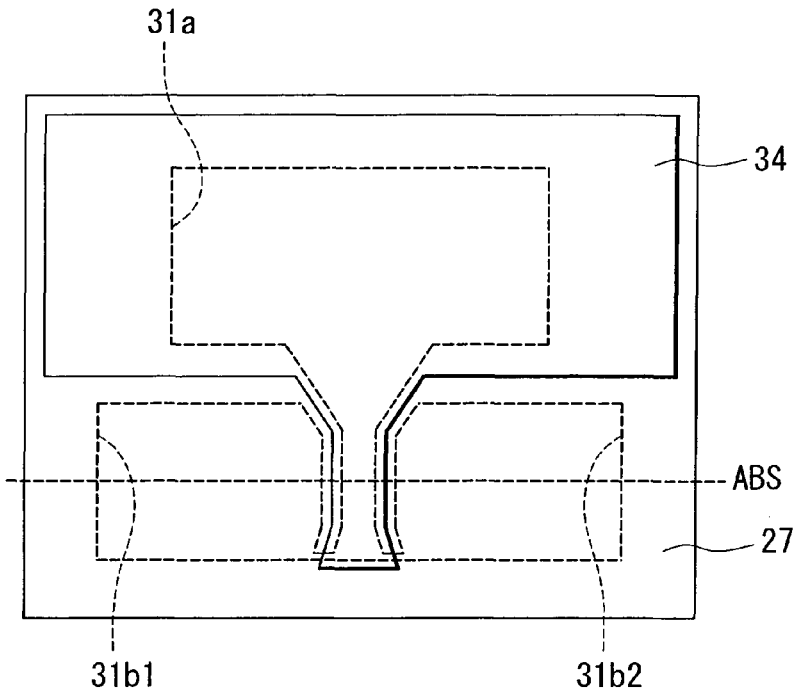
FIG. 12A and FIG. 12B are explanatory diagrams showing a step that follows the step of FIG. 11A and FIG. 11B.
Figure 12B:
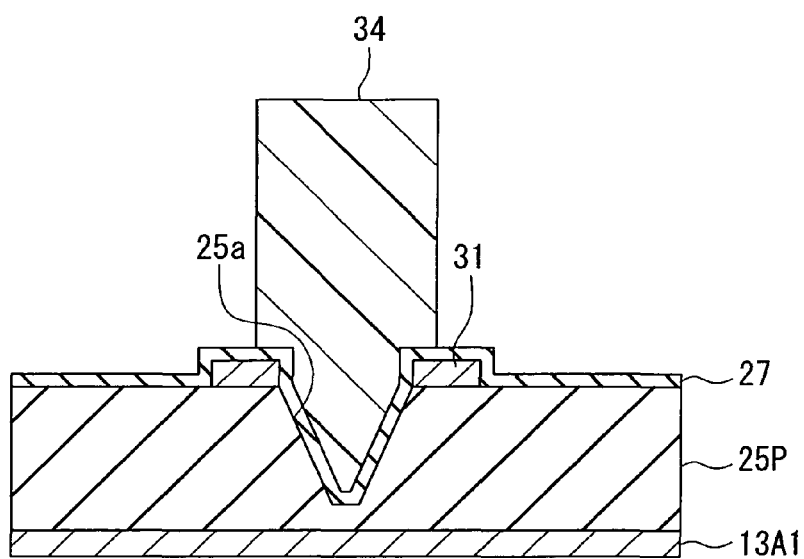

FIG. 12A and FIG. 12B show the next step. In this step, first, the nonmagnetic layer 27 is formed over the entire top surface of the stack. The nonmagnetic layer 27 is formed also in the grooves 25a and 25c. The nonmagnetic layer 27 is formed by sputtering, chemical vapor deposition (CVD) or atomic layer deposition (ALD), for example. Next, a photoresist layer is formed over the entire top surface of the stack and it is patterned to thereby form a photoresist mask 34. Of the etching mask layer 31, the opening 31a and the not-shown opening that corresponds to the groove 25c are covered with the photoresist mask 34 but the openings 31b1 and 31b2 are not covered with the photoresist mask 34. The photoresist mask 34 corresponds to the second mask of the present invention. Hereinafter, the photoresist mask 34 will also be referred to as the second mask 34.

Figure 13A:
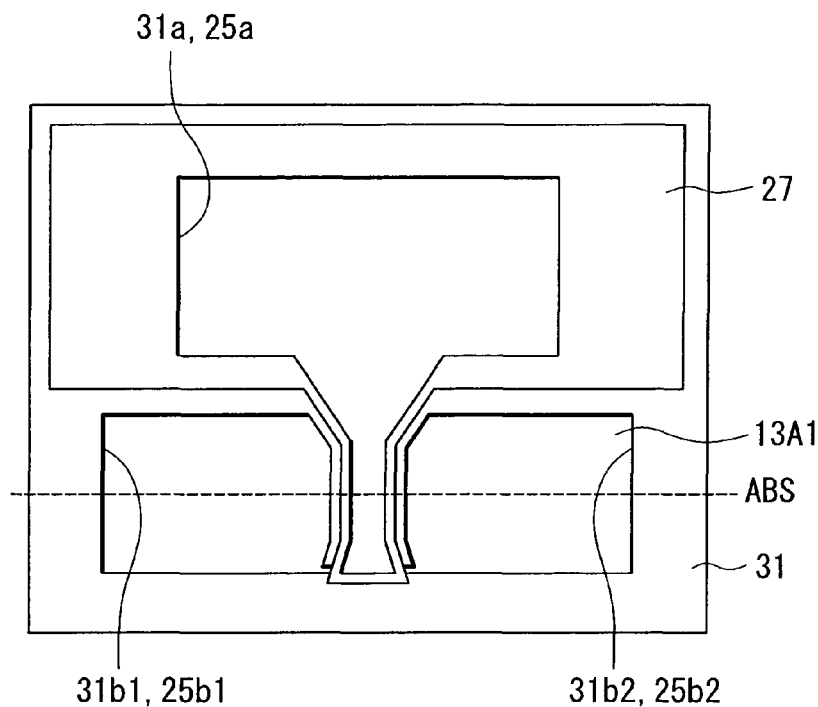
FIG. 13A and FIG. 13B are explanatory diagrams showing a step that follows the step of FIG. 12A and FIG. 12B.
Figure 13B:
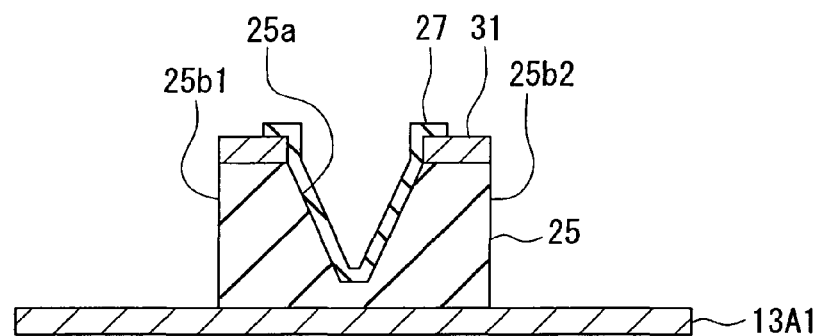

FIG. 13A and FIG. 13B show the next step. In this step, first, the nonmagnetic layer 25P and the nonmagnetic layer 27 are selectively etched by dry etching such as RIE using the openings 31b1 and 31b2 of the etching mask layer 31, with the opening 31a of the etching mask layer 31 and the not-shown opening of the etching mask layer 31 that corresponds to the groove 25c covered with the photoresist mask 34, so that the grooves 25b1 and 25b2 are formed in the nonmagnetic layer 25P. The remaining nonmagnetic layer 25P thereby makes the encasing layer 25. Next, the photoresist mask 34 is removed.

Figure 14A:
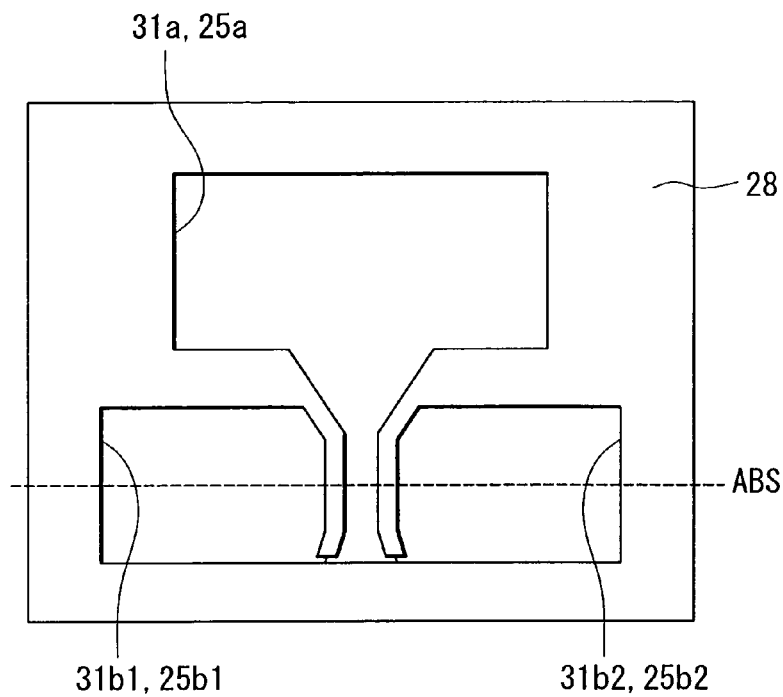
FIG. 14A and FIG. 14B are explanatory diagrams showing a step that follows the step of FIG. 13A and FIG. 13B.
Figure 14B:
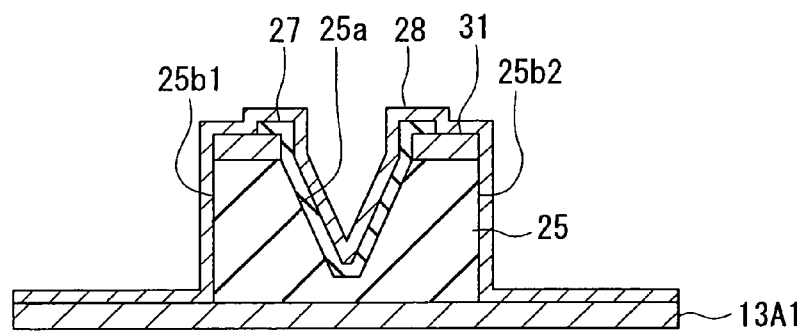

FIG. 14A and FIG. 14B show the next step. In this step, first, a nonmagnetic metal film 28 is formed over the entire top surface of the stack by, for example, sputtering. The nonmagnetic metal film 28 is formed also in the grooves 25a, 25b1, 25b2 and 25c. For example, the nonmagnetic metal film 28 is formed of a layered film consisting of a Ta layer and a Ru layer. The nonmagnetic metal film 28 is used as an electrode and a seed layer when forming the pole layer 12 later by plating.

Figure 15A:
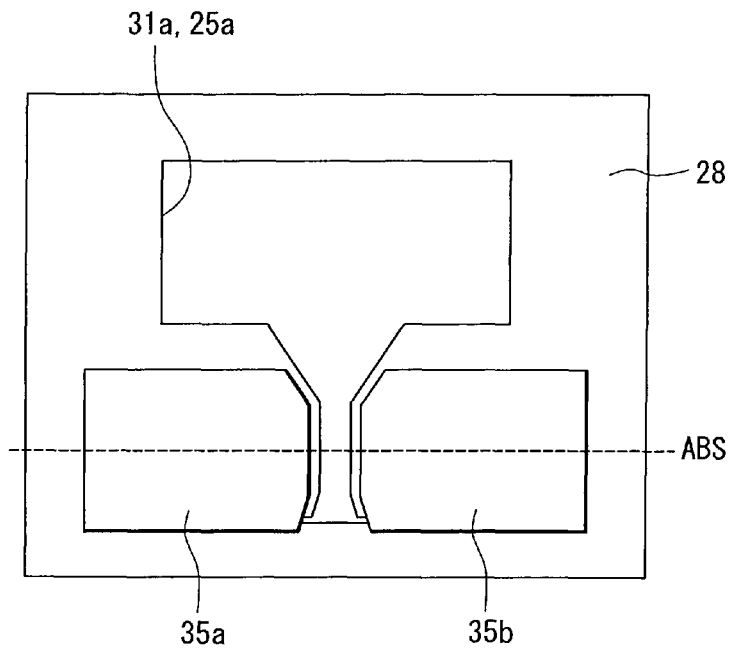
FIG. 15A and FIG. 15B are explanatory diagrams showing a step that follows the step of FIG. 14A and FIG. 14B.
Figure 15B:
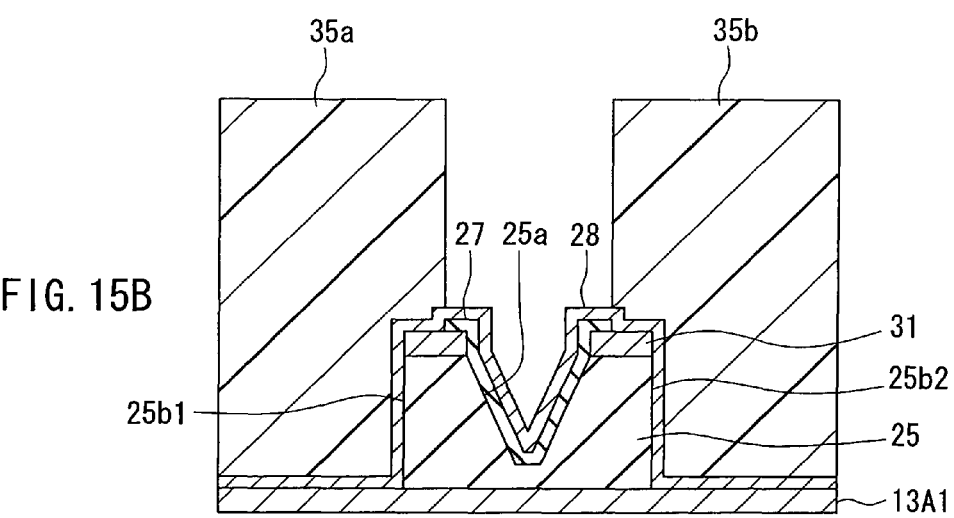

FIG. 15A and FIG. 15B show the next step. In this step, first, a photoresist layer is formed over the entire top surface of the stack and it is patterned to thereby form two photoresist masks 35a and 35b. The photoresist mask 35a covers the groove 25b1 while the photoresist mask 35b covers the groove 25b2. There exists no photoresist mask covering the grooves 25a and 25c.

Figure 16A:
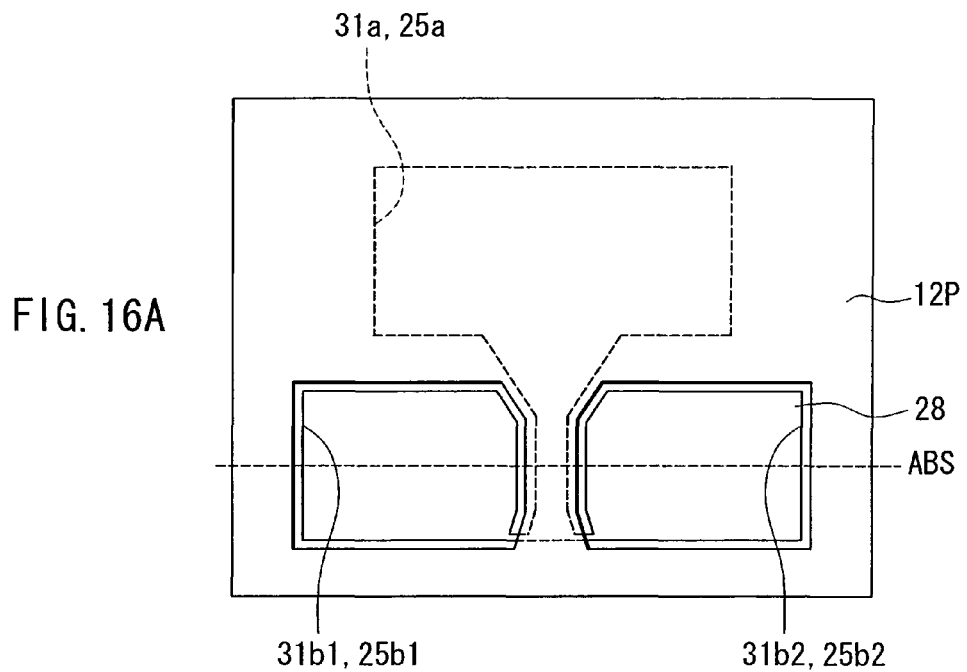
FIG. 16A and FIG. 16B are explanatory diagrams showing a step that follows the step of FIG. 15A and FIG. 15B.
Figure 16B:
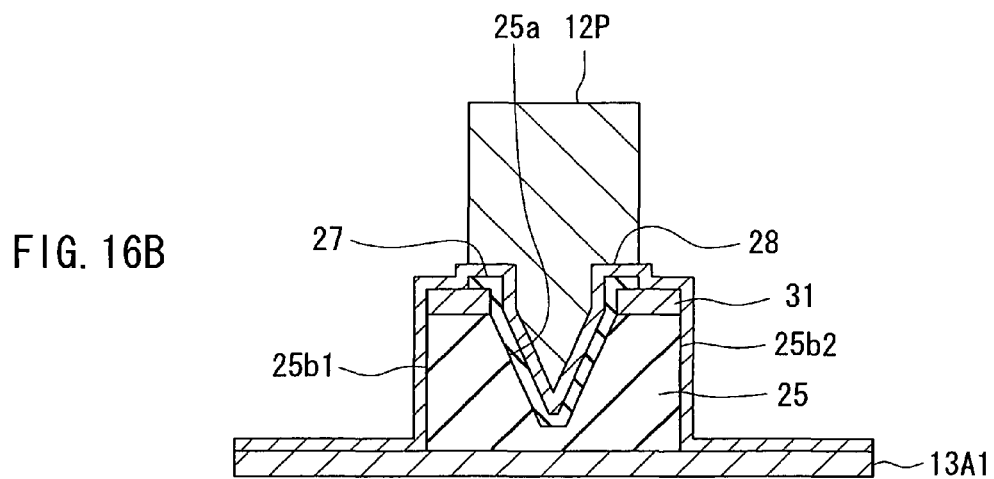

FIG. 16A and FIG. 16B show the next step. In this step, first, the bottom of the groove 25a, the nonmagnetic layer 27 and the nonmagnetic metal film 28 are selectively etched to form therein an opening for exposing the top surface of the third layer 13A3. At the same time, the insulating layer 24, the nonmagnetic layer 27 and the nonmagnetic metal film 28 are selectively etched to form therein an opening for exposing the top surface of the connecting portion 11a of the coil 11. Next, a magnetic layer 12P, which is to make the pole layer 12 and the connecting layer 51 later, is formed by plating using the nonmagnetic metal film 28 as an electrode and a seed layer. The magnetic layer 12P is formed to fill the grooves 25a and 25c and to have a top surface located at a higher level than the top surface of the portion of the nonmagnetic metal film 28 that lies above the etching mask layer 31. Next, the photoresist masks 35a and 35b are removed.

Figure 17A:
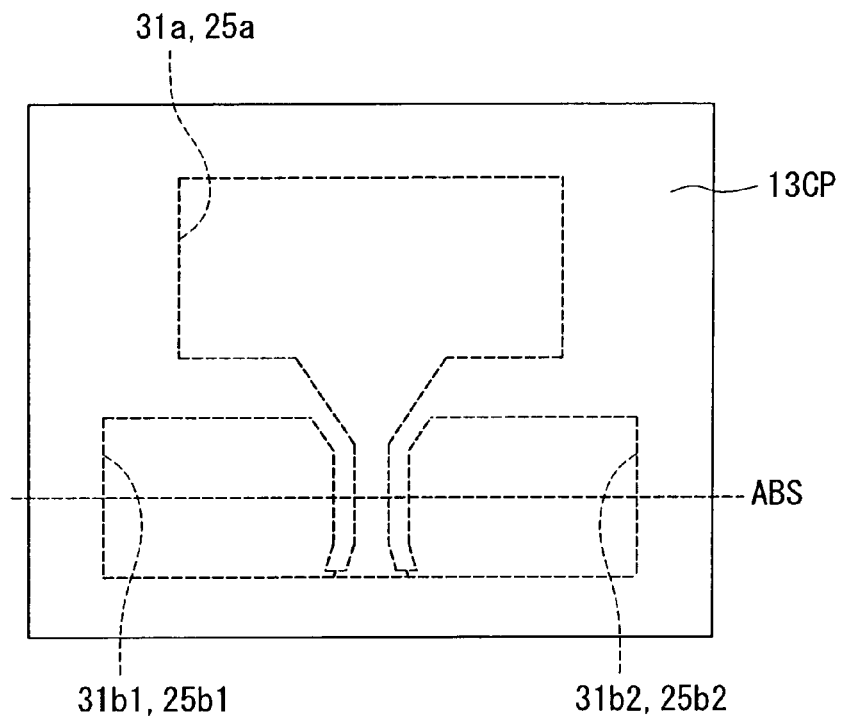
FIG. 17A and FIG. 17B are explanatory diagrams showing a step that follows the step of FIG. 16A and FIG. 16B.
Figure 17B:
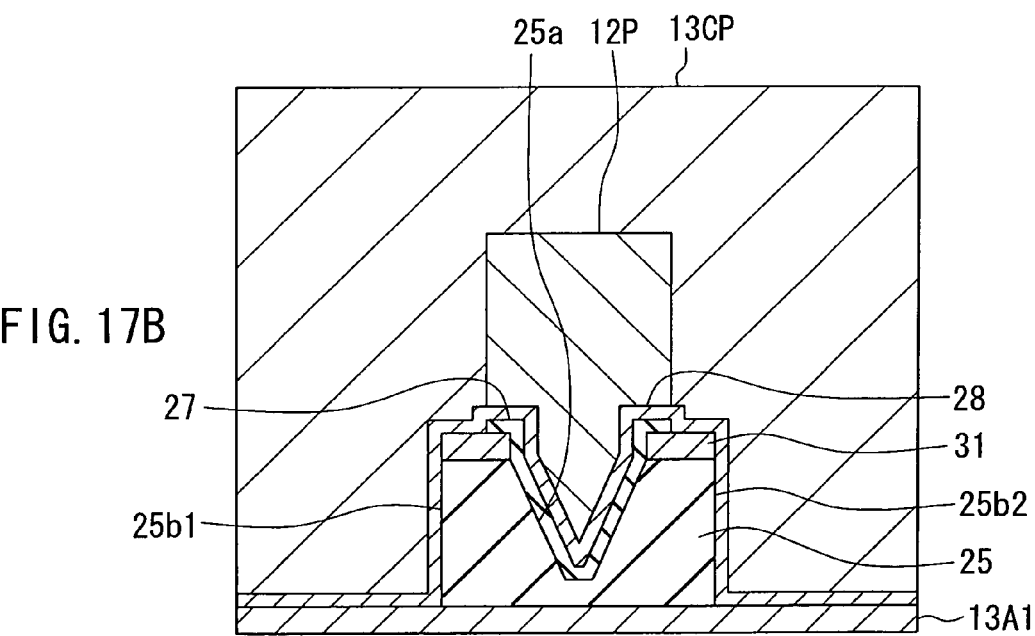

FIG. 17A and FIG. 17B show the next step. In this step, first, a magnetic layer 13CP, which is to make the side shields 13C1 and 13C2 later, is formed by plating using the nonmagnetic metal film 28 as an electrode and a seed layer. The magnetic layer 13CP is formed to fill the grooves 25b1 and 25b2 and to have a top surface located at a higher level than the top surface of the portion of the nonmagnetic metal film 28 that lies above the etching mask layer 31.

Figure 18A:
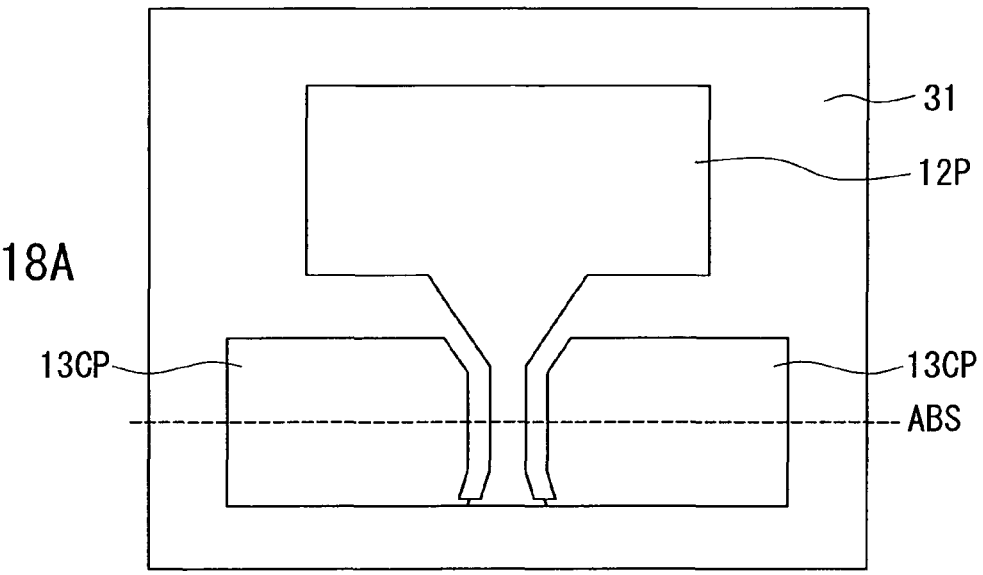
FIG. 18A and FIG. 18B are explanatory diagrams showing a step that follows the step of FIG. 17A and FIG. 17B.
Figure 18B:
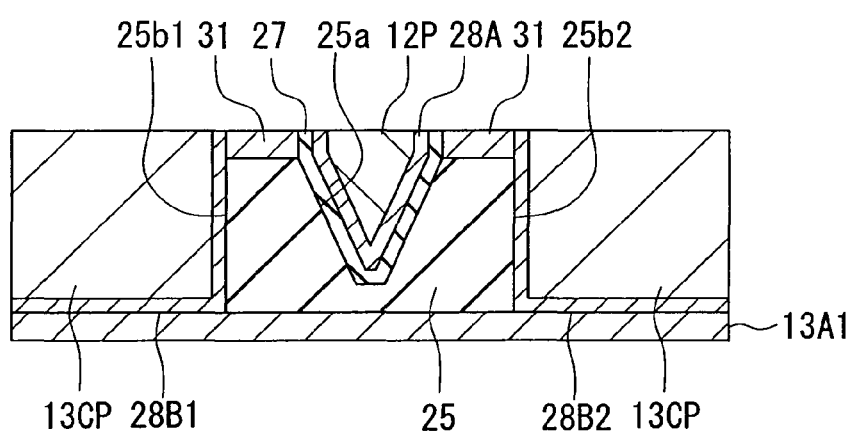

FIG. 18A and FIG. 18B show the next step. In this step, first, the magnetic layers 12P, 13CP and so on are polished by, for example, CMP until the nonmagnetic metal film 28 is exposed, whereby the magnetic layers 12P and 13CP and the nonmagnetic metal film 28 are flattened at the top. Next, the magnetic layers 12P, 13CP, the nonmagnetic metal film 28 and the nonmagnetic layer 27 are partially etched by, for example, ion milling, so that the magnetic layers 12P and 13CP and the etching mask layer 31 are flattened at the top. This separates the magnetic layer 12P remaining in the grooves 25a and 25c from the magnetic layer 13CP remaining in the grooves 25b1 and 25b2. Of the nonmagnetic metal film 28, the portion remaining in the groove 25a makes the nonmagnetic metal layer 28A, the portion remaining in the groove 25b1 makes the nonmagnetic metal layer 28B1, the portion remaining in the groove 25b2 makes the nonmagnetic metal layer 28B2, and the portion remaining in the groove 25c makes the nonmagnetic metal layer 28C.

Figure 19A:
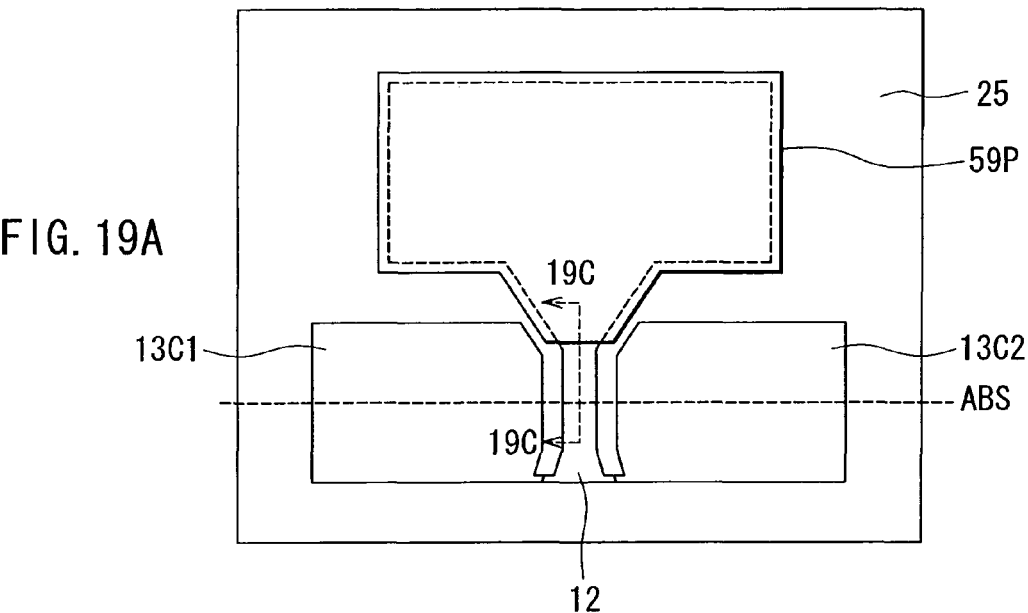
FIG. 19A to FIG. 19C are explanatory diagrams showing a step that follows the step of FIG. 18A and FIG. 18B.
Figure 19B:
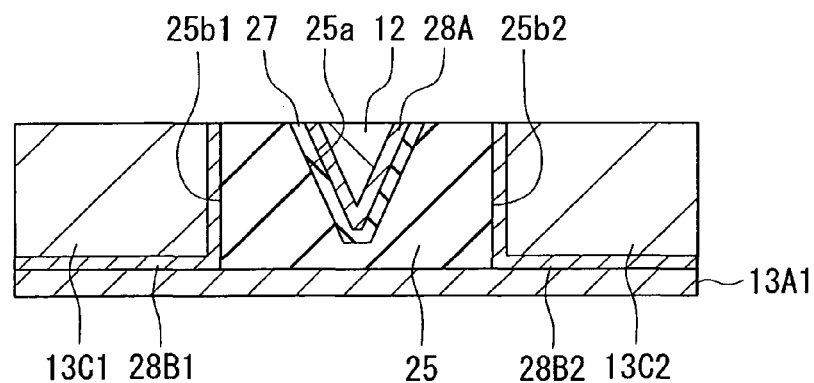
Figure 19C:
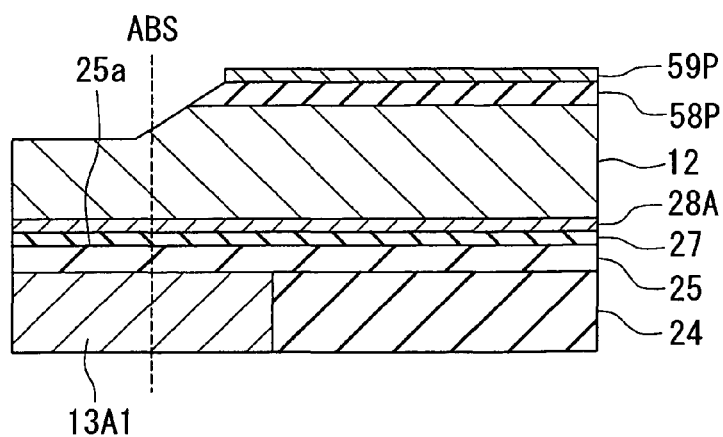

FIG. 19A to FIG. 19C show the next step. In this step, first, mask layers 58P and 59P that are stacked are formed on the portion of the magnetic layer 12P remaining in the groove 25a. The mask layer 58P is to become the insulating layer 58 later, and the mask layer 59P is to become the nonmagnetic metal layer 59 later. The mask layers 58P and 59P are formed by, for example, etching and thereby patterning a layered film formed by sputtering. The mask layers 58P and 59P cover a portion of the top surface of the magnetic layer 12P, the portion being intended to become the second portion 12T2 of the top surface of the pole layer 12. An edge of the mask layer 58P that is closer to the position ABS at which the medium facing surface 30 is to be formed defines the position of the boundary between the first portion 12T1 and the second portion 12T2 of the top surface of the pole layer 12. Next, the magnetic layers 12P and 13CP and the etching mask layer 31 are partially etched by, for example, ion milling using the mask layers 58P and 59P. This forms the first portion 12T1 and the second portion 12T2 in the top surface of the portion of the magnetic layer 12P remaining in the groove 25a. The portion of the magnetic layer 12P remaining in the groove 25a thereby makes the pole layer 12. The portion of the magnetic layer 12P remaining in the groove 25c makes the connecting layer 51. Of the magnetic layer 13CP, the portion remaining in the groove 25b1 makes the side shield 13C1 while the portion remaining in the groove 25b2 makes the side shield 13C2.

Steps until completion of the magnetic head after the step of FIG. 19A to FIG. 19C will now be described with reference to FIG. 1 and FIG. 2. After the step of FIG. 19A to FIG. 19C, first, the gap layer 14 is formed over the entire top surface of the stack by, for example, sputtering or CVD. Next, the gap layer 14 and the mask layers 58P and 59P are selectively etched by, for example, ion milling, so as to expose the top surface of the pole layer 12 in part and the top surfaces of the side shields 13C1 and 13C2 and the connecting layer 51. The mask layers 58P and 59P thereby become the insulating layer 58 and the nonmagnetic metal layer 59, respectively.

Next, the top shield layer 13B1 is formed over the side shields 13C1 and 13C2 and the gap layer 14, the top yoke layer 13B7 is formed on the pole layer 12, and the connecting layer 52 is formed on the connecting layer 51, each by frame plating, for example. Next, the nonmagnetic layer 46 is formed over the entire top surface of the stack. Next, the nonmagnetic layer 46 is polished by, for example, CMP until the top shield layer 13B1, the top yoke layer 13B7 and the connecting layer 52 are exposed, whereby the top shield layer 13B1, the top yoke layer 13B7, the connecting layer 52 and the nonmagnetic layer 46 are flattened at the top.

Next, the second layer 13B2 is formed on the top shield layer 13B1, the sixth layer 13B6 is formed on the top yoke layer 13B7, and the connecting layer 53 is formed on the connecting layer 52, each by frame plating, for example. Next, the nonmagnetic layer 47 is formed over the entire top surface of the stack. Next, the nonmagnetic layer 47 is polished by, for example, CMP until the second layer 13B2, the sixth layer 13B6 and the connecting layer 53 are exposed, whereby the second layer 13B2, the sixth layer 13B6, the connecting layer 53 and the nonmagnetic layer 47 are flattened at the top.

Next, the insulating layer 17 is formed on an area of the top surface of the nonmagnetic layer 47 over which the coil 18 is to be disposed. Next, the coil 18 is formed on the insulating layer 17 by, for example, frame plating. Next, the third layer 13B3 is formed on the second layer 13B2 and the fifth layer 13B5 is formed on the sixth layer 13B6, each by frame plating, for example. The coil 18 may be formed after forming the third layer 13B3 and the fifth layer 13B5, however.

Next, the insulating layer 19 is formed around the coil 18 and the fifth layer 13B5 and in the space between every adjacent turns of the coil 18. Next, the insulating layer 41 is formed over the entire top surface of the stack. Next, the insulating layer 41 is polished by, for example, CMP until the third layer 13B3, the fifth layer 13B5 and the coil 18 are exposed, whereby the third layer 13B3, the fifth layer 13B5, the coil 18 and the insulating layers 19 and 41 are flattened at the top.

Next, the insulating layer 20 is formed over the entire top surface of the stack by, for example, sputtering. Next, the insulating layer 20 is selectively etched to form therein an opening for exposing the top surface of the third layer 13B3 and an opening for exposing the top surface of the fifth layer 13B5. Next, the fourth layer 13B4 of the second portion 13B is formed by frame plating, for example. The shield 13 is thereby completed.

Next, the protection layer 42 is formed to cover the entire top surface of the stack. Next, wiring, terminals and so on are formed on the protection layer 42, the substrate is cut into sliders, and polishing of the medium facing surface 30, fabrication of flying rails, etc. are performed to thereby complete the magnetic head.

As has been described, the manufacturing method for the magnetic head according to the present embodiment includes the steps of forming the nonmagnetic layer 25P that is to become the encasing layer 25 through formation of the first to third grooves 25a, 25b1 and 25b2 therein later; forming the etching mask layer 31 on the nonmagnetic layer 25P, the etching mask layer 31 having the first to third openings 31a, 31b1 and 31b2 that have shapes corresponding to the respective planar shapes of the first to third grooves 25a, 25b1 and 25b2 to be formed later; forming the first to third grooves 25a, 25b1 and 25b2 in the nonmagnetic layer 25P by etching using the etching mask layer 31 so that the nonmagnetic layer 25P becomes the encasing layer 25; forming the pole layer 12; forming the first and second side shields 13C1 and 13C2; forming the gap layer 14; forming the top shield layer 13B1; and forming the coils 11 and 18.

The step of forming the first to third grooves 25a, 25b1 and 25b2 includes the steps of: forming the first groove 25a by etching the nonmagnetic layer 25P using the first opening 31a, with the second and third openings 31b1 and 31b2 covered with the first mask 33; and forming the second and third grooves 25b1 and 25b2 by etching the nonmagnetic layer 25P using the second and third openings 31b1 and 31b2, with the first opening 31a covered with the second mask 34.

The step of forming the etching mask layer 31 includes the steps of: forming the nonmagnetic metal layer 31P on the nonmagnetic layer 25P, the nonmagnetic metal layer 31P being made of a nonmagnetic metal material and intended to become the etching mask layer 31 through formation of the first to third openings 31a, 31b1 and 31b2 therein later; forming the photoresist mask 32 on the nonmagnetic metal layer 31P, the photoresist mask 32 being intended to be used in etching the nonmagnetic metal layer 31P later; and forming the first to third openings 31a, 31b1 and 31b2 in the nonmagnetic metal layer 31P by etching using the photoresist mask 32 so that the nonmagnetic metal layer 31P becomes the etching mask layer 31. In the step of forming the photoresist mask 32, the photoresist mask 32 may be formed by performing photolithography with OPC.

In the present embodiment, the steps of forming the pole layer 12 and forming the first and second side shields 13C1 and 13C2 are performed after the steps of forming the first groove 25a and forming the second and third grooves 25b1 and 25b2.

In the present embodiment, the positions of the pole layer 12 and the two side shields 13C1 and 13C2 are defined by the first to third openings 31a, 31b1 and 31b2 of the etching mask layer 31 that are patterned simultaneously. The present embodiment thus allows accurate alignment of the pole layer 12 and the two side shields 13C1 and 13C2 with respect to each other. Furthermore, since the positions of the pole layer 12 and the two side shields 13C1 and 13C2 are defined by the first to third openings 31a, 31b1 and 31b2 of the etching mask layer 31 as described above, accurate alignment is not required for the first and second masks 33 and 34.

In the present embodiment, the first groove 25a is formed by etching the nonmagnetic layer 25P using the first opening 31a, with the second and third openings 31b1 and 31b2 covered with the first mask 33, and the second and third grooves 25b1 and 25b2 are formed by etching the nonmagnetic layer 25P using the second and third openings 31b1 and 31b2, with the first opening 31a covered with the second mask 34. The present embodiment thus allows forming the first groove 25a and the second and third grooves 25b1 and 25b2 by etching under different conditions, thereby allowing controlling the respective shapes of the first groove 25a and the second and third grooves 25b1 and 25b2 into desired shapes. Consequently, according to the present embodiment, it is possible to control the respective shapes of the pole layer 12 and the two side shields 13C1 and 13C2 into desired shapes in order to achieve desired write characteristics. For example, according to the present embodiment, PT and SSD can be of different values as shown in FIG. 5, where PT is the dimension of the end face of the pole layer 12 located in the medium facing surface 30 taken in the direction perpendicular to the top surface of the substrate 1, and SSD is the dimension of the end face of each of the side shields 13C1 and 13C2 located in the medium facing surface 30 taken in the direction perpendicular to the top surface of the substrate 1. Furthermore, according to the present embodiment, the angle formed by each of the third side A3 and the fourth side A4 of the end face of the pole layer 12 with respect to the direction perpendicular to the top surface of the substrate 1 can be different from the angle formed by each of the side B1 of the end face of the side shield 13C1 and the side B2 of the end face of the side shield 13C2 with respect to the direction perpendicular to the top surface of the substrate 1.

Furthermore, according to the present embodiment, the pole layer 12 and the two side shields 13C1 and 13C2 are formed in different steps. It is thus possible to form the pole layer 12 and the two side shields 13C1 and 13C2 from different magnetic materials. The magnetic material used to form the pole layer 12 preferably has a saturation flux density higher than that of the magnetic material used to form the side shields 13C1 and 13C2.

A description will now be given of OPC that is employed in forming the photoresist mask 32 by photolithography in the step shown in FIG. 8A and FIG. 8B. Typically, when a photoresist layer is patterned by photolithography, it is likely that the patterned photoresist layer goes out of a desired shape due to the effects of, for example, reflection of light off the base layer when the photoresist layer is exposed. In OPC, the pattern of the photomask is determined so that the photoresist layer patterned by photolithography will have a shape closer to a desired one.

Figure 20A:
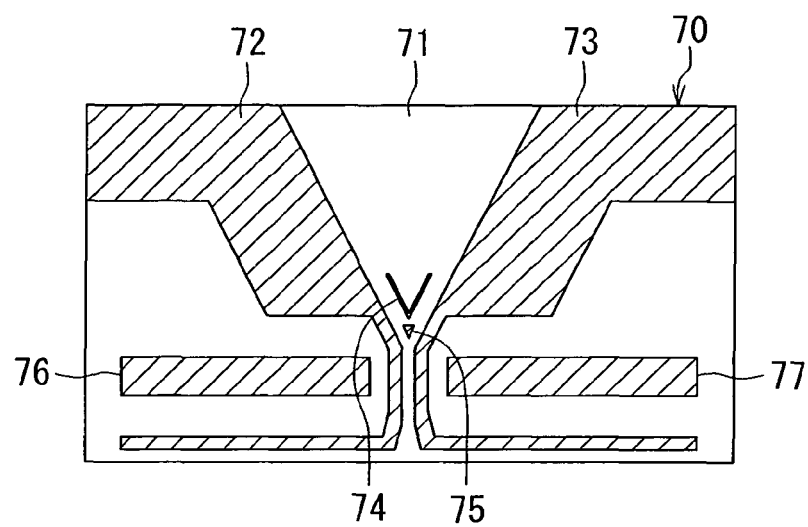
FIG. 20A to FIG. 20C are plan views showing first to third examples of the shape of a photomask used in the manufacturing method for the magnetic head according to the first embodiment of the invention.
Figure 20B:
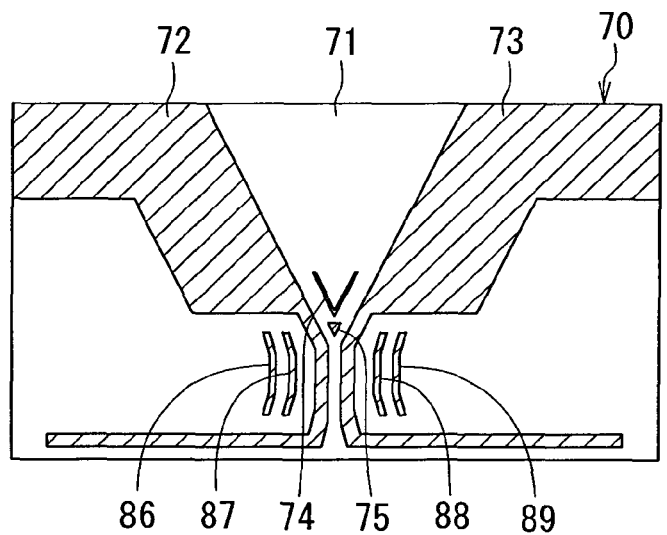
Figure 20C:
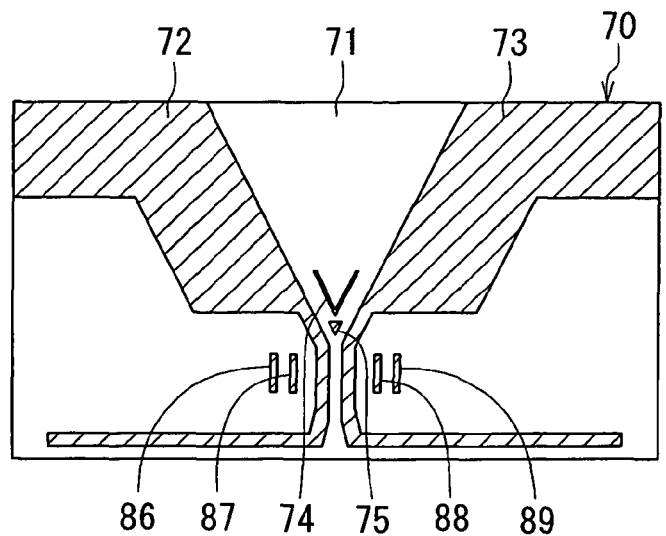

In the step of FIG. 8A and FIG. 8B, the photoresist layer is selectively exposed using the photomask, and then the exposed photoresist layer is developed to form the photoresist mask 32. FIG. 20A to FIG. 20C show first to third examples of the shape of the photomask in the case where OPC is employed in this step. Here, the case where the photoresist layer is positive will be described.

A photomask 70 of the first example shown in FIG. 20A has a light transmitting portion 71 that transmits light for exposure, and light blocking portions 72 to 77 that block the light for exposure. The shape of the light transmitting portion 71 generally corresponds to the shape of the portion of the photoresist layer to be removed by development. The shape of the light blocking portions 72 and 73 generally corresponds to the shape of the photoresist mask 32 to be formed. The light blocking portions 74 to 77 are the portions for controlling the pattern of the light for exposure to be applied to the photoresist layer so as to make the shape of the photoresist mask 32 closer to a desired one.

A photomask 70 of the second example shown in FIG. 20B has light blocking portions 86 to 89 instead of the light blocking portions 76 and 77 of the photomask 70 of the first example shown in FIG. 20A. In the second example, the light blocking portions 74, 75 and 86 to 89 are the portions for controlling the pattern of the light for exposure to be applied to the photoresist layer so as to make the shape of the photoresist mask 32 closer to a desired one.

In a photomask 70 of the third example shown in FIG. 20C, the light blocking portions 86 to 89 are different in shape from those of the photomask 70 of the second example shown in FIG. 20B.

Forming the photoresist mask 32 by photolithography with OPC allows the shape of the resulting photoresist mask 32 to be closer to a desired one. Consequently, it becomes possible to control the respective shapes of the pole layer 12 and the two side shields 13C1 and 13C2 more accurately.

[Modification Examples]

First to fourth modification examples of the manufacturing method for the magnetic head according to the present embodiment will now be described only in regard to differences from the manufacturing method for the magnetic head that has been described with reference to FIG. 1 to FIG. 20.

In the first modification example of the manufacturing method for the magnetic head, steps shown in FIG. 21A to FIG. 23A and FIG. 21B to FIG. 23B are performed instead of the steps shown in FIG. 15A to FIG. 17A and FIG. 15B to FIG. 17B. FIG. 21A to FIG. 23A and FIG. 21B to FIG. 23B each show a stack of layers formed in the course of manufacturing the magnetic head. Each of FIG. 21A to FIG. 23A shows the top surface of part of the stack. Each of FIG. 21B to FIG. 23B shows a cross section of the stack taken at the position where the medium facing surface 30 is to be formed. Portions closer to the substrate 1 than the bottom shield layer 13A1 are omitted in FIG. 21B to FIG. 23B. In FIG. 21A to FIG. 23A the symbol "ABS" indicates the position where the medium facing surface 30 is to be formed.

Figure 21A:
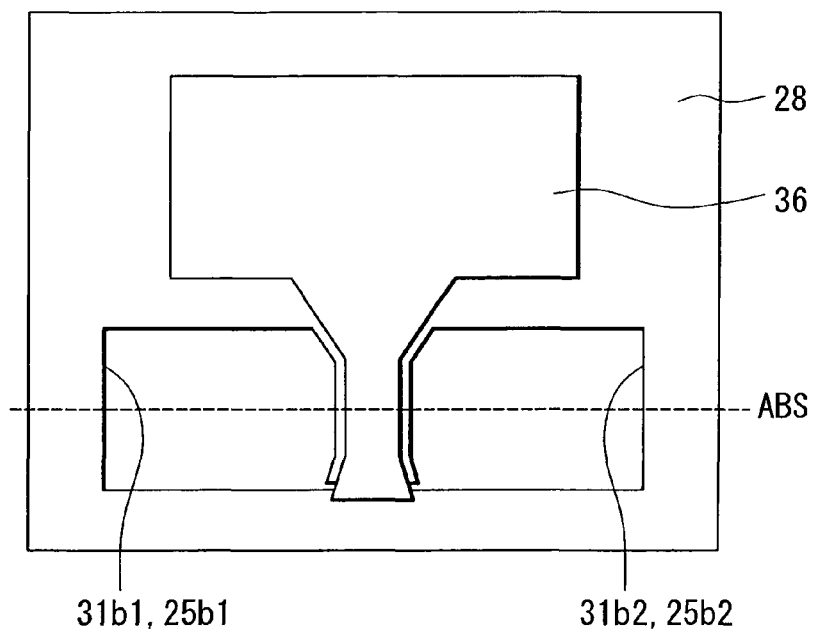
FIG. 21A and FIG. 21B are explanatory diagrams showing a step of a first modification example of the manufacturing method for the magnetic head according to the first embodiment of the invention.
Figure 21B:
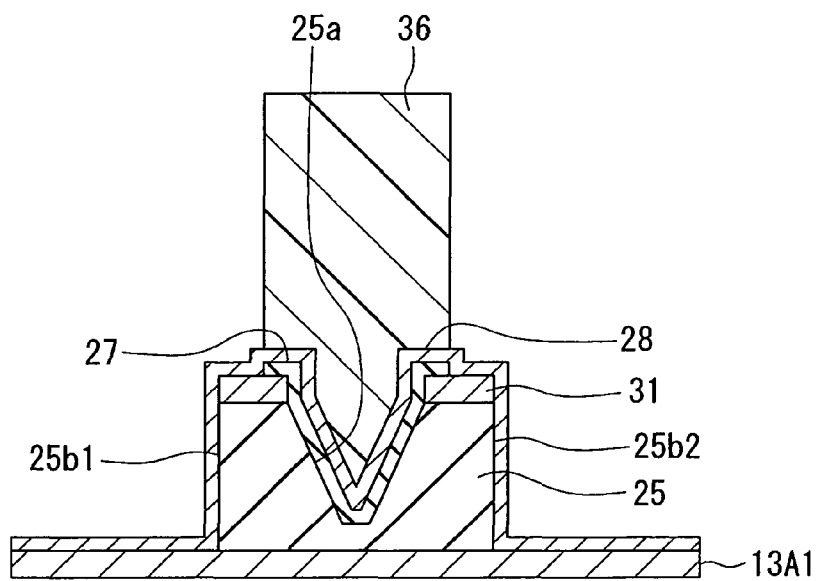

In the step shown in FIG. 21A and FIG. 21B, first, the bottom of the groove 25a, the nonmagnetic layer 27 and the nonmagnetic metal film 28 are selectively etched to form therein an opening for exposing the top surface of the third layer 13A3. At the same time, the insulating layer 24, the nonmagnetic layer 27 and the nonmagnetic metal film 28 are selectively etched to form therein an opening for exposing the top surface of the connecting portion 11a of the coil 11. Next, a photoresist layer is formed over the entire top surface of the stack and it is patterned to thereby form a photoresist mask 36 that covers the groove 25a and a photoresist mask that is not shown and covers the groove 25c. There exists no photoresist mask covering the grooves 25b1 and 25b2.

Figure 22A:
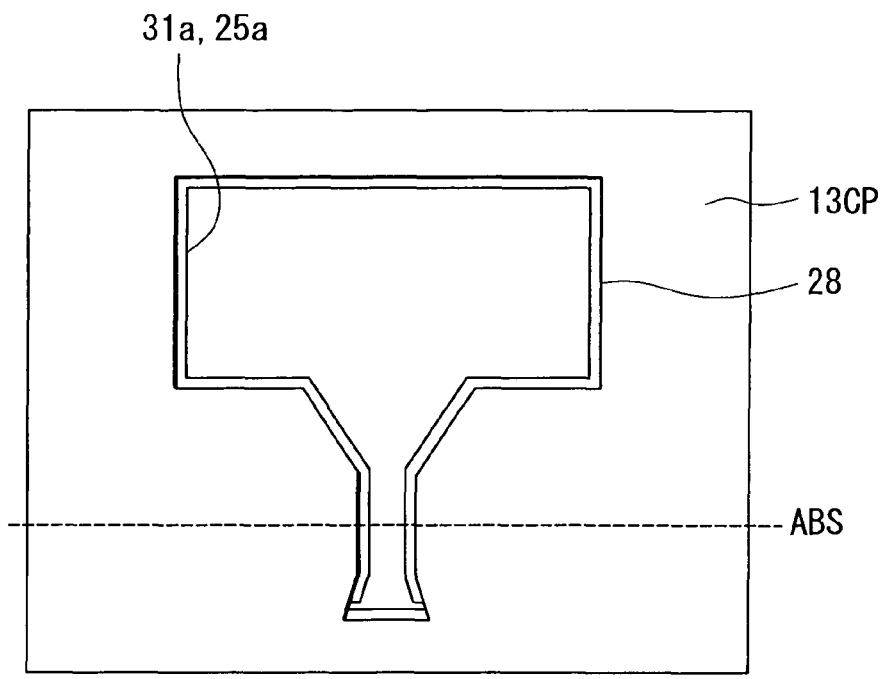
FIG. 22A and FIG. 22B are explanatory diagrams showing a step that follows the step of FIG. 21A and FIG. 21B.
Figure 22B:
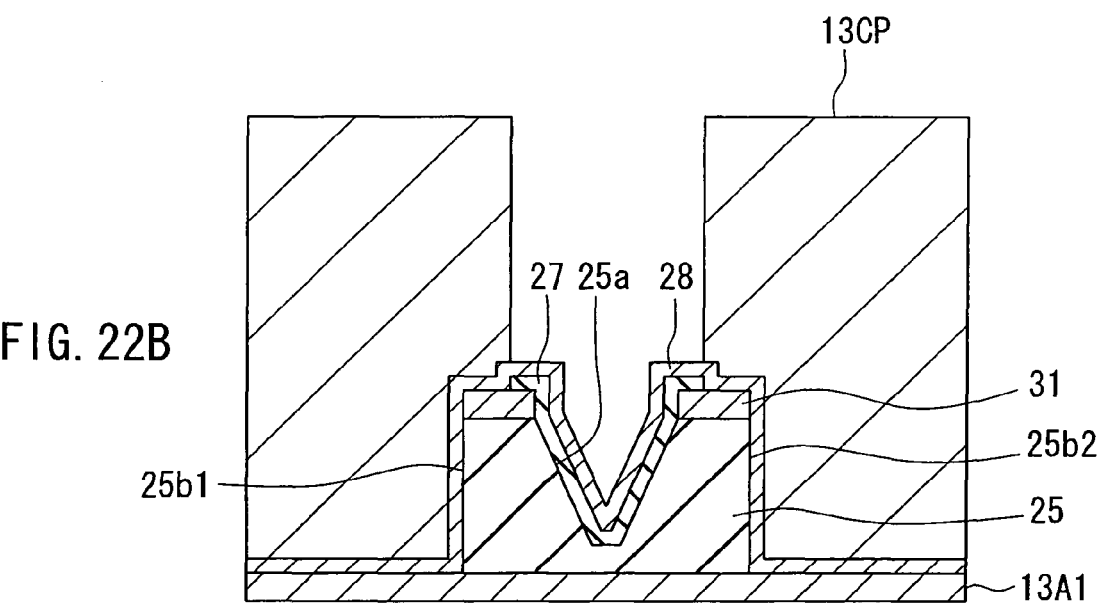

FIG. 22A and FIG. 22B show the next step. In this step, first, a magnetic layer 13CP, which is to make the side shields 13C1 and 13C2 later, is formed by plating using the nonmagnetic metal film 28 as an electrode and a seed layer. The magnetic layer 13CP is formed to fill the grooves 25b1 and 25b2 and to have a top surface located at a higher level than the top surface of the portion of the nonmagnetic metal film 28 that lies above the etching mask layer 31. Next, the photoresist mask 36 is removed.

Figure 23A:
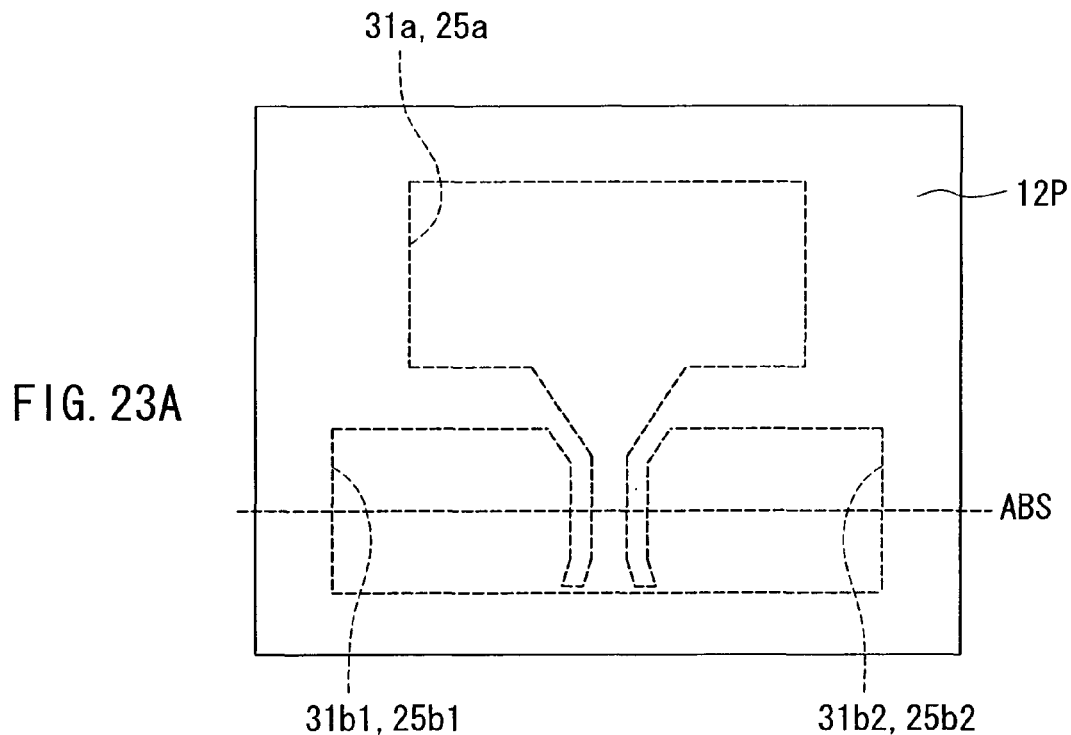
FIG. 23A and FIG. 23B are explanatory diagrams showing a step that follows the step of FIG. 22A and FIG. 22B.
Figure 23B:
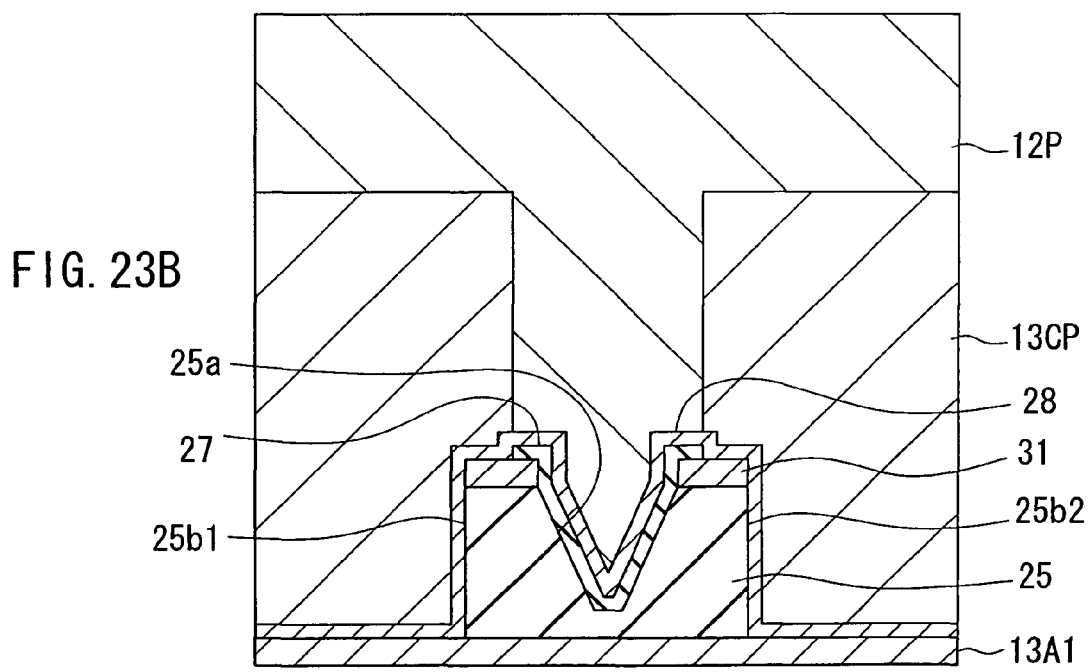

FIG. 23A and FIG. 23B show the next step. In this step, a magnetic layer 12P, which is to make the pole layer 12 and the connecting layer 51 later, is formed by plating using the nonmagnetic metal film 28 as an electrode and a seed layer. The magnetic layer 12P is formed to fill the grooves 25a and 25c and to have a top surface located at a higher level than the top surface of the portion of the nonmagnetic metal film 28 that lies above the etching mask layer 31. In the first modification example of the manufacturing method for the magnetic head, subsequently, the step shown in FIG. 18A and FIG. 18B is performed.

Figure 24:
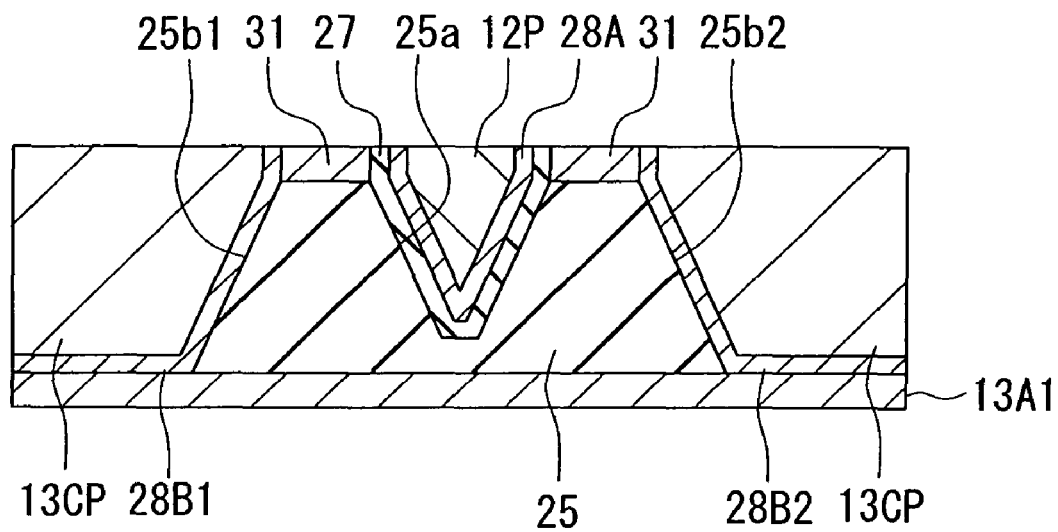
FIG. 24 is an explanatory diagram showing a step of a second modification example of the manufacturing method for the magnetic head according to the first embodiment of the invention.

The second modification example will now be described with reference to FIG. 24. FIG. 24 is a diagram corresponding to FIG. 18B. In the second modification example, the shapes of the grooves 25b1 and 25b2 are different from those of the example shown in FIG. 18B. In the second modification example, a wall face of the groove 25b1 that is closer to the groove 25a and a wall face of the groove 25b2 that is closer to the groove 25a are each inclined with respect to the direction perpendicular to the top surface of the substrate 1 in such a manner as to get farther from the center of the groove 25a taken in the track width direction with decreasing distance from the top surface of the substrate 1.

Figure 25:
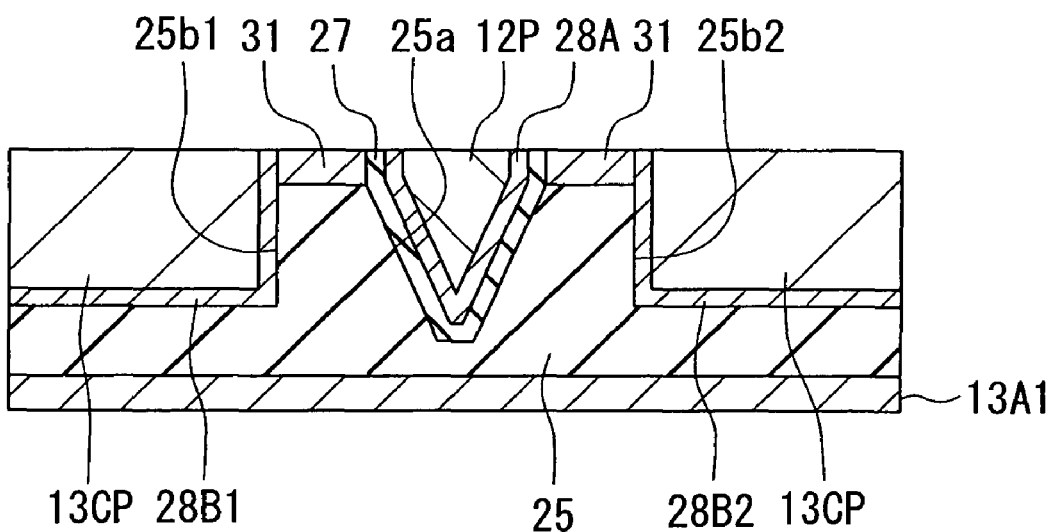
FIG. 25 is an explanatory diagram showing a step of a third modification example of the manufacturing method for the magnetic head according to the first embodiment of the invention.

The third modification example will now be described with reference to FIG. 25. FIG. 25 is a diagram corresponding to FIG. 18B. In the third modification example, the shapes of the grooves 25b1 and 25b2 are different from those of the example shown in FIG. 18B. In the third modification example, the grooves 25b1 and 25b2 do not penetrate the encasing layer 25, and the bottom of each of the grooves 25b1 and 25b2 is located at a higher level than the top surface of the bottom shield layer 13A1.

Figure 26:
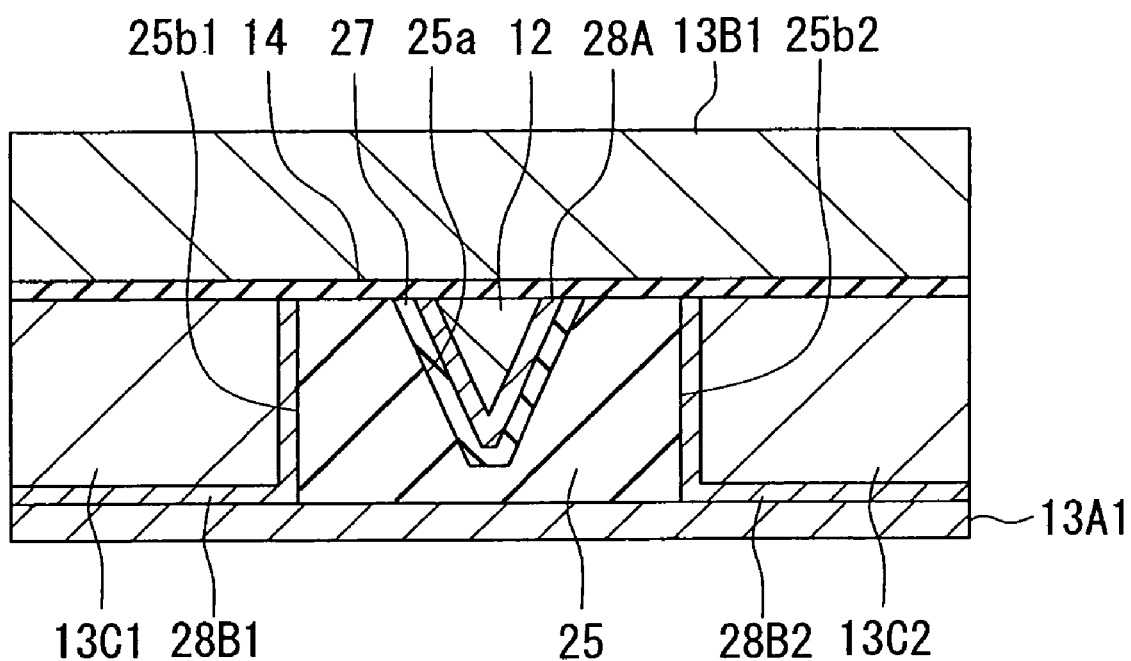
FIG. 26 is an explanatory diagram showing a step of a fourth modification example of the manufacturing method for the magnetic head according to the first embodiment of the invention.

The fourth modification example will now be described with reference to FIG. 26. FIG. 26 shows a step that follows the step of FIG. 19B. In the fourth modification example, the gap layer 14 is formed to cover the entire top surfaces of the side shields 13C1 and 13C2, and the top shield layer 13B1 is disposed on the gap layer 14. Thus, the top shield layer 13B1 does not touch the top surfaces of the side shields 13C1 and 13C2.

In the present embodiment, as shown in FIG. 10A to FIG. 13A and FIG. 10B to FIG. 13B, the groove 25a is formed in the nonmagnetic layer 25P with the openings 31b1 and 31b2 of the etching mask layer 31 covered with the first mask 33, and then the nonmagnetic layer 27 is formed. Thereafter, the grooves 25b1 and 25b2 are formed in the nonmagnetic layer 25P with the opening 31a of the etching mask layer 31 covered with the second mask 34. However, the grooves 25b1 and 25b2 may be first formed in the nonmagnetic layer 25P with the opening 31a of the etching mask layer 31 covered with the second mask 34, and then the groove 25a may be formed in the nonmagnetic layer 25P with the openings 31b1 and 31b2 of the etching mask layer 31 covered with the first mask 33, followed by the formation of the nonmagnetic layer 27.

[Second Embodiment]

Figure 27:
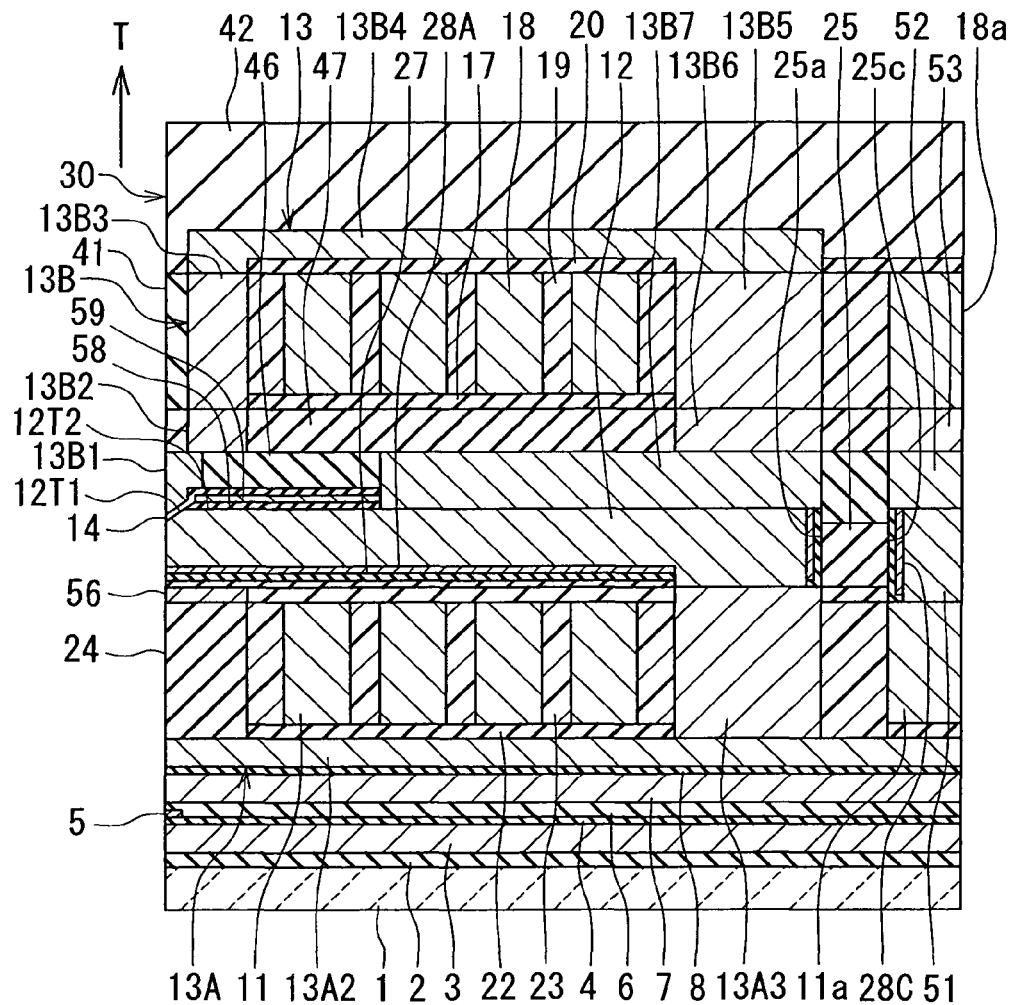
FIG. 27 is a cross-sectional view showing the configuration of a magnetic head according to a second embodiment of the invention.
Figure 28:
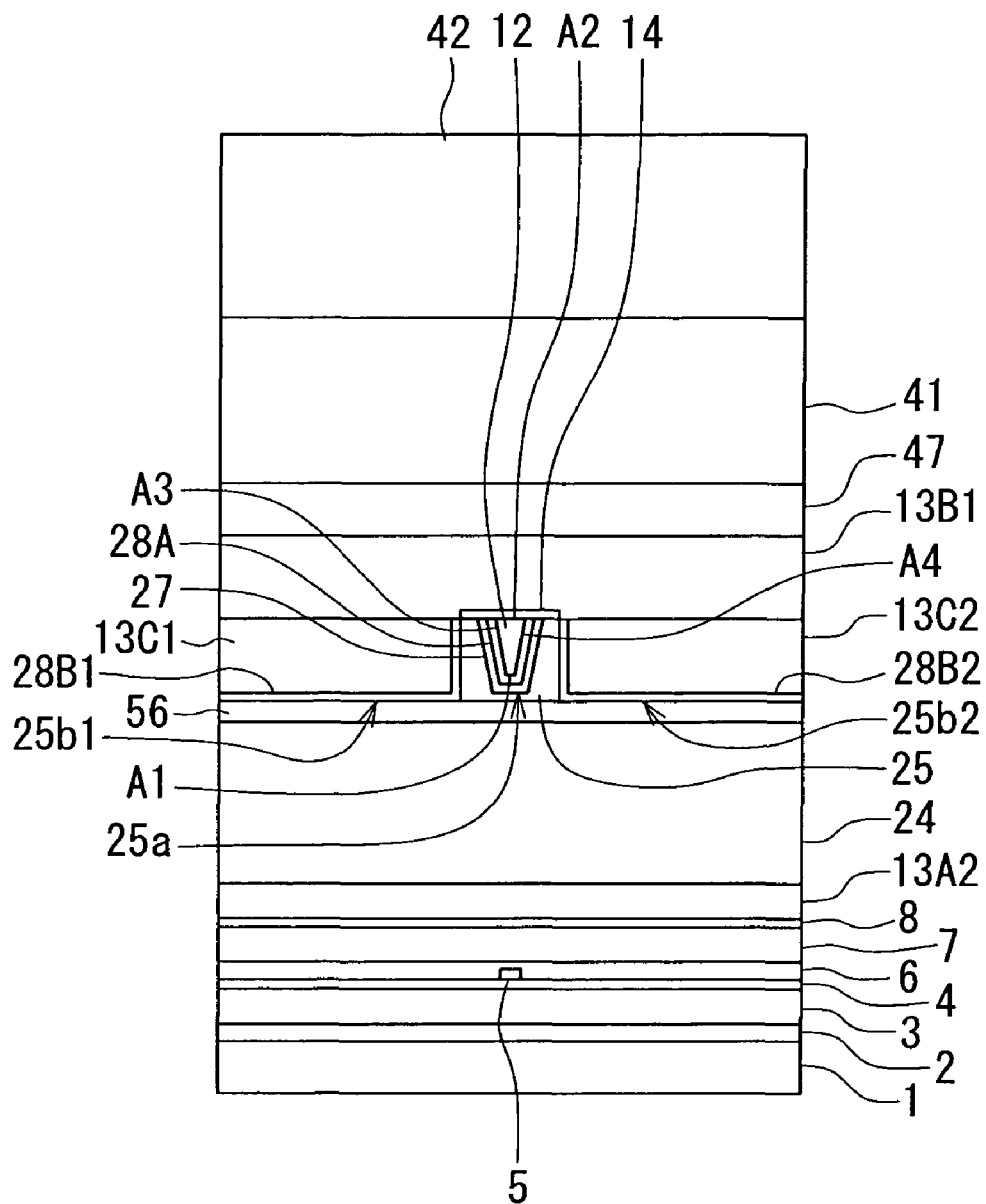
FIG. 28 is a front view showing the medium facing surface of the magnetic head according to the second embodiment of the invention.

A second embodiment of the present invention will now be described. Reference is now made to FIG. 27 and FIG. 28 to describe the configuration of a magnetic head according to the present embodiment. FIG. 27 is a cross-sectional view showing the configuration of the magnetic head according to the present embodiment. FIG. 27 shows a cross section perpendicular to the medium facing surface and the top surface of the substrate. In FIG. 27 the arrow designated by the symbol T indicates the direction of travel of the recording medium. FIG. 28 is a front view showing the medium facing surface of the magnetic head according to the present embodiment.

A description will now be given of the differences of the magnetic head according to the present embodiment from the magnetic head according to the first embodiment. The magnetic head according to the present embodiment is without the bottom shield layer 13A1 of the magnetic head according to the first embodiment. In addition, in the present embodiment, each of the second layer 13A2 and the insulating layer 24 has an end face located in the medium facing surface 30. The insulating layer 24 has a groove that opens in the top surface of the insulating layer 24. The magnetic head has a nonmagnetic metal layer 56 made of a nonmagnetic metal material and accommodated in the groove of the insulating layer 24. The nonmagnetic metal layer 56 has a bottom surface, a top surface opposite to the bottom surface, and an end face that is located in the medium facing surface 30 at a position backward of the end face of the pole layer 12 along the direction T of travel of the recording medium. For example, the nonmagnetic metal layer 56 is formed of a Ru layer or a layered film consisting of a Ru layer and a NiCr layer.

The third layer 13A, the insulating layer 24 and the nonmagnetic metal layer 56 are flattened at the top. The encasing layer 25 is disposed over the top surfaces of the insulating layer 24 and the nonmagnetic metal layer 56. The nonmagnetic metal layer 28B1 is disposed along the wall face of the groove 25b1 and the top surface of the nonmagnetic metal layer 56. The nonmagnetic metal layer 28B2 is disposed along the wall face of the groove 25b2 and the top surface of the nonmagnetic metal layer 56. The nonmagnetic metal layer 56 functions as an etching stopper that stops etching when the grooves 25b1 and 25b2 are formed in the encasing layer 25 by etching.

A manufacturing method for the magnetic head according to the present embodiment will now be described. In the manufacturing method for the magnetic head according to the present embodiment, the steps until the third layer 13A3 and the insulating layer 24 are flattened at the top are the same as those of the manufacturing method for the magnetic head according to the first embodiment except that the bottom shield layer 13A1 is not formed in the present embodiment.

Figure 29A:
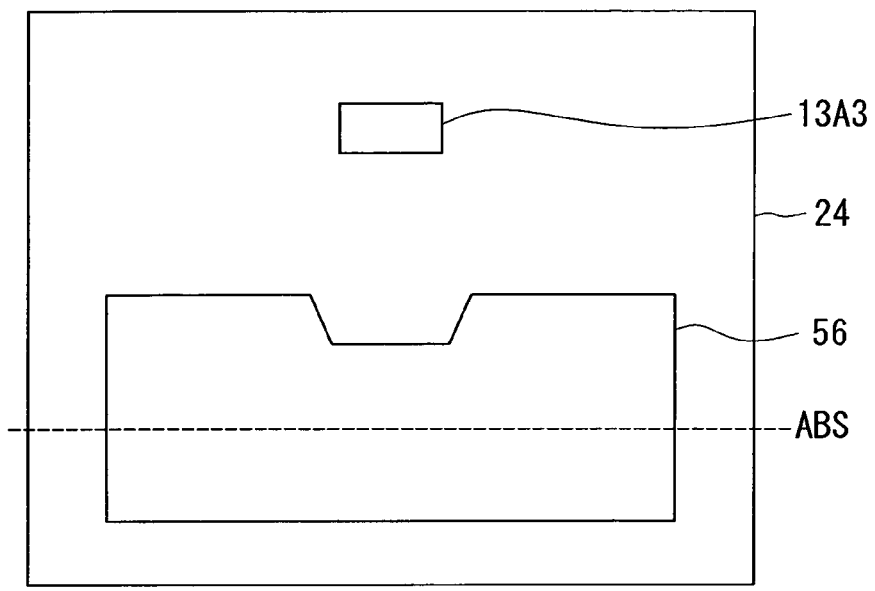
FIG. 29A and FIG. 29B are explanatory diagrams showing a step of a manufacturing method for the magnetic head according to the second embodiment of the invention.
Figure 29B:
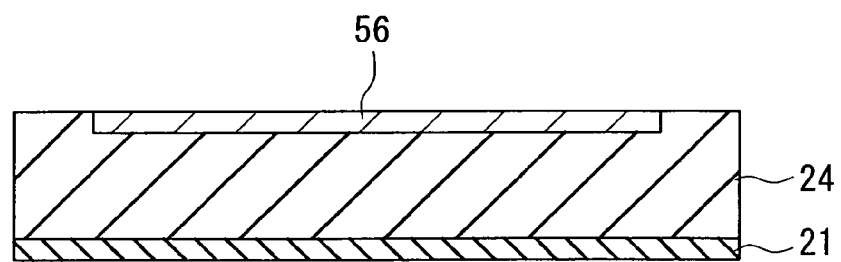

Reference is now made to FIG. 29A and FIG. 29B to describe the step of forming the nonmagnetic metal layer 56 after the foregoing steps. FIG. 29A and FIG. 29B each show a stack of layers formed in the course of manufacturing the magnetic head. FIG. 29A shows the top surface of part of the stack. FIG. 29B shows a cross section of the stack taken at the position where the medium facing surface 30 is to be formed. Portions closer to the substrate 1 than the insulating layer 21 are omitted in FIG. 29B. In FIG. 29A the symbol "ABS" indicates the position where the medium facing surface 30 is to be formed.

In the step shown in FIG. 29A and FIG. 29B, first, an etching mask made of photoresist, for example, is formed on the insulating layer 24, and the insulating layer 24 is selectively etched using the etching mask to thereby form in the insulating layer 24 a groove for accommodating the nonmagnetic metal layer 56. With the etching mask left unremoved, the nonmagnetic metal layer 56 is then formed by sputtering, for example, so as to fill the groove of the insulating layer 24. Next, the etching mask is lifted off. Thereafter, the insulating layer 24 and the nonmagnetic metal layer 56 may be flattened at the top by, for example, CMP. The subsequent steps are the same as those of the first embodiment. The remainder of function and effects of the present embodiment are similar to those of the first embodiment.

[Third Embodiment]

Figure 30:
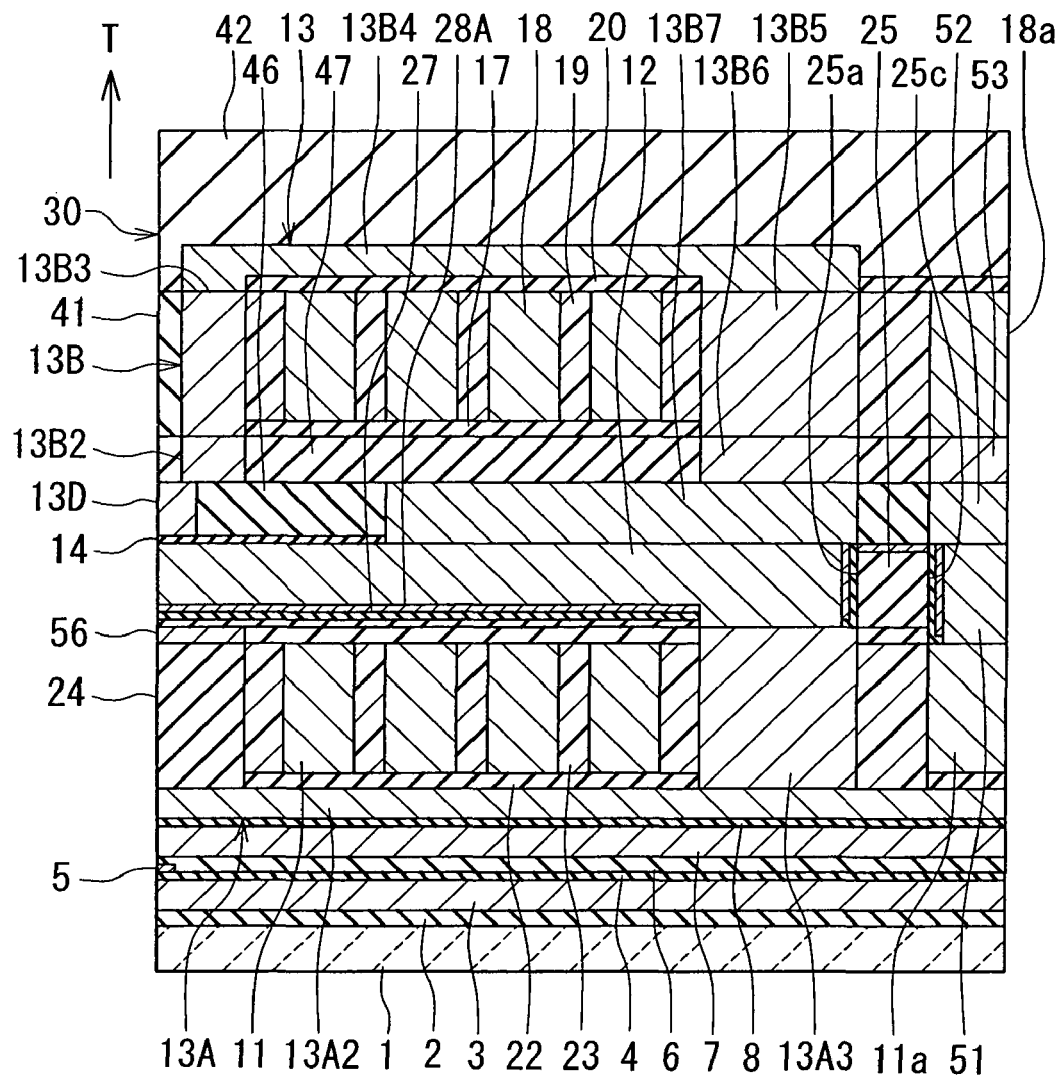
FIG. 30 is a cross-sectional view showing the configuration of a magnetic head according to a third embodiment of the invention.
Figure 31:
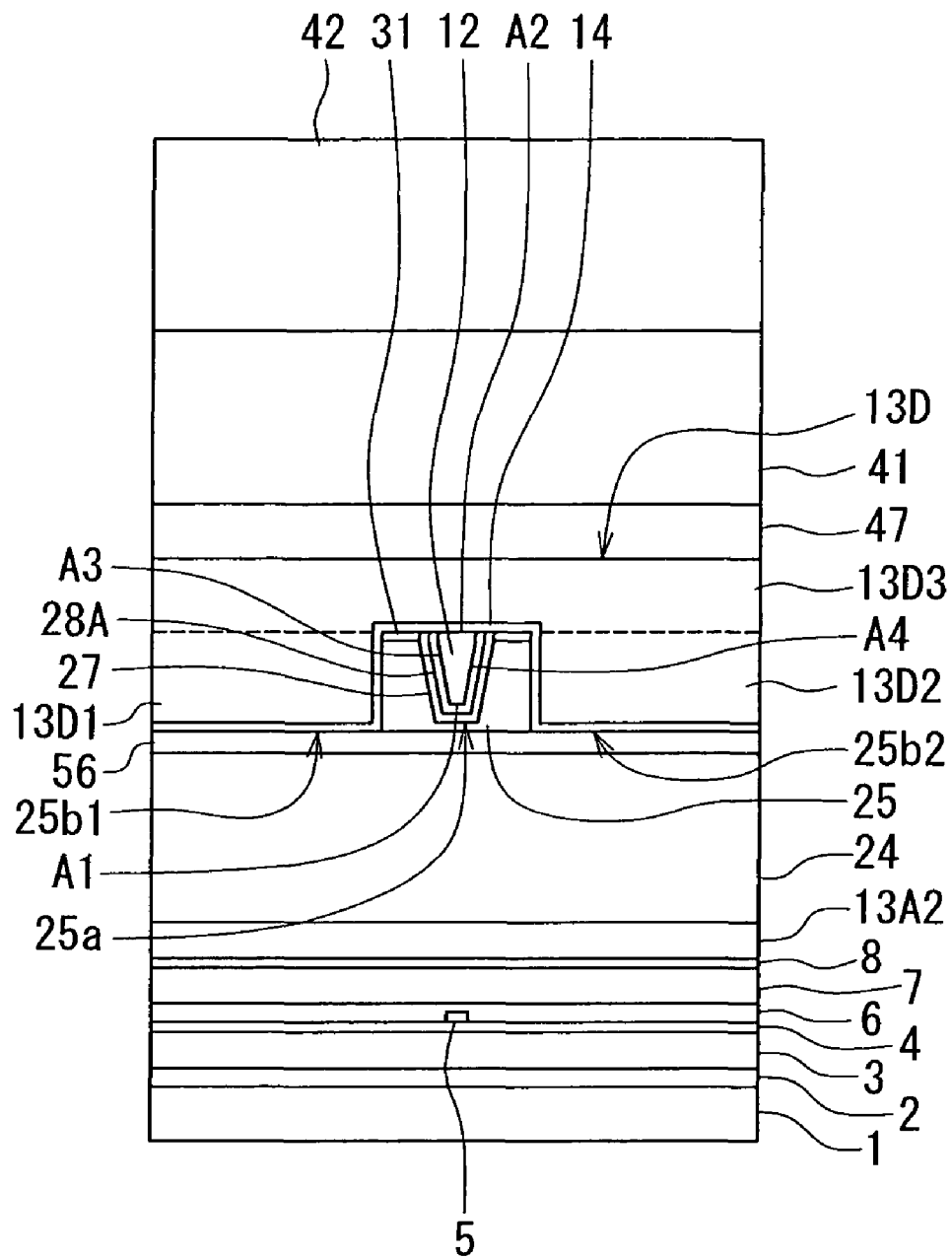
FIG. 31 is a front view showing the medium facing surface of the magnetic head according to the third embodiment of the invention.

A third embodiment of the present invention will now be described. Reference is now made to FIG. 30 and FIG. 31 to describe the configuration of a magnetic head according to the present embodiment. FIG. 30 is a cross-sectional view showing the configuration of the magnetic head according to the present embodiment. FIG. 30 shows a cross section perpendicular to the medium facing surface and the top surface of the substrate. In FIG. 30 the arrow designated by the symbol T indicates the direction of travel of the recording medium. FIG. 31 is a front view showing the medium facing surface of the magnetic head according to the present embodiment.

A description will now be given of the differences of the magnetic head according to the present embodiment from the magnetic head according to the second embodiment. The magnetic head according to the present embodiment is without the top shield layer 13B1, the side shields 13C1 and 13C2, the nonmagnetic metal layers 28B1, 28B2 and 59, and the insulating layer 58 of the magnetic head according to the second embodiment. Instead, the magnetic head according to the present embodiment has a shield layer 13D and an etching mask layer 31.

In the magnetic head according to the present embodiment, the top surface of the pole layer 12 does not have the first and second portions 12T1 and 12T2 of the first and second embodiments. The top surface of the pole layer 12 of the present embodiment is thus a flat surface extending in a direction substantially perpendicular to the medium facing surface 30.

The etching mask layer 31 is disposed on the top surface of the encasing layer 25. This etching mask layer 31 is the same as the etching mask layer 31 that is used when forming the grooves 25a, 25b1, 25b2 and 25c in the nonmagnetic layer 25P in the manufacturing method for the magnetic head according to the second embodiment. The etching mask layer 31 is formed of, for example, a Ru layer or a layered film consisting of a Ru layer and a NiCr layer.

In the present embodiment, the gap layer 14 is disposed along a part of the top surface of the pole layer 12, the top surface of the etching mask layer 31, the wall faces of the openings of the etching mask layer 31, the wall faces of the grooves 25b1 and 25b2, and the top surface of the nonmagnetic metal layer 56.

The shield layer 13D is disposed on the gap layer 14. The shield layer 13D includes: first and second side shields 13D1 and 13D2 that correspond to the first and second side shields 13C1 and 13C2 of the second embodiment; and a top shield 13D3 that corresponds to the top shield layer 13B1 of the second embodiment. Specifically, the shield layer 13D of the present embodiment is a combination of the side shields 13D1 and 13D2 and the top shield 13D3 that are made of the same material. The side shields 13D1 and 13D2 are accommodated in the grooves 25b1 and 25b2, respectively, such that the gap layer 14 is interposed between the side shield 13D1 and each of the wall face of the groove 25b1 and the top surface of the nonmagnetic metal layer 56, and between the side shield 13D2 and each of the wall face of the groove 25b2 and the top surface of the nonmagnetic metal layer 56. The top shield 13D3 is disposed over the side shields 13D1 and 13D2 and a portion of the gap layer 14 that lies over the top surface of the pole layer 12. The shield layer 13D is made of a magnetic material. The material of the shield layer 13D may be CoFeN, CoNiFe, NiFe or CoFe, for example.

The etching mask layer 31 has openings 31a, 31b1 and 31b2 that have shapes corresponding to the respective planar shapes of the grooves 25a, 25b1 and 25b2, and an opening that is not shown and that has a shape corresponding to the planar shape of the groove 25c. The edges of the openings at the bottom surface of the etching mask layer 31 are located directly above the edges of the grooves 25a, 25b1, 25b2 and 25c at the top surface of the encasing layer 25, respectively. The shield layer 13D, the top yoke layer 13B7, the connecting layer 52 and the nonmagnetic layer 46 are flattened at the top. The second layer 13B2 is disposed on the shield layer 13D.

A manufacturing method for the magnetic head according to the present embodiment will now be described. In the manufacturing method for the magnetic head according to the present embodiment, the steps until the grooves 25a and 25c are formed in the nonmagnetic layer 25P and the photoresist mask 33 is removed are the same as those of the manufacturing method for the magnetic head according to the second embodiment.

Reference is now made to FIG. 32A to 35A and FIG. 32B to FIG. 35B to describe a series of steps until the formation of the shield layer 13D, the top yoke layer 13B7 and the insulating layer 46 after the foregoing steps. FIG. 32A to FIG. 35A and FIG. 32B to FIG. 35B each show a stack of layers formed in the course of manufacturing the magnetic head. Each of FIG. 32A to FIG. 35A shows the top surface of part of the stack. Each of FIG. 32B to FIG. 35B shows a cross section of the stack taken at the position where the medium facing surface 30 is to be formed. Portions closer to the substrate 1 than the nonmagnetic metal layer 56 are omitted in FIG. 32B to FIG. 35B. In FIG. 32A to FIG. 35A the symbol "ABS" indicates the position where the medium facing surface 30 is to be formed.

Figure 32A:
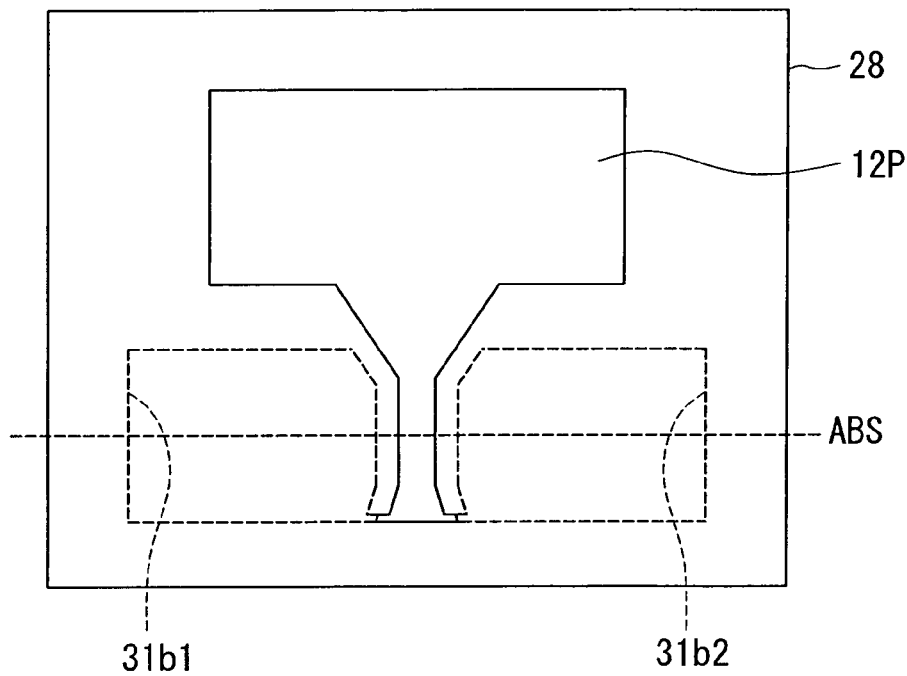
FIG. 32A and FIG. 32B are explanatory diagrams showing a step of a manufacturing method for the magnetic head according to the third embodiment of the invention.
Figure 32B:
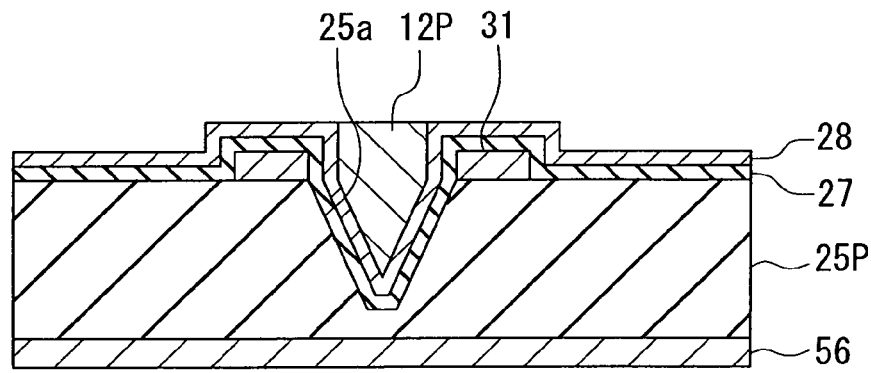

In the step shown in FIG. 32A and FIG. 32B, first, the nonmagnetic layer 27 is formed over the entire top surface of the stack. The nonmagnetic layer 27 is formed also in the grooves 25a and 25c. The nonmagnetic layer 27 is formed by sputtering, CVD or ALD, for example. Next, the nonmagnetic metal film 28 is formed over the entire top surface of the stack by, for example, sputtering. The nonmagnetic metal film 28 is formed also in the grooves 25a and 25c. Next, the bottom of the groove 25a, the nonmagnetic layer 27 and the nonmagnetic metal film 28 are selectively etched to form therein an opening for exposing the top surface of the third layer 13A3. At the same time, the insulating layer 24, the nonmagnetic layer 27 and the nonmagnetic metal film 28 are selectively etched to form therein an opening for exposing the top surface of the connecting portion 11a of the coil 11. Next, a magnetic layer 12P, which is to make the pole layer 12 and the connecting layer 51 later, is formed by frame plating, for example, using the nonmagnetic metal film 28 as an electrode and a seed layer. The magnetic layer 12P is formed to fill the grooves 25a and 25c and to have a top surface located at a higher level than the top surface of the portion of the nonmagnetic metal film 28 that lies above the etching mask layer

31. Next, the magnetic layer 12P is polished by, for example, CMP until the nonmagnetic metal film 28 is exposed.

Figure 33A:
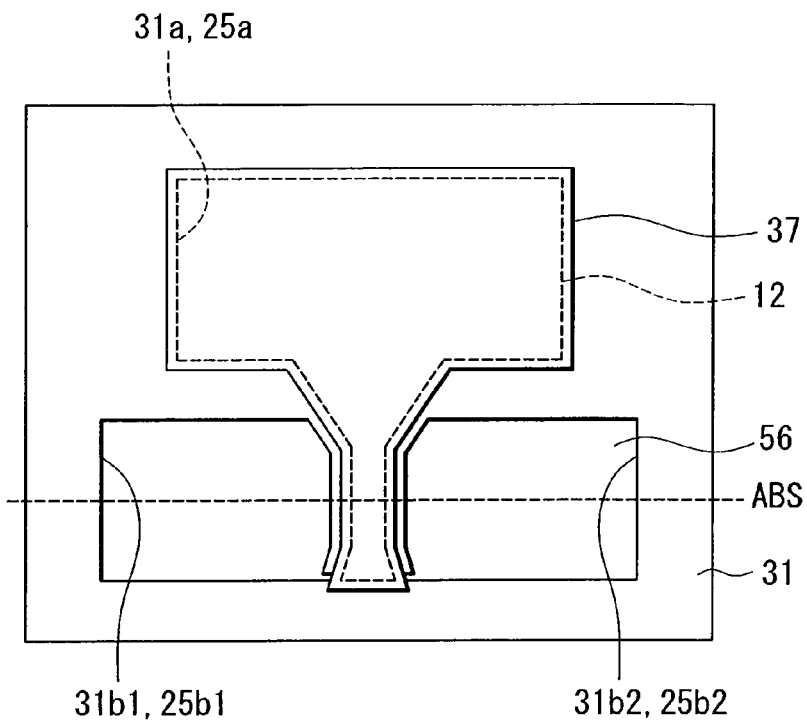
FIG. 33A and FIG. 33B are explanatory diagrams showing a step that follows the step of FIG. 32A and FIG. 32B.
Figure 33B:
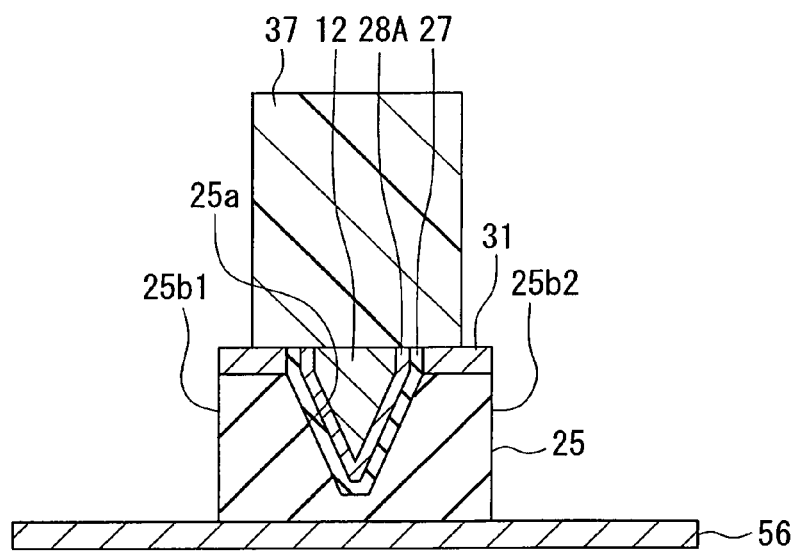

FIG. 33A and FIG. 33B show the next step. In this step, first, the magnetic layer 12P, the nonmagnetic metal film 28 and the nonmagnetic layer 27 are partially etched by, for example, ion milling, so that the magnetic layer 12P and the etching mask layer 31 are flattened at the top. As a result, the portion of the magnetic layer 12P remaining in the groove 25a makes the pole layer 12 while the portion of the magnetic layer 12P remaining in the groove 25c makes the connecting layer 51. Of the nonmagnetic metal film 28, the portion remaining in the groove 25a makes the nonmagnetic metal layer 28A while the portion remaining in the groove 25c makes the nonmagnetic metal layer 28C.

Next, a photoresist layer is formed over the entire top surface of the stack and it is patterned to thereby form a photoresist mask 37. Of the etching mask layer 31, the opening 31a and the not-shown opening that corresponds to the groove 25c are covered with the photoresist mask 37 while the openings 31b1 and 31b2 are not covered with the photoresist mask 37. The photoresist mask 37 corresponds to the second mask of the present invention. Next, the nonmagnetic layer 25P and the nonmagnetic layer 27 are selectively etched by dry etching such as RIE using the openings 31b1 and 31b2 of the etching mask layer 31, with the opening 31a of the etching mask layer 31 and the not-shown opening of the etching mask layer 31 that corresponds to the groove 25c covered with the photoresist mask 37. The grooves 25b1 and 25b2 are thereby formed in the nonmagnetic layer 25P. The remaining nonmagnetic layer 25P thereby makes the encasing layer 25.

Figure 34A:
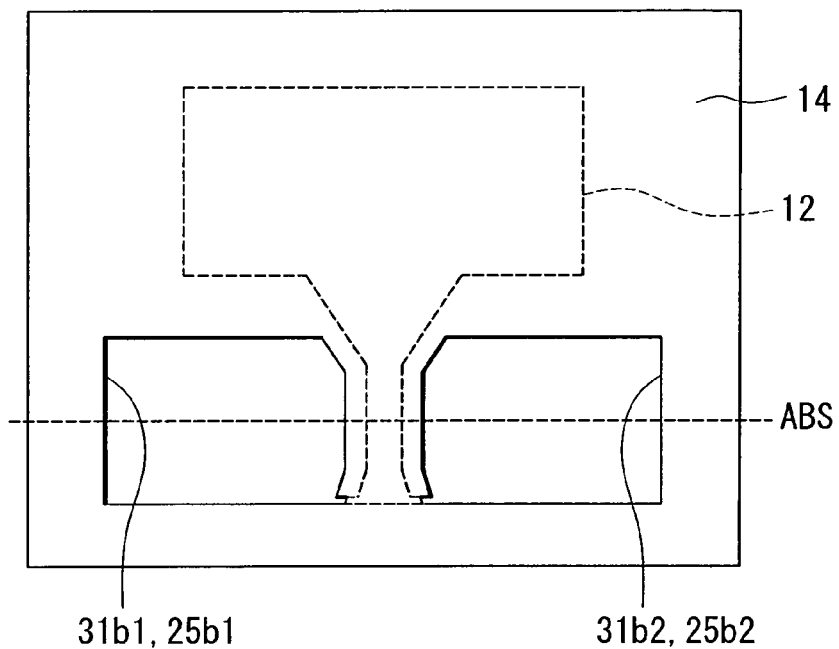
FIG. 34A and FIG. 34B are explanatory diagrams showing a step that follows the step of FIG. 33A and FIG. 33B.
Figure 34B:
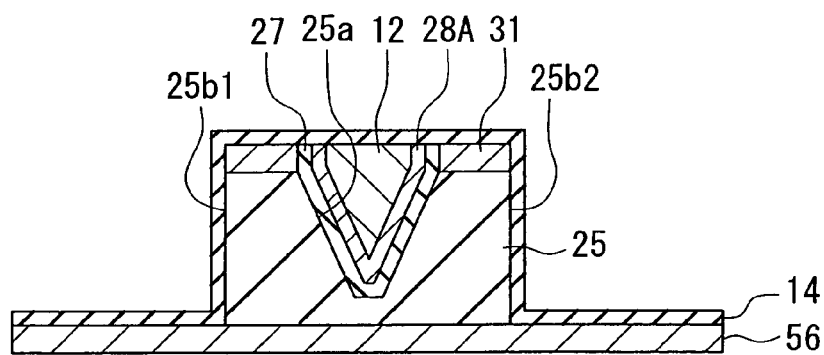

FIG. 34A and FIG. 34B show the next step. In this step, first, the photoresist mask 37 is removed. Next, the gap layer 14 is formed over the entire top surface of the stack by sputtering, for example. The gap layer 14 is formed also in the grooves 25b1 and 25b2.

Figure 35A:
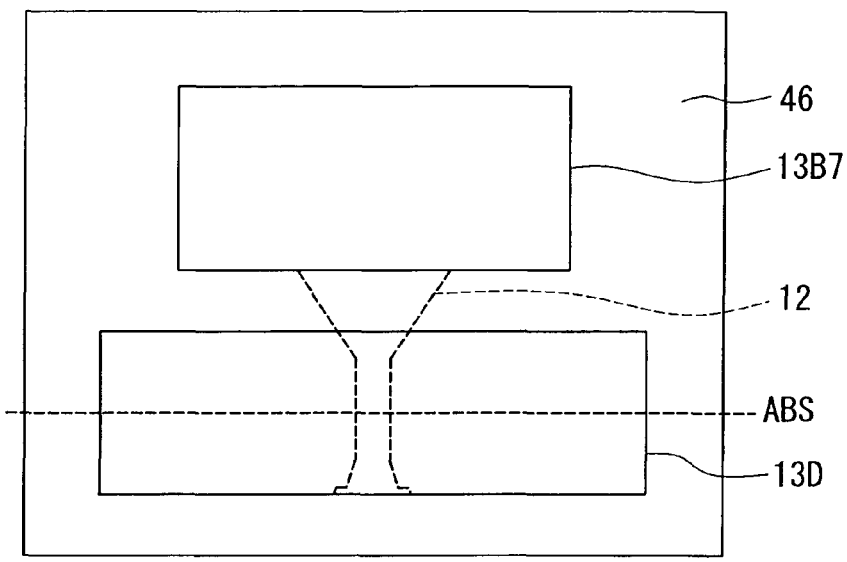
FIG. 35A and FIG. 35B are explanatory diagrams showing a step that follows the step of FIG. 34A and FIG. 34B.
Figure 35B:
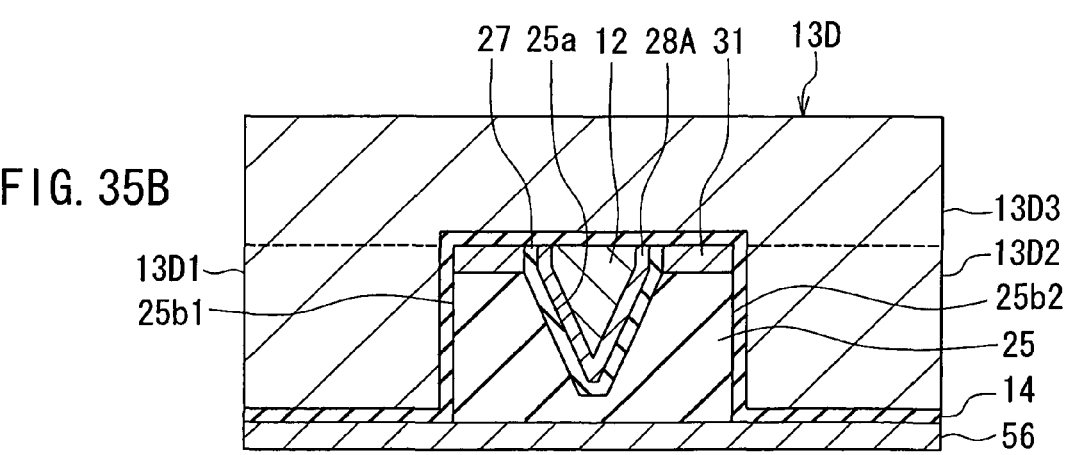

FIG. 35A and FIG. 35B show the next step. In this step, first, the gap layer 14 is selectively etched to form therein openings for exposing a part of the top surface of the pole layer 12 and the top surface of the connecting layer 51. Next, the shield layer 13D, the top yoke layer 13B7 and the connecting layer 52 are formed by frame plating, for example. The shield layer 13D is formed to fill the grooves 25b1 and 25b2 and to have a top surface located at a higher level than the top surface of the portion of the gap layer 14 that lies over the etching mask layer 31. The top yoke layer 13B7 is formed on the pole layer 12. The connecting layer 52 is formed on the connecting layer 51. Next, the nonmagnetic layer 46 is formed over the entire top surface of the stack. Next, the nonmagnetic layer 46 is polished by, for example, CMP until the shield layer 13D, the top yoke layer 13B7 and the connecting layer 52 are exposed, whereby the shield layer 13D, the top yoke layer 13B7, the connecting layer 52 and the nonmagnetic layer 46 are flattened at the top. The subsequent steps are the same as those of the second embodiment.

In the manufacturing method for the magnetic head according to the present embodiment, the step of forming the pole layer 12 is performed after the step of forming the first groove 25a. The step of forming the second and third grooves 25b1 and 25b2 is performed after the step of forming the pole layer 12. The step of forming the first and second side shields 13D1 and 13D2 is performed after the step of forming the second and third grooves 25b1 and 25b2. In the step of forming the second and third grooves 25b1 and 25b2, the photoresist mask 37, which is the second mask, covers the pole layer 12 as well as the first opening 31a.

In the present embodiment, the step of forming the gap layer 14 is performed between the step of forming the second and third grooves 25b1 and 25b2 and the step of forming the first and second side shields 13D1 and 13D2.

In the present embodiment, the first and second side shields 13D1 and 13D2 and the top shield 13D3 are made of the same material. The step of forming the top shield 13D3 is performed simultaneously with the step of forming the first and second side shields 13D1 and 13D2.

The remainder of configuration, function and effects of the present embodiment are similar to those of the second embodiment except the function and effects resulting from the feature of the second embodiment that the top surface of the pole layer 12 has the first and second portions 12T1 and 12T2.

[Fourth Embodiment]

Figure 36:
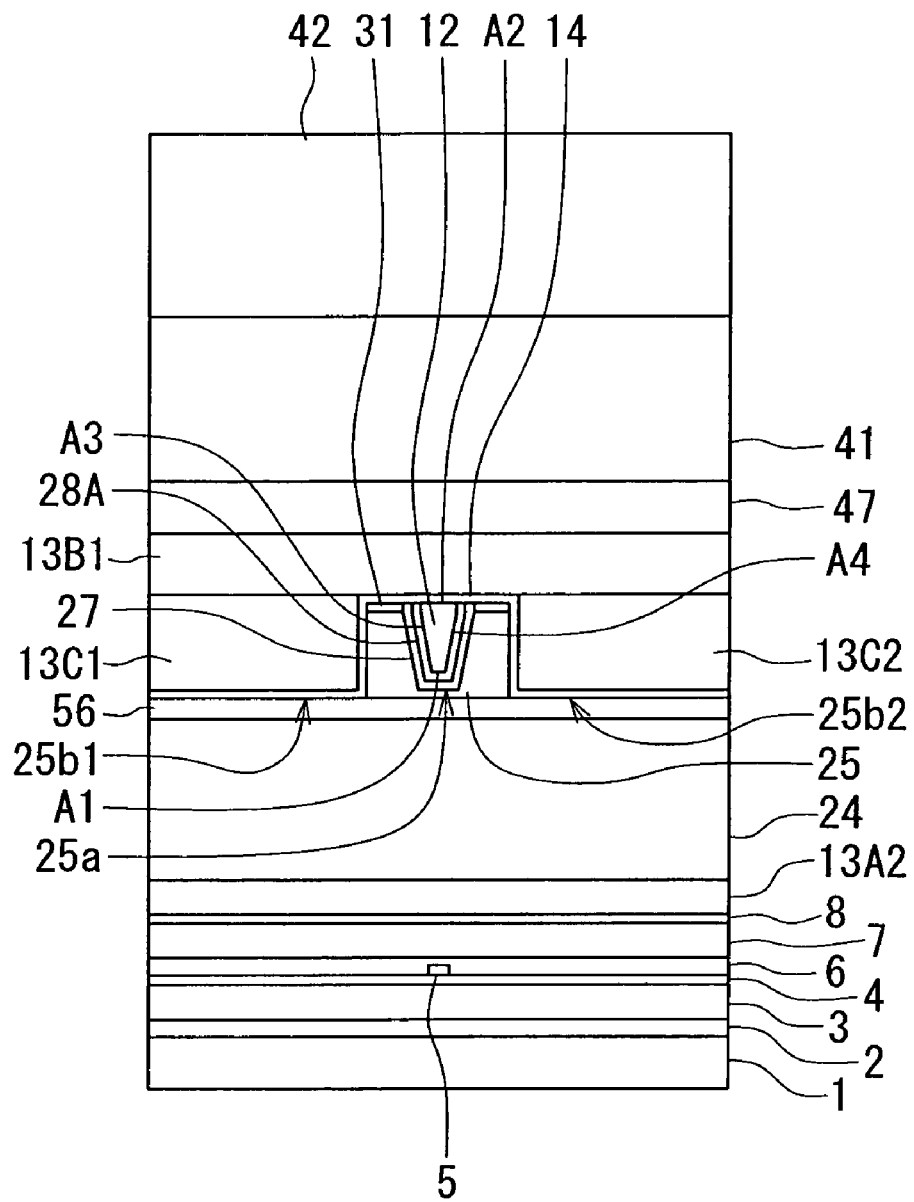
FIG. 36 is a front view showing the medium facing surface of a magnetic head according to a fourth embodiment of the invention.

A fourth embodiment of the present invention will now be described. Reference is now made to FIG. 36 to describe the configuration of a magnetic head according to the present embodiment. FIG. 36 is a front view showing the medium facing surface of the magnetic head according to the present embodiment. The magnetic head according to the present embodiment has side shields 13C1 and 13C2 and a top shield layer 13B1 instead of the shield layer 13D of the third embodiment. In the present embodiment, the gap layer 14 is made of a nonmagnetic metal material such as Ru.

The side shields 13C1 and 13C2 are accommodated in the grooves 25b1 and 25b2, respectively, such that the gap layer 14 is interposed between the side shield 13C1 and each of the wall face of the groove 25b1 and the top surface of the nonmagnetic layer 56, and between the side shield 13C2 and each of the wall face of the groove 25b2 and the top surface of the nonmagnetic layer 56. Each of the side shields 13C1 and 13C2 has an end face located in the medium facing surface 30. The material of the side shields 13C1 and 13C2 is the same as that in the first embodiment.

The top shield layer 13B1 is disposed over the side shields 13C1 and 13C2 and the portion of the gap layer 14 that lies over the top surface of the pole layer 12. The top shield layer 13B1 has an end face that is located in the medium facing surface 30 at a position forward of the end face of the pole layer 12 along the direction T of travel of the recording medium. In the medium facing surface 30, a part of the end face of the top shield layer 13B1 is located at a predetermined distance from the end face of the pole layer 12, the distance being created by the thickness of the gap layer 14. The material of the top shield layer 13B1 is the same as that in the first embodiment.

A manufacturing method for the magnetic head according to the present embodiment will now be described. In the manufacturing method for the magnetic head according to the present embodiment, the steps until the grooves 25b1 and 25b2 are formed in the nonmagnetic layer 25P and the photoresist mask 37 is removed are the same as those of the manufacturing method for the magnetic head according to the third embodiment.

Reference is now made to FIG. 37A to 39A and FIG. 37B to FIG. 39B to describe a series of steps until the formation of the top shield layer 13B1, the top yoke layer 13B7 and the insulating layer 46 after the foregoing steps. FIG. 37A to FIG. 39A and FIG. 37B to FIG. 39B each show a stack of layers formed in the course of manufacturing the magnetic head. Each of FIG. 37A to FIG. 39A shows the top surface of part of the stack. Each of FIG. 37B to FIG. 39B shows a cross section of the stack taken at the position where the medium facing surface 30 is to be formed. Portions closer to the substrate 1 than the nonmagnetic metal layer 56 are omitted in FIG. 37B to FIG. 39B. In FIG. 37A to FIG. 39A the symbol "ABS" indicates the position where the medium facing surface 30 is to be formed.

Figure 37A:
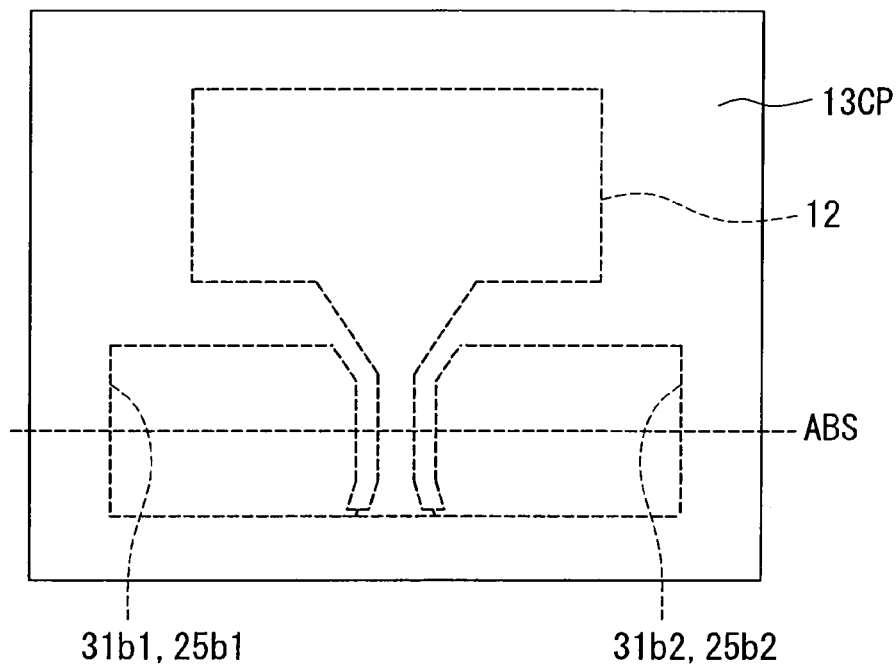
FIG. 37A and FIG. 37B are explanatory diagrams showing a step of a manufacturing method for the magnetic head according to the fourth embodiment of the invention.
Figure 37B:
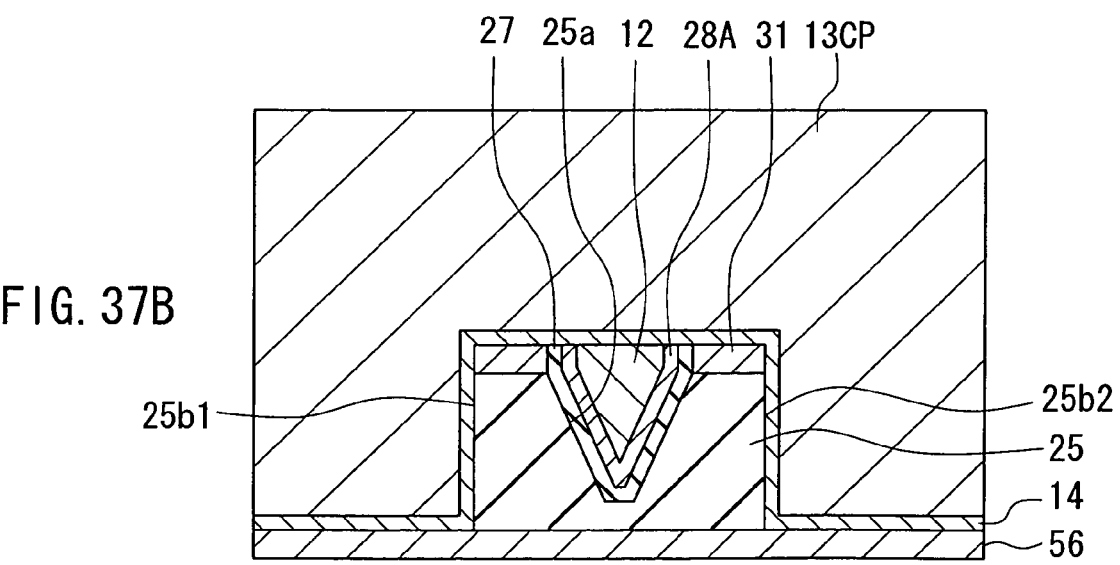

In the step shown in FIG. 37A and FIG. 37B, a magnetic layer 13CP, which is to make the side shields 13C1 and 13C2 later, is formed by frame plating, for example, using the gap layer 14 as an electrode and a seed layer. The magnetic layer 13CP is formed to fill the grooves 25b1 and 25b2 and to have a top surface located at a higher level than the top surface of the portion of the gap layer 14 that lies over the etching mask layer 31.

Figure 38A:
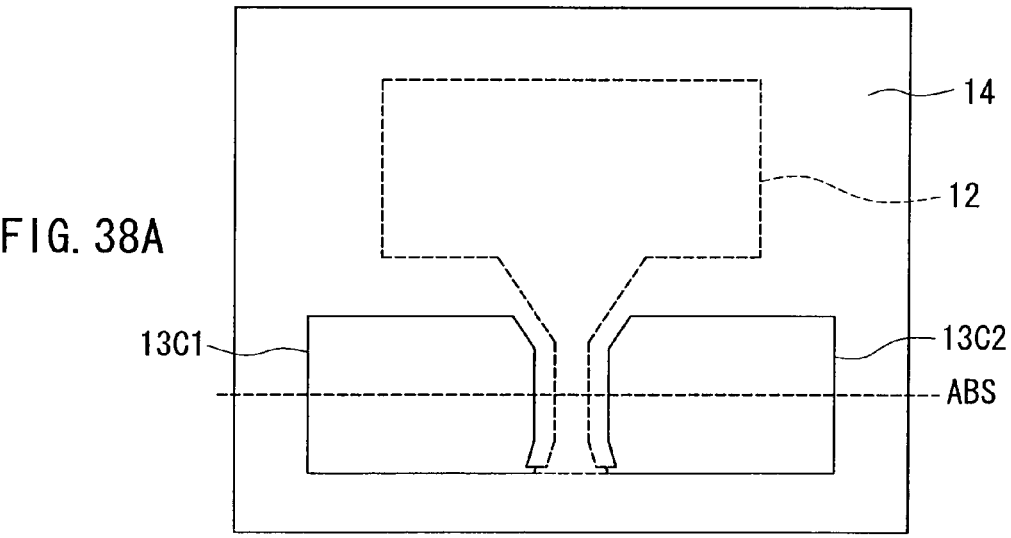
FIG. 38A and FIG. 38B are explanatory diagrams showing a step that follows the step of FIG. 37A and FIG. 37B.
Figure 38B:
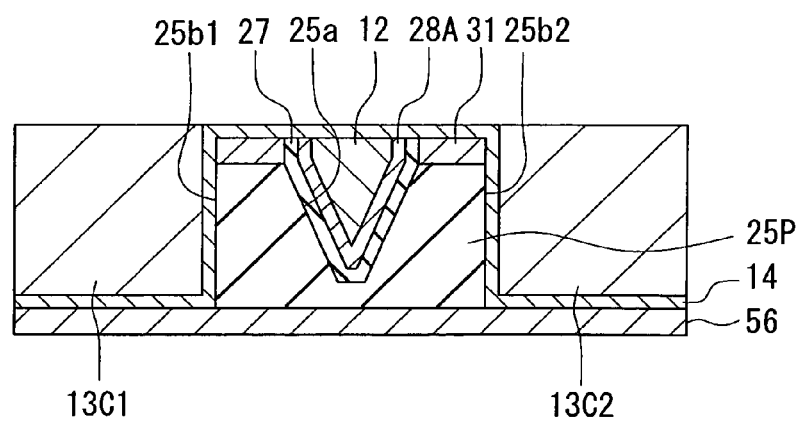

FIG. 38A and FIG. 38B show the next step. In this step, the magnetic layer 13CP and so on are polished by, for example, CMP until the top surface of the portion of the gap layer 14 that lies over the etching mask layer 31 is exposed, whereby the magnetic layer 13CP and the gap layer 14 are flattened at the top. As a result, the portion of the magnetic layer 13CP remaining in the groove 25b1 makes the side shield 13C1 while the portion of the magnetic layer 13CP remaining in the groove 25b2 makes the side shield 13C2. In this step, the gap layer 14 functions as a polishing stopper that stops polishing.

Figure 39A:
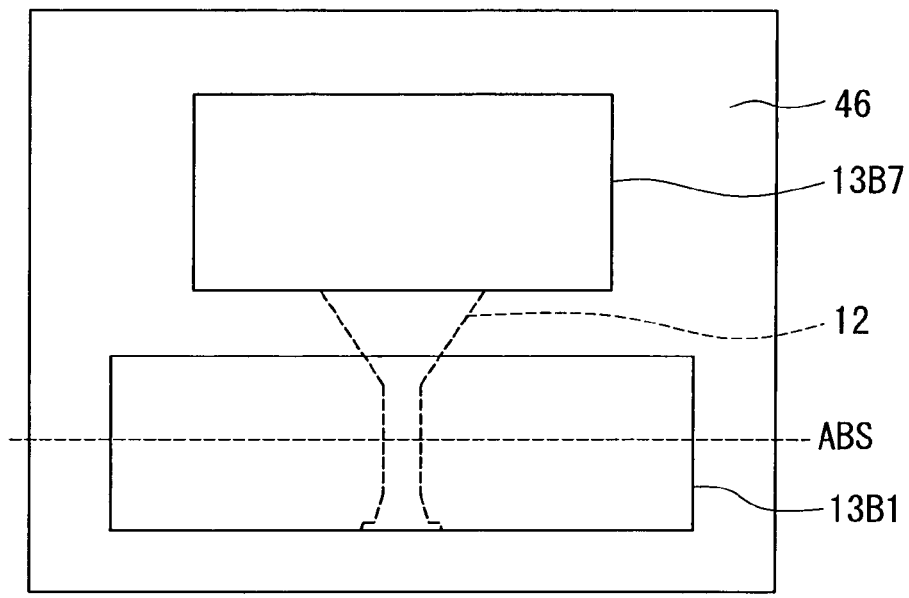
FIG. 39A and FIG. 39B are explanatory diagrams showing a step that follows the step of FIG. 38A and FIG. 38B.
Figure 39B:
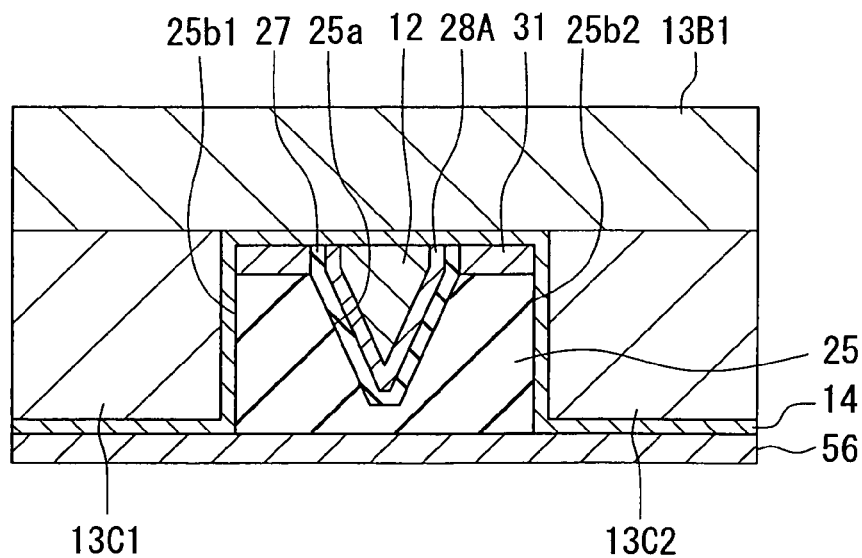

FIG. 39A and FIG. 39B show the next step. In this step, first, the gap layer 14 is selectively etched to form therein openings for exposing a part of the top surface of the pole layer 12 and the top surface of the connecting layer 51. Next, the top shield layer 13B1 is formed over the side shields 13C1 and 13C2 and the gap layer 14, the top yoke layer 13B7 is formed on the pole layer 12, and the connecting layer 52 is formed on the connecting layer 51, each by frame plating, for example. Next, the nonmagnetic layer 46 is formed over the entire top surface of the stack. Next, the nonmagnetic layer 46 is polished by, for example, CMP until the top shield layer 13B1, the top yoke layer 13B7 and the connecting layer 52 are exposed, whereby the top shield layer 13B1, the top yoke layer 13B7, the connecting layer 52 and the nonmagnetic layer 46 are flattened at the top. The subsequent steps are the same as those of the third embodiment.

In the present embodiment, the top shield layer 13B1 can be formed of a material different from that of the side shields 13C1 and 13C2. For example, the top shield layer 13B1 can be formed of a magnetic material having a saturation flux density higher than that of a magnetic material used to form the side shields 13C1 and 13C2.

The remainder of configuration, function and effects of the present embodiment are similar to those of the third embodiment.

The present invention is not limited to the foregoing embodiments but can be carried out in various modifications. For example, in the first and second embodiments, the top surface of the pole layer 12 includes the first portion 12T1 and the second portion 12T2; however, the pole layer 12 may have a flat top surface extending in a direction substantially perpendicular to the medium facing surface 30.

In the third and fourth embodiments, the first portion 13A of the shield 13 may have a configuration the same as that of the first portion 13A of the first embodiment.

While the first to fourth embodiments have been described with reference to a magnetic head having a structure in which the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A manufacturing method for a magnetic head for perpendicular magnetic recording, the magnetic head comprising:
    a medium facing surface that faces a recording medium;
    a coil that produces a magnetic field corresponding to data to be written on the recording medium;
    a pole layer that has an end face located in the medium facing surface, allows a magnetic flux corresponding to the magnetic field produced by the coil to pass and produces a write magnetic field for writing the data on the recording medium by means of a perpendicular magnetic recording system;
    a top shield that is made of a magnetic material and has an end face located in the medium facing surface at a position forward of the end face of the pole layer along a direction of travel of the recording medium;
    a gap layer that is made of a nonmagnetic material, disposed between the pole layer and the top shield and has an end face located in the medium facing surface;
    a first side shield and a second side shield disposed on both sides of the pole layer that are opposite to each other in a track width direction, each of the side shields being made of a magnetic material and having an end face located in the medium facing surface; and
    an encasing layer that is made of a nonmagnetic material and has a first groove accommodating the pole layer, a second groove accommodating the first side shield, and a third groove accommodating the second side shield,
    the manufacturing method comprising the steps of:
    forming a nonmagnetic layer that is to become the encasing layer through formation of the first to third grooves therein later;
    forming an etching mask layer on the nonmagnetic layer, the etching mask layer having a first opening, a second opening and a third opening that have shapes corresponding to respective planar shapes of the first, second and third grooves to be formed later;
    forming the first to third grooves in the nonmagnetic layer by etching using the etching mask layer so that the nonmagnetic layer becomes the encasing layer;
    forming the pole layer;
    forming the first and second side shields;
    forming the gap layer;
    forming the top shield; and
    forming the coil, wherein:
    the step of forming the first to third grooves includes the steps of:
    forming the first groove by etching the nonmagnetic layer using the first opening, with the second and third openings covered with a first mask; and
    forming the second and third grooves by etching the nonmagnetic layer using the second and third openings, with the first opening covered with a second mask.

2. The manufacturing method according to claim 1, wherein:
    the magnetic head for perpendicular magnetic recording further comprises a substrate on which the coil, the encasing layer, the pole layer, the first and second side shields, the gap layer and the top shield are stacked, the substrate having a top surface; and
    the end face of the pole layer located in the medium facing surface decreases in width in the track width direction with decreasing distance from the top surface of the substrate.

3. The manufacturing method according to claim 1, wherein:

the magnetic head for perpendicular magnetic recording further comprises a substrate on which the coil, the encasing layer, the pole layer, the first and second side shields, the gap layer and the top shield are stacked, the substrate having a top surface;

the pole layer has a top surface including a first portion and a second portion, the first portion having a first edge located in the medium facing surface and a second edge opposite to the first edge, the second portion being located farther from the medium facing surface than is the first portion and connected to the first portion at the second edge, and a distance from top surface of the substrate to an arbitrary point on the first portion decreases with decreasing distance from the arbitrary point to the medium facing surface; and the step of forming the pole layer includes the steps of:

forming a magnetic layer to fill the first groove, the magnetic layer being intended to become the pole layer later; and etching a part of the magnetic layer so that the first portion of the top surface of the pole layer is formed and the magnetic layer thereby becomes the pole layer.

4. The manufacturing method according to claim 1, wherein the step of forming the etching mask layer includes the steps of:

forming a nonmagnetic metal layer on the nonmagnetic layer, the nonmagnetic metal layer being made of a nonmagnetic metal material and intended to become the etching mask layer through formation of the first to third openings therein later;

forming a photoresist mask on the nonmagnetic metal layer, the photoresist mask being intended to be used in etching the nonmagnetic metal layer later; and forming the first to third openings in the nonmagnetic metal layer by etching using the photoresist mask so that the nonmagnetic metal layer becomes the etching mask layer.

5. The manufacturing method according to claim 4, wherein, in the step of forming the photoresist mask, the photoresist mask is formed by performing photolithography with optical proximity correction.

6. The manufacturing method according to claim 1, wherein the steps of forming the pole layer and forming the first and second side shields are performed after the steps of forming the first groove and forming the second and third grooves.

7. The manufacturing method according to claim 1, wherein:

the step of forming the pole layer is performed after the step of forming the first groove;

the step of forming the second and third grooves is performed after the step of forming the pole layer;

the step of forming the first and second side shields is performed after the step of forming the second and third grooves; and in the step of forming the second and third grooves, the second mask covers the pole layer as well as the first opening.

8. The manufacturing method according to claim 7, wherein the step of forming the gap layer is performed between the step of forming the second and third grooves and the step of forming the first and second side shields.

9. The manufacturing method according to claim 8, wherein the first and second side shields and the top shield are made of the same material, and the step of forming the top shield is performed simultaneously with the step of forming the first and second side shields.

\* \* \* \* \*